United States Patent
Chae et al.

(10) Patent No.: US 12,473,324 B2
(45) Date of Patent: Nov. 18, 2025

(54) TRIAZINE-BASED AMPHIPHILIC COMPOUND AND USE THEREOF

(71) Applicant: INDUSTRY-UNIVERSITY COOPERATION FOUNDATION HANYANG UNIVERSITY ERICA CAMPUS, Ansan-si (KR)

(72) Inventors: Pil Seok Chae, Ansan-si (KR); Lubna Ghani, Ansan-si (KR)

(73) Assignee: Industry-University Cooperation Foundation Hanyang University Erica Campus, Ansan-si (KR)

( * ) Notice: Subject to any disclaimer, the term of this patent is extended or adjusted under 35 U.S.C. 154(b) by 870 days.

(21) Appl. No.: 17/768,285

(22) PCT Filed: Oct. 16, 2020

(86) PCT No.: PCT/KR2020/014159
§ 371 (c)(1),
(2) Date: Apr. 12, 2022

(87) PCT Pub. No.: WO2021/075904
PCT Pub. Date: Apr. 22, 2021

(65) Prior Publication Data
US 2024/0158429 A1     May 16, 2024

(30) Foreign Application Priority Data
Oct. 16, 2019 (KR) ........................ 10-2019-0128291

(51) Int. Cl.
*C07H 15/26* (2006.01)
*C07H 1/00* (2006.01)
*G01N 33/68* (2006.01)

(52) U.S. Cl.
CPC ............... *C07H 15/26* (2013.01); *C07H 1/00* (2013.01); *G01N 33/6842* (2013.01); *G01N 2333/705* (2013.01)

(58) Field of Classification Search
CPC .................................................... C07H 15/26
See application file for complete search history.

(56) References Cited

U.S. PATENT DOCUMENTS 10,781,229 B2   9/2020   Chae et al.
2013/0001465 A1   1/2013   Gellman et al.
2014/0141034 A1   5/2014   Adamo et al.
2017/0022241 A1   1/2017   Dauvergne
2019/0284221 A1   9/2019   Chae et al.

FOREIGN PATENT DOCUMENTS

KR    20170070400 A    6/2017

OTHER PUBLICATIONS

Sadaf, A. et al., Chemical Science, "A class of rigid linker-bearing glucosides for membrane protein structural study", 2016, vol. 7, pp. 1933 (Year: 2016).*
Chae et al. "Maltose-neopentyl glycol (MNG) amphiphiles for solubilization, stabilization and crystallization of membrane proteins" Nature Methods, 7(12):1003-1008 (2010).
Chae et al. "New ganglio-tripod amphiphiles (TPAs) for membrane protein solubilization and stabilization: implications for detergent structure-property relationships" Organic & Biomolecular Chemistry, 12:8480-8487 (2014).
Deckert et al. "The complete genome of the hyperthermophilic bacterium Aquifex aeolicus" Nature, 392:353-358 (1998).
English translation of International Search Report corresponding to International Patent Application No. PCTIKR2020/014159 (3 pages) (mailed Jan. 21, 2021).
Ethayathulla et al. "Structure-based mechanism for Na+/melibiose symport by MelB" Nature Communications, 5(3009):1-11 (2014).
Ghani et al. "1,3,5-Triazine-cored maltoside amphiphiles for membrane protein extraction and stabilization" Journal of the American Chemical Society, 141(50):19677-19687 (2019).
Newstead et al. "Insights into outer membrane protein crystallization" Molecular Membrane Biology, 8(25):631-638 (2008).
Newstead et al. "Rationalizing a-helical membrane protein crystallization" Protein Science, 17(3):466-472 (2008).
Rosenbaum et al. "GPCR Engineering Yields High-Resolution Structural Insights into β2-Adrenergic Receptor 9 Function" Science, 318(5854):1266-1273 (2007).

* cited by examiner

*Primary Examiner* — Bahar Craigo
(74) *Attorney, Agent, or Firm* — Myers Bigel, P.A.

(57) ABSTRACT

The present invention relates to: a newly developed triazine-cored amphiphilic compound; a preparation method therefor; and a method for extracting, solubilizing, stabilizing, crystallizing or analyzing membrane proteins by using the same. In addition, the compound enables membrane proteins, which have various structures and characteristics, to be efficiently extracted from cell membranes and stably stored in an aqueous solution for a long time, compared to a conventional compound, thereby being usable in functional and structural analysis thereof. Analyzing the structure and function of membrane proteins is closely related to the development of a novel drug, and thus is one of the greatest interests in the biology and chemistry fields.

20 Claims, 15 Drawing Sheets

TRIAZINE-BASED AMPHIPHILIC COMPOUND AND USE THEREOF

TECHNICAL FIELD

The present invention relates to: a newly developed triazine-based amphiphilic compound; a preparation method therefor; and a method for extracting, solubilizing, stabilizing, crystallizing or analyzing membrane proteins by using the same.

BACKGROUND ART

Membrane proteins play a crucial role in biological systems. Since these bio-macromolecules contain hydrophilic and hydrophobic moieties, amphiphilic molecules are required to extract membrane proteins from cell membranes and solubilize and stabilize the membrane proteins in an aqueous solution.

For structural analysis of membrane proteins, good-quality membrane protein crystals need to be obtained, and for this purpose, the structural stability of a membrane protein in an aqueous solution should take precedence. Although there are many existing amphiphilic molecules used in membrane protein research, with their number being 100 or more, only about five of the amphiphilic molecules have been actively utilized in membrane protein structure research. These five amphiphilic molecules include n-octyl-β-D-glucopyranoside (OG), n-nonyl-β-D-glucopyranoside (NG), n-decyl-β-D-maltopyranoside (DM), n-dodecyl-β-D-maltopyranoside (DDM), and lauryldimethylamine-N-oxide (LDAO) (Non-Patent Document 1, Non-Patent Document 2). However, since many membrane proteins surrounded by these molecules have their structure easily denatured or aggregated and thus tend to rapidly lose their functions, there are considerable limitations in the functional and structural studies of membrane proteins utilizing these molecules. This is because molecules in the related art cannot exhibit various properties due to their simple chemical structures. Therefore, there is a need for developing a new amphiphilic material having new and excellent properties through a new structure.

A triazine core structure is very easy to synthesize because the structure has a molecule capable of sequentially attaching three substituents, and has a structure which is suitable for designing an amphiphilic molecule by introducing two hydrophobic groups to one side of the core structure and a hydrophilic group to the other side. Further, the triazine core structure has been often used as a library for the development of new drugs, but has not been utilized for membrane protein research.

Thus, the present inventors have developed an amphiphilic compound in which a hydrophobic group and a hydrophilic group are introduced to the triazine core structure, and completed the present invention by confirming the membrane protein stabilizing properties of this compound.

RELATED ART DOCUMENTS

Non-Patent Document (Non-Patent Document 1) S. Newstead et al., *Protein Sci.* 17 (2008) 466-472.
(Non-Patent Document 2) S. Newstead et al., *Mol. Membr. Biol.* 25 (2008) 631-638.

DISCLOSURE

Technical Problem

An object of the present invention is to provide a compound represented by Chemical Formula 1 or an isomer thereof.

Another object of the present invention is to provide a composition for extracting, solubilizing, stabilizing, crystallizing or analyzing a membrane protein, including the compound.

Still another object of the present invention is to provide a method for preparing the compound.

Yet another object of the present invention is to provide a method for extracting, solubilizing, stabilizing, crystallizing or analyzing a membrane protein, using the compound.

Technical Solution

An exemplary embodiment of the present invention provides a compound represented by the following Chemical Formula 1 or an isomer thereof:

[Chemical Formula 1]

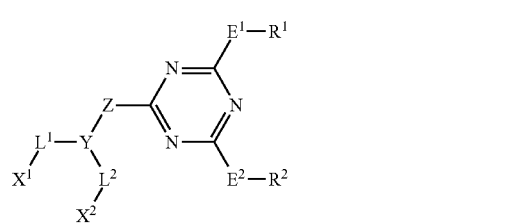

in Chemical Formula 1,
$R^1$ and $R^2$ are each independently a substituted or unsubstituted $C_3$-$C_{30}$ alkyl group;
$E^1$ and $E^2$ are each independently NH, O or S;
Z is a direct bond or NH;
Y is CH or N;
$L^1$ and $L^2$ are each independently a $C_{1-5}$ alkylene group;
$X^1$ and $X^2$ are each independently a saccharide linked to oxygen; and
when Y is CH,
Y may be further unsubstituted or substituted with a substituent represented by -$L^3X^3$, where $L^3$ is a $C_{1-5}$ alkylene group, and $X^3$ may be a saccharide linked to oxygen.

As used herein, the term "saccharide" refers to a compound which has relatively small molecules among carbohydrates and is dissolved in water, and thus tastes sweet. Saccharides are classified into monosaccharides, disaccharides, and polysaccharides according to the number of molecules constituting a sugar. Here, the saccharide may act as a hydrophilic group.

The saccharide used in the exemplary embodiment may be a monosaccharide or a disaccharide, and may be specifically glucose or maltose, but is not limited thereto.

In addition, $R^1$ and $R^2$ may act as hydrophobic groups. Two hydrophobic groups were introduced into the compound according to an exemplary embodiment of the present invention in order to optimize the balance between hydrophilicity and hydrophobicity (hydrophile-lipophile balance).

In the compound according to an exemplary embodiment of the present invention, a triazine core structure is very easy to synthesize because the structure has a molecular structure capable of sequentially attaching three substituents, and has a structure which is suitable for designing an amphiphilic molecule by introducing two hydrophobic groups to one side of the core structure and a hydrophilic group to the other side. The distance between two substituted hydrophobic groups is further very important in determining the density of the alkyl chains inside a micelle, and this density is directly linked to the stability of a membrane protein. Since the distance between two hydrophobic groups was very closely linked by utilizing a hexagonal structure, a high-density hydrophobic interior could be achieved.

In an example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is CH; and Z may be NH, and these compounds were named "triazine-based maltosides with a serinol linker (TSMs)".

In another example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are glucose; Z is NH; and Y is CH, where Y is further substituted with a substituent represented by -$L^3X^3$, $L^3$ is a $C_{1-3}$ alkylene group, and $X^3$ may be glucose, and these compounds were named "triazine-based glucosides with a TRIS linker (TTGs)".

In still another example of the present invention, $R^1$ and $R^2$ are each independently a substituted or unsubstituted $C_3$-$C_{20}$ alkyl group; $E^1$ and $E^2$ are each independently O or S; $L^1$ and $L^2$ are each independently a $C_{1-3}$ alkylene group; $X^1$ and $X^2$ are maltose; Y is N; and Z may be a direct bond, and these compounds were named "triazine-based maltosides with a diethanolamine linker (TEMs)".

In an example of the present invention, the compound may be a compound represented by one of the following Chemical Formulae 2 to 8 or an isomer thereof:

[Chemical Formula 2]

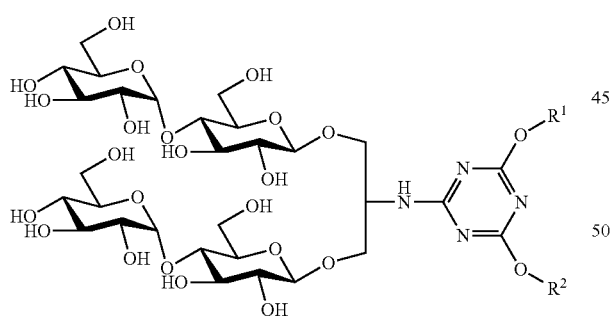

[Chemical Formula 3]

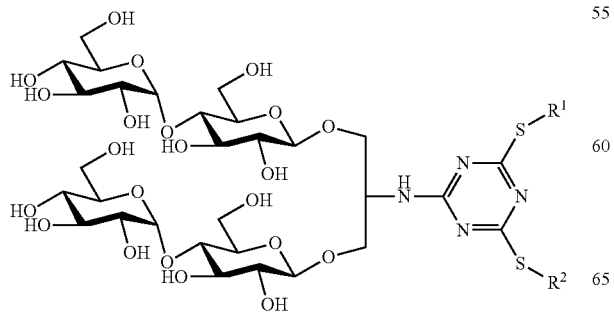

[Chemical Formula 4]

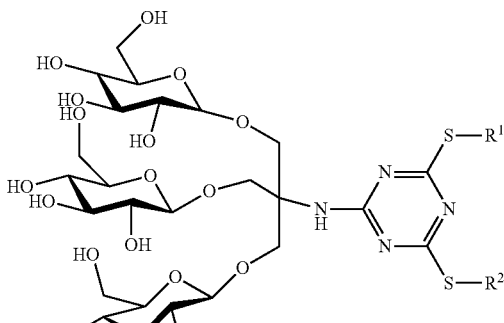

[Chemical Formula 5]

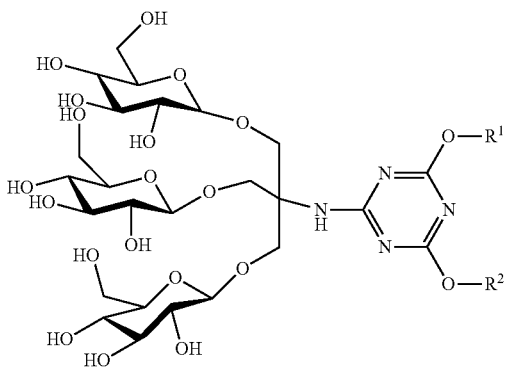

[Chemical Formula 6]

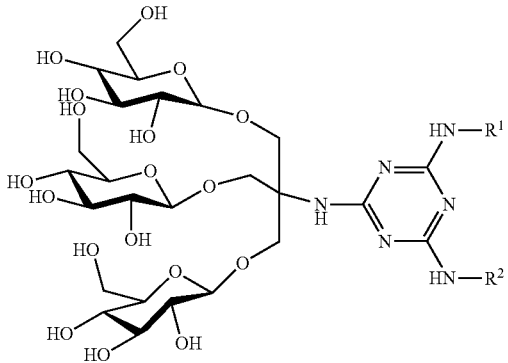

[Chemical Formula 7]

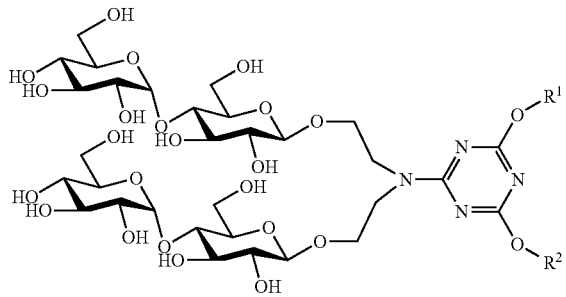

[Chemical Formula 8]

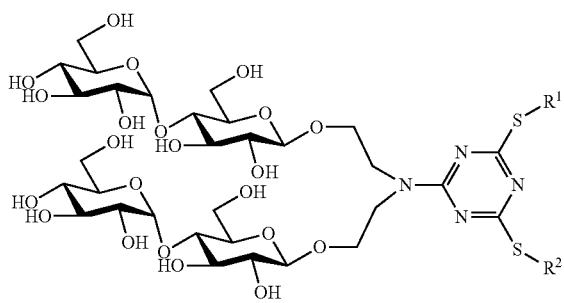

in the formulae,

R[1] and R[2] may be each independently a substituted or unsubstituted $C_5$-$C_{20}$ alkyl group.

In the present specification, the compound of Chemical Formula 2 may be named TSM-E7 to TSM-E11 according to the alkyl chain lengths of R[1] and R[2], the compound of Chemical Formula 3 may be named TSM-T7 to TSM-T11 according to the alkyl chain lengths of R[1] and R[2], the compound of Chemical Formula 4 may be named TTG-T7 to TTG-T12 according to the alkyl chain lengths of R[1] and R[2], the compound of Chemical Formula 5 may be named TTG-E[7] to TTG-E[12] according to the alkyl chain lengths of R[1] and R[2], the compound of Chemical Formula 6 may be named TTG-A8 to TTG-A14 according to the alkyl chain lengths of R[1] and R[2], the compound of Chemical Formula 7 may be named TEM-E[7] to TEM-E[11] according to the alkyl chain lengths of R[1] and R[2], and the compound of Chemical Formula 8 may be named TEM-T7 to TEM-T11 according to the alkyl chain lengths of R[1] and R[2].

The compound according to another exemplary embodiment of the present invention may be an amphiphilic molecule for extracting, solubilizing, stabilizing, crystallizing or analyzing a membrane protein, but is not limited thereto.

Specifically, the extraction may be extracting a membrane protein from a cell membrane.

As used herein, the term "amphiphilic molecule" refers to a molecule capable of having affinity for both polar and non-polar solvents because hydrophobic and hydrophilic groups coexist in a single molecule. Phospholipid molecules present in a surfactant or cell membrane are molecules having a hydrophilic group at one end and a hydrophobic group at the other end, and are characterized by being amphiphilic and forming micelles or liposomes in an aqueous solution. Although a hydrophilic group has polarity, amphiphilic molecules thereof tend not to dissolve well in an aqueous solution because a non-polar group coexists. However, when the concentration is equal to or more than a certain threshold concentration (critical micelle concentration, CMC), hydrophobic interactions cause hydrophobic groups to gather inside, and round or oval micelles whose hydrophilic groups are exposed on the surface are formed, thereby greatly increasing solubility in water.

A method of measuring the CMC is not particularly limited, but a method widely known in the art may be used, and for example, the CMC may be measured by a fluorescent staining method using diphenylhexatriene (DPH).

The compound according to an exemplary embodiment of the present invention may have a critical micelle concentration (CMC) of 0.0001 to 1 mM, specifically 0.0001 to 0.1 mM, more specifically 0.0002 to 0.1 mM, and even more specifically 0.00021 to 0.05 mM in an aqueous solution, but the concentration is not limited thereto.

In the case of DDM, which is usually used for existing membrane protein research, compared to DDM having a critical micelle concentration of 0.17 mM, the TSMs, TTGs or TEMs of the present exemplary embodiment have very small CMC values. Therefore, since micelles are easily formed even at low concentrations, membrane proteins can be effectively studied and analyzed using small amounts of TSMs, TTGs or TEMs, and thus TSMs, TTGs or TEMs may be advantageous in terms of utilization over DDM.

Furthermore, still another exemplary embodiment of the present invention provides a composition for extracting, solubilizing, stabilizing, crystallizing or analyzing a membrane protein, including the compound.

Specifically, the extraction may be extracting a membrane protein from a cell membrane.

The composition may be a formulation of micelles, liposomes, emulsions or nanoparticles, but is not limited thereto.

The micelle may have a radius of 1.0 nm to 200 nm, specifically 2.0 nm to 150.0 nm, and for example, 3.3 nm to 139.8 nm, but the micelle is not limited thereto.

A method of measuring the radius of micelle is not particularly limited, but a method widely known in the art may be used, and for example, the radius of micelle may be measured using a dynamic light scattering (DLS) experiment.

The micelles, liposomes, emulsions or nanoparticles may be bound to membrane proteins due to the internal hydrophobicity thereof. That is, the micelles, liposomes, emulsions or nanoparticles may extract and surround membrane proteins present in the cell membrane.

Therefore, it is possible to extract, solubilize, stabilize, crystallize or analyze a membrane protein from a cell membrane by the micelle.

The composition may further include a buffer and the like which may be helpful for extracting, solubilizing, stabilizing, crystallizing or analyzing a membrane protein.

Further, yet another exemplary embodiment of the present invention provides a method for preparing a compound represented by the following Chemical Formula 1, the method including: the following steps 1) to 4):

1) introducing an alkyl group by reacting an alkylamine, alcohol or thiol with 2,4,6-trichloro-1,3,5-triazine;
2) introducing a hydroxyl end by reacting an amine substituted with at least two hydroxyalkyls or an alkylamine substituted with at least two hydroxyalkyls with the product of step 1);
3) introducing a saccharide to which a protecting group is attached by performing a glycosylation reaction on the product of step 2); and
4) performing a deprotection reaction on the product of step 3).

[Chemical Formula 1]

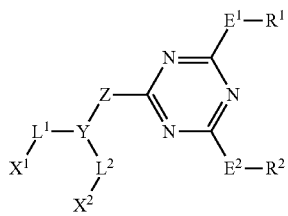

in Chemical Formula 1, $R^1$ and $R^2$ are each independently a substituted or unsubstituted $C_3$-$C_{30}$ alkyl group;

$E^1$ and $E^2$ are each independently NH, O or S;

Z is a direct bond or NH;

Y is CH or N;

$L^1$ and $L^2$ are each independently a $C_{1-5}$ alkylene group;

$X^1$ and $X^2$ are each independently a saccharide linked to oxygen; and when Y is CH, Y may be further unsubstituted or substituted with a substituent represented by -$L^3X^3$, where $L^3$ is a $C_{1-5}$ alkylene group, and $X^3$ may be a saccharide linked to oxygen.

In another example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is CH; and Z may be NH.

In still another example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are glucose; Z is NH; and Y is CH, where Y is further substituted with a substituent represented by -$L^3X^3$, $L^3$ is a $C_{1-3}$ alkylene group, and $X^3$ may be glucose.

In yet another example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is N; and Z may be a direct bond.

The compound synthesized by the method may be a compound of one of Chemical Formulae 2 to 8 according to an example of the present invention, but is not limited thereto.

In the present exemplary embodiment, since the compound can be synthesized by a simple method through four short synthesis steps, a compound for membrane protein research can be mass-produced.

Yet another exemplary embodiment of the present invention provides a method for extracting, solubilizing, stabilizing, crystallizing or analyzing a membrane protein. Specifically, yet another exemplary embodiment of the present invention provides a method for extracting, solubilizing, stabilizing, crystallizing or analyzing a membrane protein, the method including: treating the membrane protein with a compound represented by the following Chemical Formula 1 or an isomer thereof in an aqueous solution:

[Chemical Formula 1]

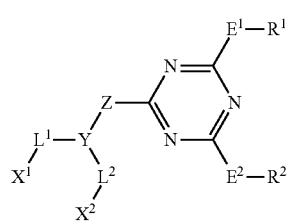

in Chemical Formula 1, $R^1$ and $R^2$ are each independently a substituted or unsubstituted $C_3$-$C_{30}$ alkyl group;

$E^1$ and $E^2$ are each independently N, O or S;

$L^1$ and $L^2$ are each independently a $C_{1-5}$ alkylene group;

$X^1$ and $X^2$ are each independently a saccharide linked to oxygen;

Y is CH or N; and

Z may be a direct bond or NH.

In another example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is CH; and Z may be NH.

In still another example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are glucose; Z is NH; and Y is CH, where Y is further substituted with a substituent represented by -$L^3X^3$, $L^3$ is a $C_{1-3}$ alkylene group, and $X^3$ may be glucose.

In yet another example of the present invention, $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is N; and Z may be a direct bond.

The compound used in the method may be a compound of one of Chemical Formulae 2 to 8 according to an example of the present invention, but is not limited thereto.

Specifically, the extraction may be extracting a membrane protein from a cell membrane.

As used herein, the term "membrane protein" is a general term for proteins or glycoproteins which are introduced into cell membrane lipid bilayers. The membrane protein is present in various states such as passing through the entire layer of the cell membrane, being located on the surface layer, or lining the cell membrane. Examples of membrane proteins include enzymes, receptors such as peptide hormones and topical hormones, receptor carriers such as sugars, ion channels, cell membrane antigens, and the like.

The membrane protein includes any protein or glycoprotein that is introduced into the cell membrane lipid bilayer, and may be specifically a uric acid-xanthine/$H^+$ symporter (UapA), a human $\beta_2$ adrenergic receptor ($\beta_2$AR), a melibiose permease (MelB), boron transporter 1 (BOR1), a mouse µ-opioid receptor (MOR) or a combination of two or more thereof, but is not limited thereto.

As used herein, the term "extraction of a membrane protein" means that the membrane protein is isolated from the cell membrane.

As used herein, the term "solubilization of a membrane protein" means that a water-insoluble membrane protein is dissolved in a micelle in an aqueous solution.

As used herein, the term "stabilization of a membrane protein" means that a tertiary or quaternary structure is stably preserved such that the structure and function of the membrane protein is not changed.

As used herein, the term "crystallization of a membrane protein" means that crystals of the membrane protein are formed in a solution.

As used herein, the term "analysis of a membrane protein" means that the structure or function of the membrane protein is analyzed. In the exemplary embodiment, known methods may be used for the analysis of the membrane protein, and the method is not limited thereto, but the structure of the membrane protein may be analyzed using, for example, electron microscopy or nuclear magnetic resonance.

Advantageous Effects

When the triazine-based compound according to exemplary embodiments of the present invention is used, a membrane protein can be stably stored in an aqueous solution for a long period of time compared to an existing compound, and can be utilized for the functional analysis and structural analysis thereof through this.

Since the structural and functional analysis of the membrane protein is one of the areas of greatest interest in biology and chemistry today, the compound can be applied to protein structure research closely related to new drug development.

Further, since the compound according to exemplary embodiments of the present invention is small in size during the formation of a complex with the membrane protein, good-quality membrane protein crystals can be obtained, thereby promoting the crystallization of the membrane protein.

In addition, the compound according to exemplary embodiments of the present invention can be synthesized from a starting material, which can be easily obtained, by a simple method, the compound for membrane protein research can be mass-produced.

(A) SDS-PAGE and Western Blotting results showing the amount of MelB protein extracted using each amphiphilic compound; and (B) A histogram of showing the amount of MelB protein extracted using each amphiphilic compound as a percentage (%) of the total amount of protein present in a membrane sample (Memb) untreated with an amphiphilic compound.

Figure 10:
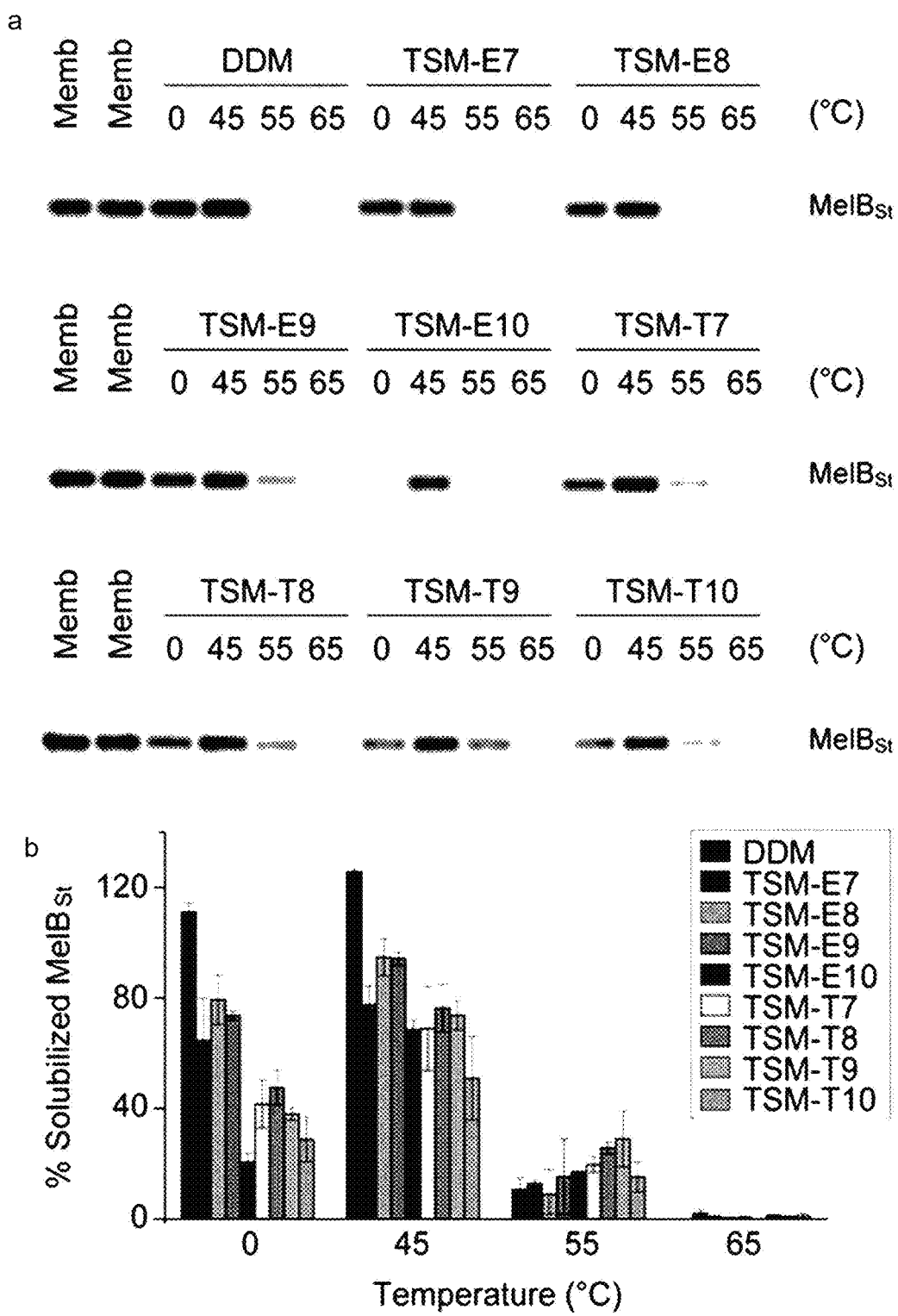

FIG. 10 illustrates the results of, after extracting MelB protein at 0° C. for 90 minutes using TSMs or DDM, further incubating the extracted protein at four high temperatures (0, 45, 55, and 65° C.) for 90 minutes, and then measuring the amount of MelB protein dissolved in an aqueous solution:

(a) SDS-PAGE and Western Blotting results showing the amount of MelB protein extracted using each amphiphilic compound; and (B) A histogram of showing the amount of MelB protein extracted using each amphiphilic compound as a percentage (%) of the total amount of protein present in a membrane sample (Memb) untreated with an amphiphilic compound.

Figure 11:
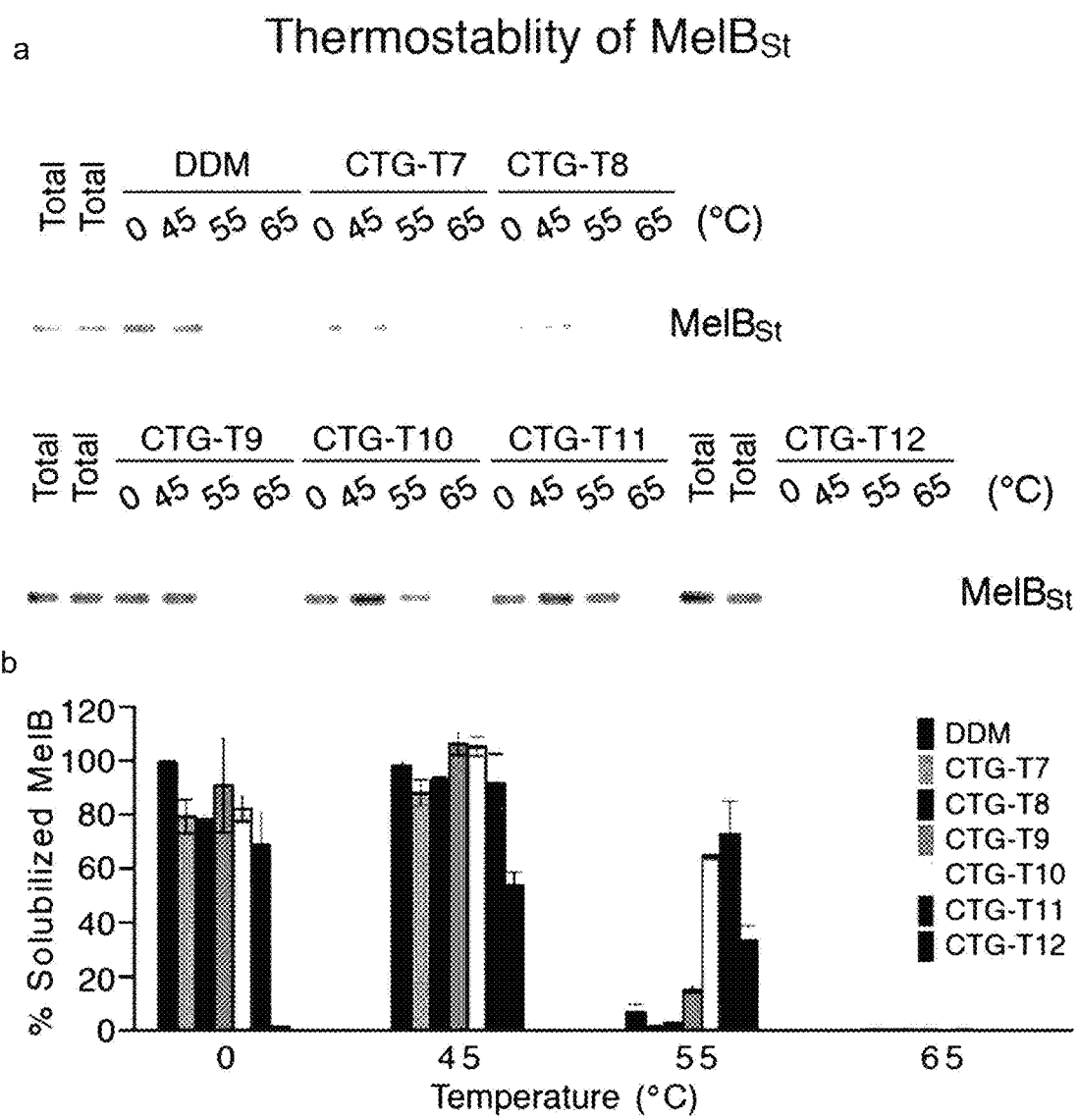

FIG. 11 illustrates the results of, after extracting MelB protein at 0° C. for 90 minutes using TTGs or DDM, further incubating the extracted protein at four high temperatures (0, 45, 55, and 65° C.) for 90 minutes, and then measuring the amount of MelB protein dissolved in an aqueous solution:

(A) SDS-PAGE and Western Blotting results showing the amount of MelB protein extracted using each amphiphilic compound; and (B) A histogram of showing the amount of MelB protein extracted using each amphiphilic compound as a percentage (%) of the total amount of protein present in a membrane sample (Memb) untreated with an amphiphilic compound.

Figure 12:
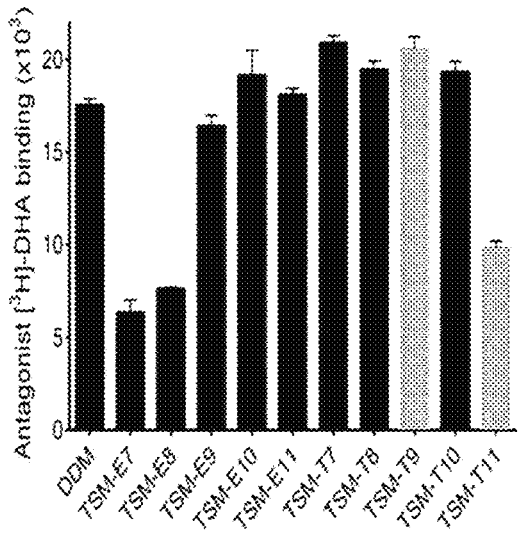
Figure 12:
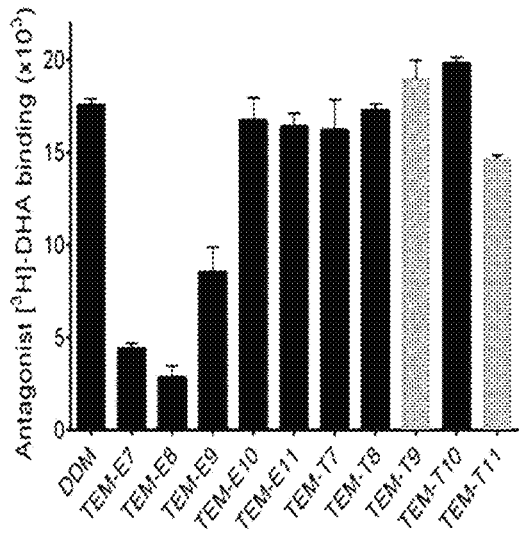

FIG. 12 illustrates the results of measuring the initial (30 minutes after amphiphilic molecular exchange) effect of CMCs+0.2 wt % of TSMs, TEMs or DDM on the stability of $\beta_2$AR. The ligand binding properties of the receptor were measured via ligand binding assay of [$^3$H]-dihydroalprenolol (DHA).

Figure 13:
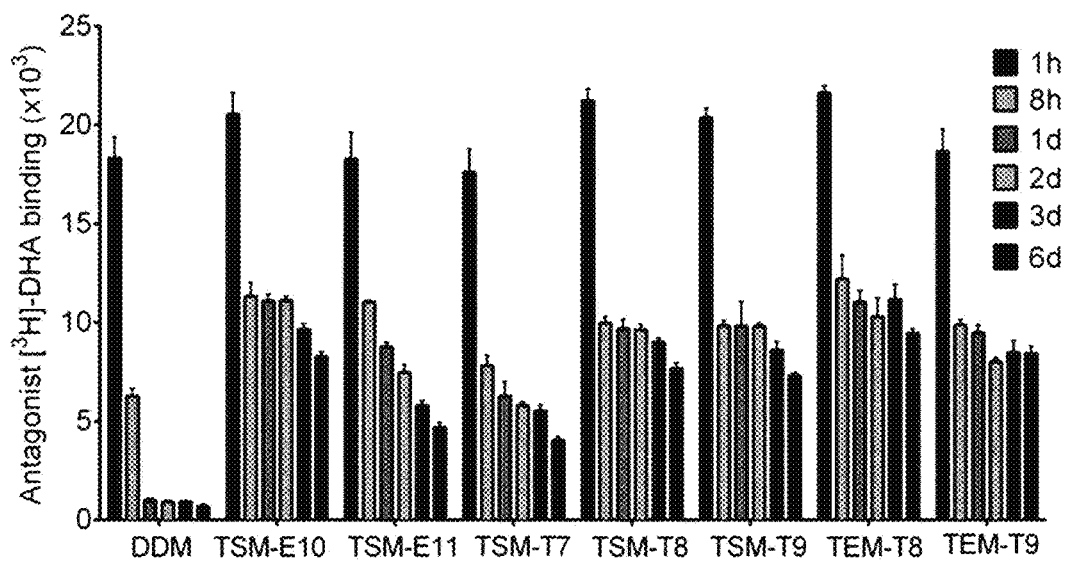

FIG. 13 illustrates the results of measuring the long-term effect of CMCs+0.2 wt % of TSMs, TEMs or DDM on the stability of $\beta_2$AR over the passage of measurement time (1 h, 8 h, 1 day, 2 days, 3 days, and 6 days). The ligand binding properties of the receptor were measured via ligand binding assay of [$^3$H]-dihydroalprenolol (DHA), and measured by sampling a protein sample at regular intervals while storing the protein sample at room temperature for 6 days.

Figure 14:
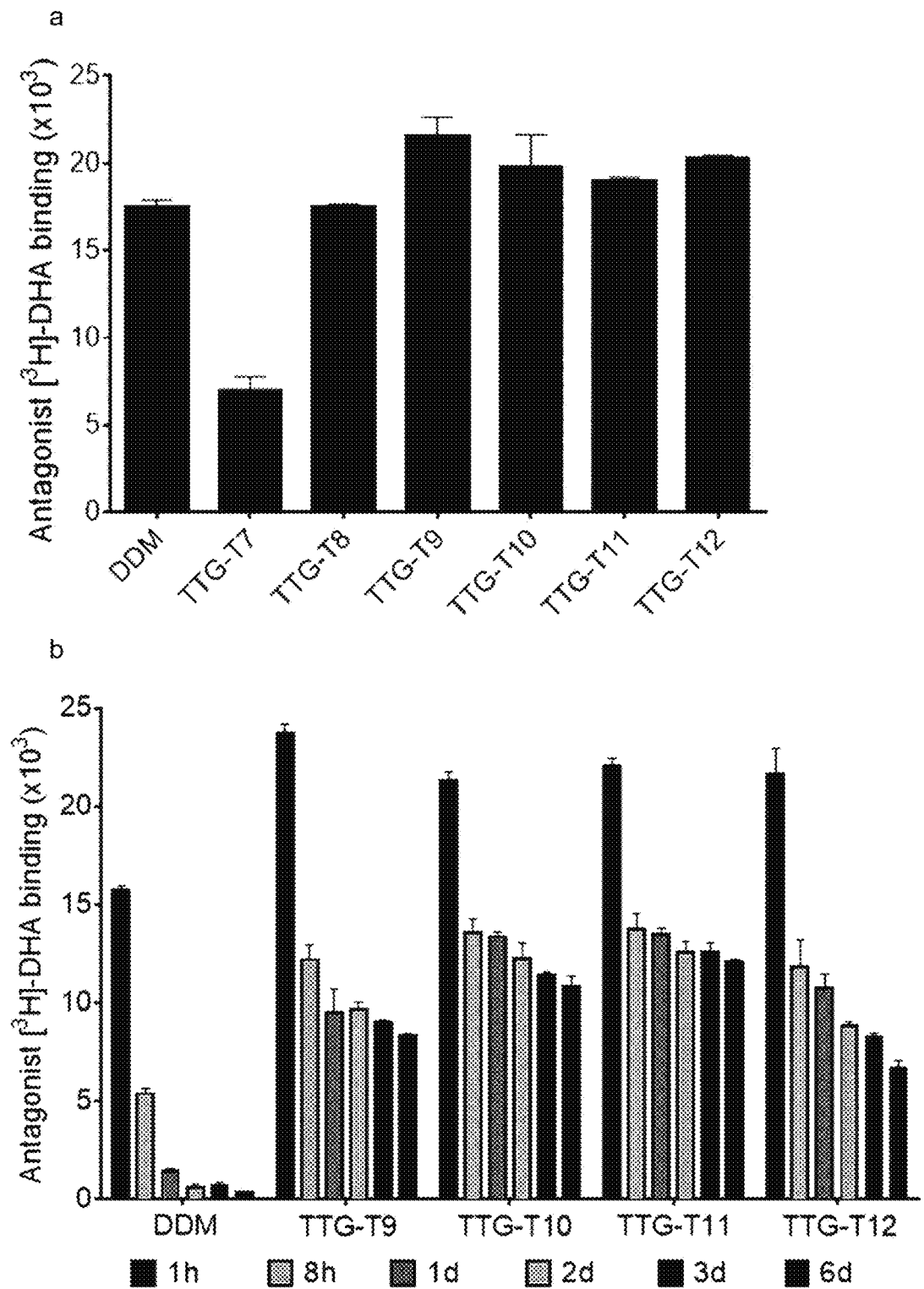

FIG. 14 illustrates the results of measuring the initial (30 minutes after amphiphilic molecular exchange) effect (A) and the long-term effect of CMCs+0.2 wt % of TTGs or DDM on the stability of $\beta_2$AR over the passage of measurement time (1 h, 8 h, 1 day, 2 days, 3 days, and 6 days) (B). The ligand binding properties of the receptor were measured via ligand binding assay of [$^3$H]-dihydroalprenolol (DHA).

Figure 15:
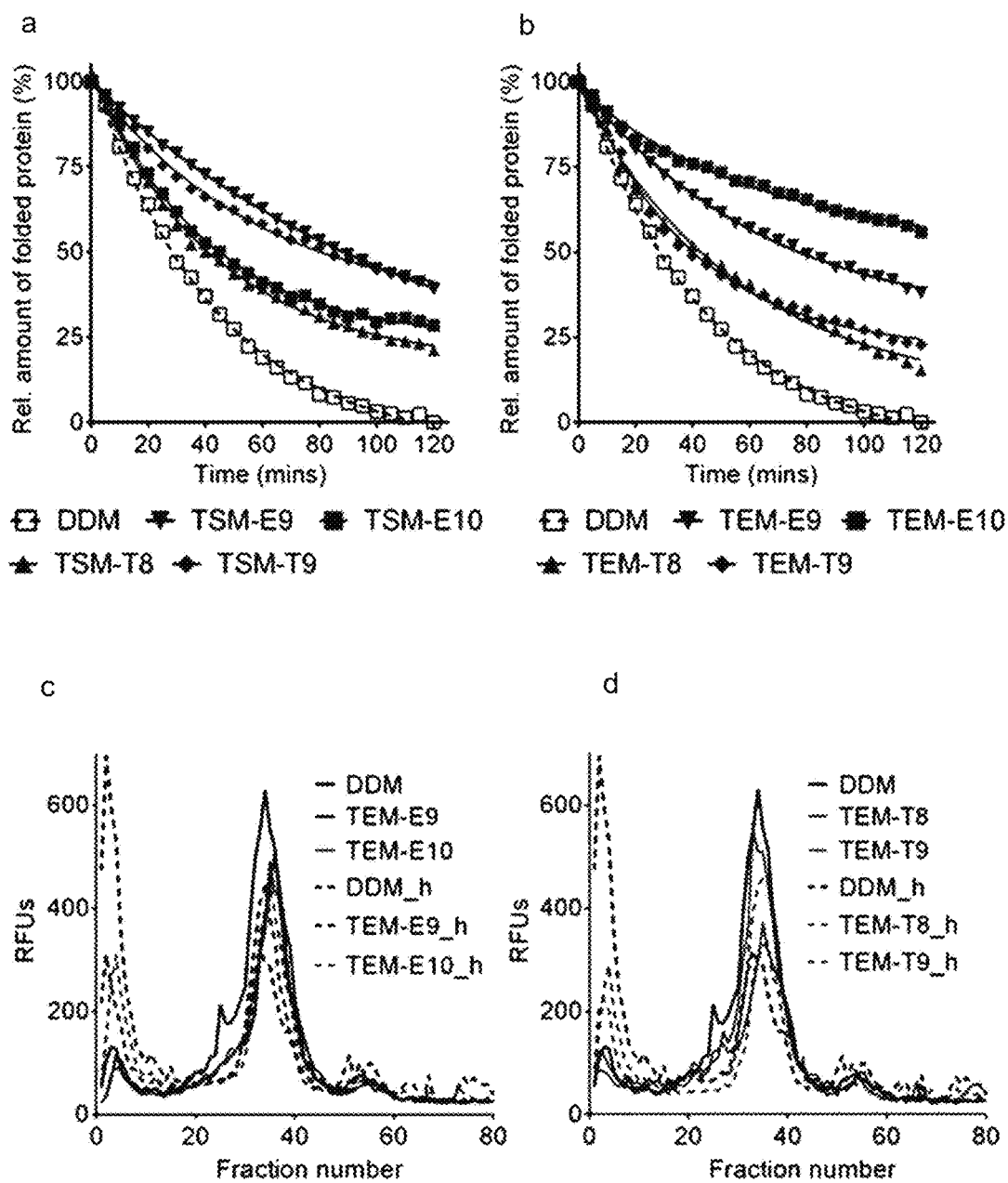

FIG. 15 illustrates a set of thermal denaturation profiles of AtBOR1 solubilized by CMCs+0.04 wt % of TSMs (TSM-E9/E10/T8/T9), TEMs (TEM-$E^9/E^{10}$/T8/T9) or DDM over the passage of time (A, B). These results were measured via CPM performed at 40° C. for 120 minutes. Further, FIG. 15 illustrates a set of results of testing the thermal stability of a protein extracted by the amphiphilic molecule using fluorescence size exclusion chromatography (FSEC)(C, D).

Figure 16:
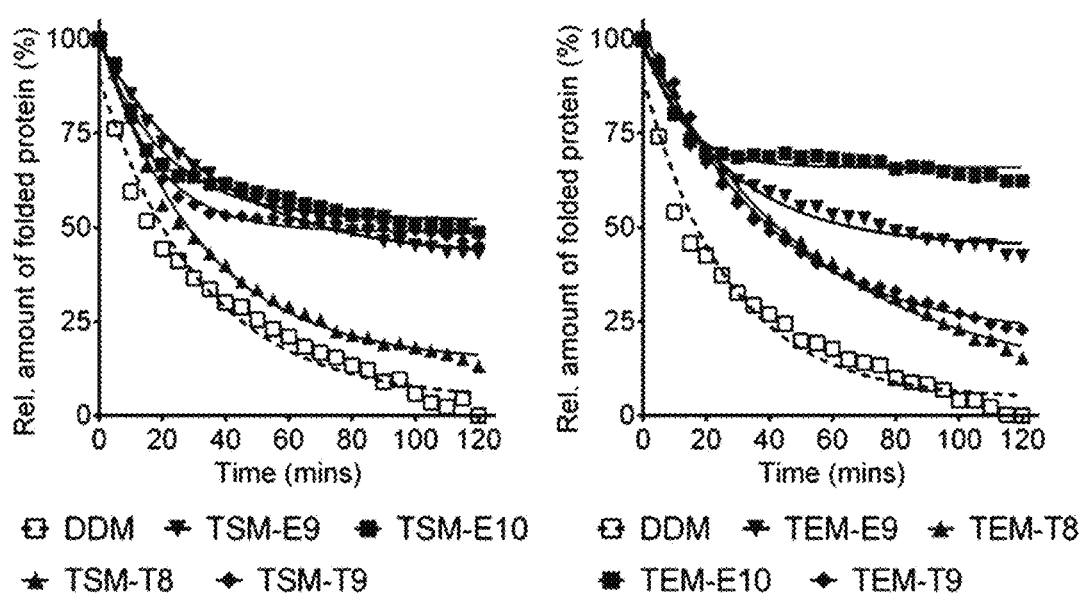

FIG. 16 illustrates a set of thermal denaturation profiles of AtBOR1 solubilized by CMCs++0.2 wt % of TSMs (TSM-E9/E10/T8/T9), TEMs (TEM-E9/E10/T8/T9) or DDM over the passage of time.

Figure 17:
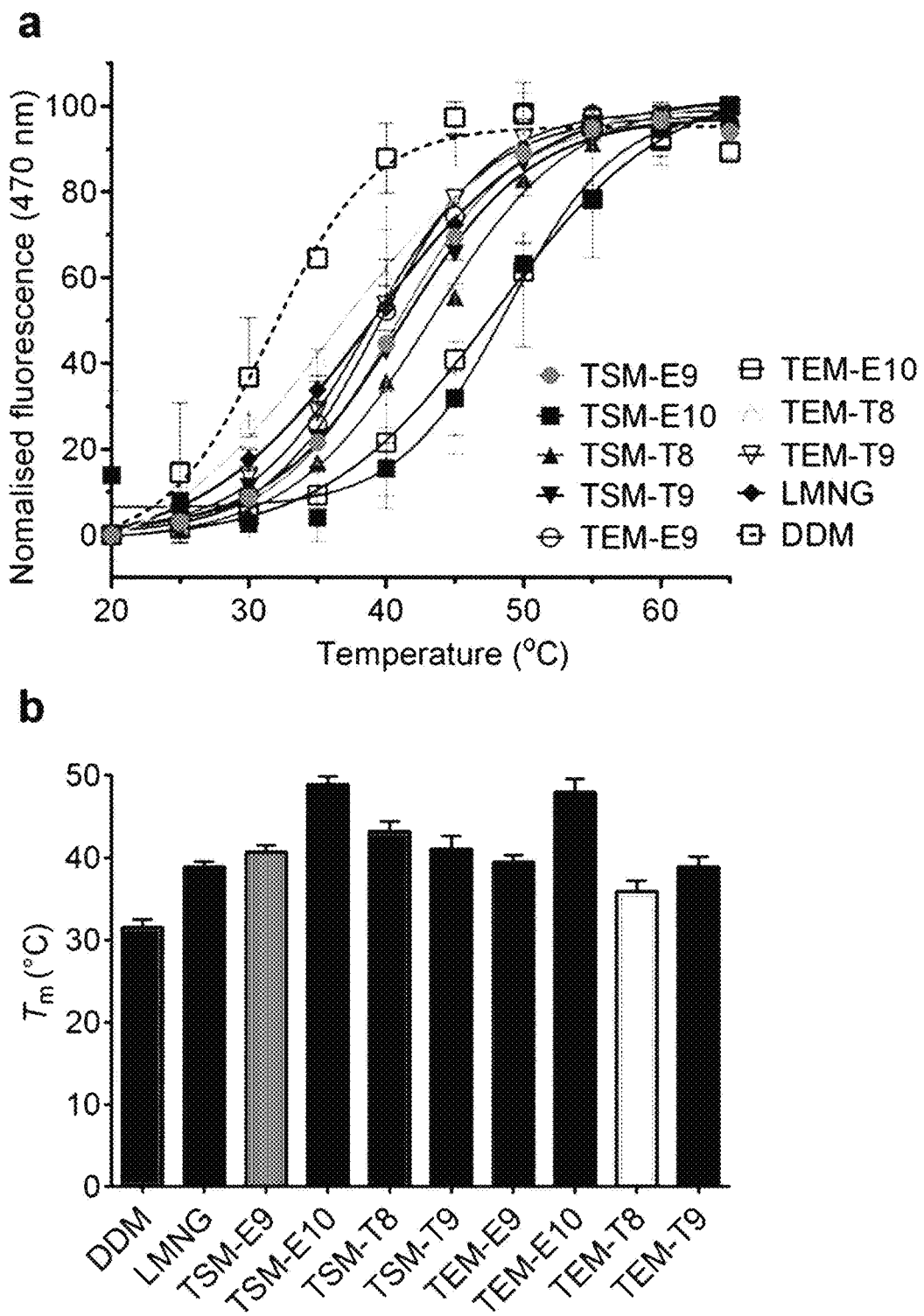

FIG. 17 illustrates the thermal stability profile (A) and melting point (Tm) (B) of MOR dissolved in TSMs (TSM-E9/E10/T8/T9), TEMs (TEM-E9/E10/T8/T9) or DDM.

MODES OF THE INVENTION

Hereinafter, the present invention will be described in more detail in the following Examples. However, the following Examples merely exemplify the content of the present invention, and do not limit or restrict the scope of rights of the present invention. From the detailed description and examples of the present invention, it is understood that what can be easily inferred by a person skilled in the art to which the present invention pertains belongs to the scope of rights of the present invention.

<Example 1> Synthesis Method of TSMs

Figure 1:
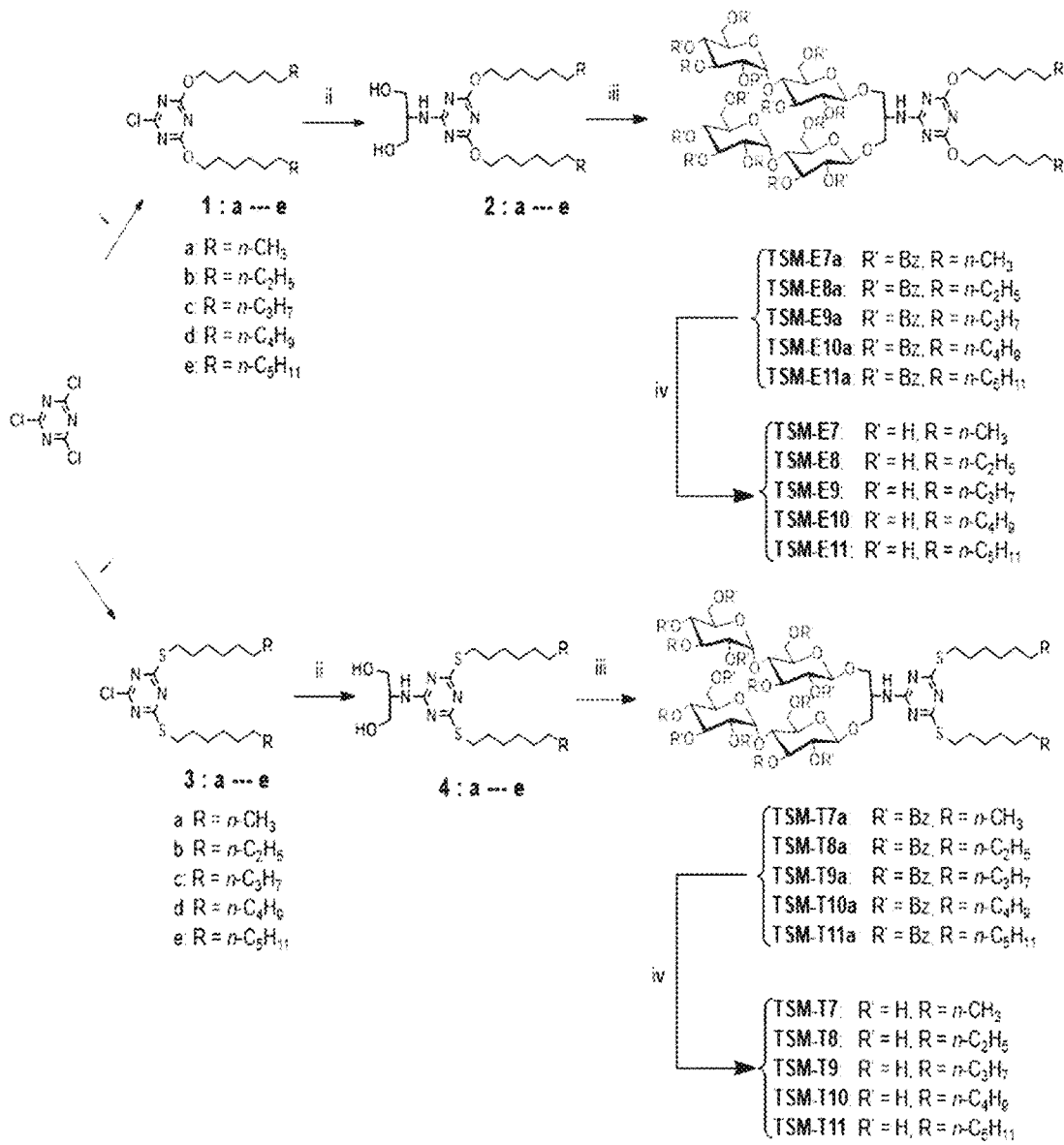
FIG. 1 is a view illustrating a synthesis scheme of TSMs according to Example 1 of the present invention.

FIG. 1 illustrates the synthesis scheme of TSMs. 10 types of compounds of resorcinarene-based maltosides (TSMs) were synthesized by the following synthesis methods of <1-1> to <1-4>.

<1-1> General Procedure for the Synthesis of 2-chloro-4,6-dialkylated-1,3,5-triazine (step i of FIG. 1)

A mixture of 2,4,6-trichloro-1,3,5-triazine (3.01 mmol) and $NaHCO_3$ (7.26 mmol) was stirred in acetone (10 mL) for 10 minutes. Each alcohol (ROH/RSH) (6.0 mmol) dissolved in acetone was added dropwise for 30 minutes. The resulting reaction mixture was kept at room temperature for 36 hr for ROH or 1 hr for RSH. The reaction mixture was extracted with $CHCl_3$ and water, and the organic layer was dried over anhydrous $Na_2SO_4$. The oily residue obtained after removal of solvent was subjected to column chromatography purification to obtain target Compound 1 or 3.

<1-2> General Synthesis Procedure for Coupling Reactions of the Resulting Dialkylated Triazine Derivatives with 2-amino-1,3-propanediol (step ii of FIG. 1)

To a mixture of 2-chloro-4,6-dialkylated-1,3,5-triazine (1.0 equiv.) dissolved in THF, 2-amino-1,3-propanediol and $K_2CO_3$ were added under nitrogen. The solution was stirred at 40° C. for 24 hr. The reaction mixture was diluted with water and then extracted with ethyl acetate. The organic layer was washed with brine and dried over anhydrous $Na_2SO_4$. After evaporation of the ethyl acetate solution, the residue was purified by flash column chromatography (EtOAc/hexane) to obtain target Compound 2 or 4.

<1-3> General Synthesis Procedure for Glycosylation Reaction (Step iii of FIG. 1)

This reaction was performed according to the synthesis method (Nat. Methods 2010, 7, 1003.) of Chae, P. S. et al. with some modifications. Briefly, a mixture of a dialkylated di-ol derivative (Compound 2 or 4), AgOTf (2.5 equiv.), 2,4,6-collidine (0.5 equiv.) in anhydrous $CH_2Cl_2$ (20 mL) was stirred at −45° C. Then, perbenzoylated maltosylbromide (2.5 equiv.) dissolved in $CH_2Cl_2$ (30 mL) was added dropwise over 0.5 hr into this suspension. The reaction was maintained at 0° C. for 1.5 hr. Reaction progress was monitored by TLC. After completion of the reaction (as detected by TLC), pyridine (1.0 mL) was added to the reaction mixture. The reaction mixture was diluted with $CH_2Cl_2$ (30 mL) before being filtered over Celite. The filtrate was washed successively with a 1.0 M aqueous $Na_2S_2O_3$ solution (30 mL), a 0.1 M aqueous HCl solution (30 mL), and brine (30 mL). Then, the organic layer was dried with anhydrous $Na_2SO_4$ and the solvent was removed by rotary evaporation. The resulting residue was purified by silica gel column chromatography (EtOAc/hexane) to obtain the glycosylated target compound.

<1-4> General Synthesis Procedure for Deprotection Reaction (Step iv of FIG. 1)

This reaction followed the synthesis method (Nat. Methods 2010, 7, 1003.) of Chae, P. S. aureus et al. The de-O-benzoylation was performed under Zemplen's condition. An O-protected compound was dissolved in anhydrous $CH_2Cl_2$ and then MeOH was added slowly thereto until persistent precipitation appeared. A methanolic solution of 0.5 M NaOMe was added to the reaction mixture such that the final concentration of NaOMe was 0.05 M. The reaction mixture was stirred for 6 hr at room temperature. After completion of the reaction, the reaction mixture was neutralized using Amberlite IR-120 ($H^+$ form) resin. The resin was removed by filtration and washed with MeOH and the solvent was removed from the filtrate in vacuo. The residue was purified by silica gel column chromatography ($CH_2Cl_2$/MeOH) to obtain the target compound.

<Preparation Example 1> Synthesis of TSM-E7

<1-1> Synthesis of Compound 1a

Compound 1a was synthesized in 48% yield according to Example 1-1. $^1$H NMR (400 MHz, $CDCl_3$): δ 4.41 (t, J=6.6 Hz, 4H), 1.82-1.75 (m, 4H), 1.34-1.27 (m, 16H), 0.88 (t, J=6.9 Hz, 6H); $^{13}$C NMR (100 MHz, $CDCl_3$): δ 172.7, 172.2, 69.6, 32.0, 29.6, 28.6, 25.9, 22.8, 14.2.

<1-2> Synthesis of Compound 2a

Compound 2a was synthesized in 90% yield according to Example 1-2. $^1$H NMR (400 MHz, $CDCl_3$): δ 6.41 (d, J=8.0 Hz, 1H), 4.30-4.24 (m, 4H), 4.15-4.12 (m, 4H), 3.90-3.81 (m, 4H), 1.74-1.72 (m, 4H), 1.39-1.27 (m, 16H), 0.87 (t, J=7.0 Hz, 6H); $^{13}$C NMR (100 MHZ, $CDCl_3$): δ 172.1, 171.6, 167.9, 68.0, 67.8, 62.8, 53.2, 31.9, 29.1, 28.8, 25.9, 22.7, 14.2.

<1-3> Synthesis of TSM-E7a

TSM-E7a was synthesized in 85% yield according to the general glycosylation reaction procedure of Example 1-3. $^1$H NMR (400 MHZ, $CDCl_3$): δ 8.07-7.95 (m, 16H), 7.89-7.87 (d, J=7.5 Hz, 4H), 7.82-7.80 (d, J=8.2 Hz, 4H), 7.77-7.74 (m, 4H), 7.63-7.21 (m, 42H), 6.12 (t, J=10.0 Hz, 2H), 5.71-5.66 (m, 4H), 5.49 (d, J=9.7 Hz, 1H), 5.35-5.30 (m, 2H), 5.17-5.08 (m, 4H), 4.47-4.53 (m, 4H), 4.34-4.10 (m, 12H), 3.76 (d, J=8.3 Hz, 2H), 3.24-3.19 (m, 2H), 2.97 (t, J=9.3 Hz, 2H), 2.80 (t, J=8.4 Hz, 1H), 1.71-1.64 (m, 4H), 1.39-1.23 (m, 16H), 0.88 (t, J=7.2 Hz, 3H), 0.87 (t, J=7.2 Hz, 3H); $^{13}$C NMR (100 MHz, $CDCl_3$): δ 172.2, 171.9, 167.5, 166.2, 165.9, 165.8, 165.5, 165.1, 164.9, 134.0, 133.7, 133.5, 133.4, 133.2, 130.0, 129.9, 129.8, 129.7, 129.7, 129.5, 129.4, 129.3, 129.0, 128.9, 128.8, 128.7, 128.5, 128.4, 71.0, 128.3, 100.9, 95.6, 77.5, 76.9, 71.8, 71.3, 69.8, 69.1, 69.0, 67.6, 62.6, 31.8, 31.7, 29.0, 28.8, 28.7, 25.9, 22.7, 21. 114.2.

<1-4> Synthesis of TSM-E7

TSM-E7 was synthesized in 90% yield according to the general synthesis procedure for the deprotection reaction of Example 1-4. $^1$H NMR (400 MHZ, $CD_3OD$): δ 5.17 (d, J=7.0 Hz, 2H), 4.40 (d, J=8.0 Hz, 2H), 4.30-4.16 (m, 4H), 3.97-3.93 (m, 1H), 3.86-3.85 (d, J=7.0 Hz, 2H), 3.86-3.84-3.77 (m, 2H), 3.72-3.69 (m, 4H), 3.59-3.40 (m, 10H), 3.36-3.28 (m, 4H), 3.19-3.14 (m, 4H), 1.65-1.59 (m, 4H), 1.32-1.19 (m, 16H), 0.78 (t, J=7.2 Hz, 6H); $^{13}$C NMR (100 MHz, $CD_3OD$): δ 173.2, 172.81, 169.0, 104.9, 104.7, 103.0, 81.3, 81.2, 77.7, 76.7, 75.1, 74.8, 74.7, 74.2, 71.5, 68.3, 68.9, 68.7, 62.8, 62.2, 32.0, 33.0, 30.7, 30.5, 30.2, 30.0, 27.1, 27.0, 23.9, 23.7, 14.6, 14.5; HRMS (EI): For $C_{44}H_{78}N_4O_{24}$ [M+Na]$^+$ 1069.4904, found 1069.4908.

<Preparation Example 2> Synthesis of TSM-E8

<2-1> Synthesis of Compound 1b

Compound 1b was synthesized in 45% yield according to Example 1-1. $^1$H NMR (400 MHz, CDCl$_3$): δ 4.41 (t, J=6.6 Hz, 4H), 1.81-1.72 (m, 4H), 1.34-1.27 (m, 20H), 0.86 (t, J=6.9 Hz, 6H); $^{13}$C NMR (100 MHz, CDCl$_3$): δ 172.7, 172.2, 69.6, 32.0, 29.7, 29.6, 28.6, 25.9, 22.8, 14.2.

<2-2> Synthesis of Compound 2b

Compound 2b was synthesized in 89% yield according to Example 1-2. $^1$H NMR (400 MHz, CDCl$_3$): δ 6.41 (d, J=8.0 Hz, 1H), 4.30-4.24 (m, 4H), 4.15-4.12 (m, 4H), 3.90-3.81 (m, 4H), 1.74-1.72 (m, 4H), 1.39-1.27 (m, 20H), 0.87 (t, J=7.0 Hz, 6H); $^{13}$C NMR (100 MHz, CDCl$_3$): δ 172.1, 171.6, 167.9, 68.0, 67.8, 62.8, 53.2, 31.9, 29.1, 28.8, 25.9, 22.7, 14.2.

<2-3> Synthesis of TSM-E8a

TSM-E8a was synthesized in 83% yield according to the general glycosylation reaction procedure of Example 1-3. $^1$H NMR (400 MHZ, CDCl$_3$): δ 8.07-7.95 (m, 16H), 7.89-7.87 (d, J=7.5 Hz, 4H), 7.82-7.80 (d, J=8.2 Hz, 4H), 7.77-7.74 (m, 4H), 7.63-7.21 (m, 42H), 6.08 (t, J=9.2 Hz 2H), 5.77-5.65 (m, 4H), 5.49 (d, J=9.7 Hz, 1H), 5.36-5.30 (m, 2H), 5.18-5.08 (m, 4H), 4.47-4.53 (m, 4H), 4.35-4.10 (m, 12H), 3.76 (d, J=8.3, Hz 2H), 3.24-3.19 (m, 2H), 2.97 (t, J=7.3 Hz, 2H), 2.80 (t, J=8.4 Hz, 1H), 1.71-1.64 (m, 4H), 1.39-1.23 (m, 20H), 0.88 (t, J=7.2 Hz, 3H), 0.87 (t, J=7.2 Hz, 3H); $^{13}$C NMR (100 MHZ, CDCl$_3$): δ 172.2, 171.9, 167.5, 166.2, 165.9, 165.8, 165.5, 165.1, 164.9, 134.0, 133.7, 133.5, 133.4, 133.2, 130.0, 129.9, 129.8, 129.7, 129.7, 129.5, 129.4, 129.3, 129.0, 128.9, 128.8, 128.7, 128.5, 128.4, 71.0, 128.3, 100.9, 95.6, 77.5, 76.9, 71.8, 71.3, 69.8, 69.1, 69.0, 67.6, 62.6, 31.8, 31.7, 29.0, 28.8, 28.7, 25.9, 22.7, 21.1, 14.2.

<2-4> Synthesis of TSM-E8

TSM-E8 was synthesized in 90% yield according to the general synthesis procedure for the deprotection reaction of Example 1-4. $^1$H NMR (400 MHZ, CD$_3$OD): δ 5.17 (d, J=7.0 Hz, 2H), 4.37 (d, J=8.0 Hz, 2H), 4.32-4.21 (m, 4H), 4.00-3.96 (m, 1H), 3.89-3.88 (m, 2H), 3.83-3.79 (m, 2H), 3.75-3.70 (m, 4H), 3.61-3.42 (m, 10H), 3.37-3.30 (m, 4H), 3.20-3.16 (m, 4H), 1.68-1.62 (m, 4H), 1.36-1.22 (m, 20H), 0.88 (t, J=7.2 Hz, 3H), 0.87 (t, J=7.2 Hz, 3H); $^{13}$C NMR (100 MHz, CD$_3$OD): δ 173.2, 172.8, 169.0, 104.9, 104.7, 103.0, 81.3, 81.2, 77.7, 76.7, 75.1, 74.8, 74.7, 74.2, 71.5, 68.3, 68.9, 68.7, 62.8, 62.2, 32.0, 33.0, 33.1, 30.7, 30.5, 30.2, 30.0, 29.9, 27.1, 27.1, 27.0, 23.9, 23.7, 14.6, 14.5; HRMS (FAB$^+$): For $C_{46}H_{82}N_4O_{24}$ [M+Na]+ 1097.5217, found 1097.5220.

<Preparation Example 3> Synthesis of TSM-E9

<3-1> Synthesis of Compound 1c

Compound 1c was synthesized in 50% yield according to Example 1-1. $^1$H NMR (400 MHz, CDCl$_3$): δ 4.41 (t, J=6.6 Hz, 4H), 1.82-1.72 (m, 4H), 1.34-1.27 (m, 24H), 0.88 (t, J=6.9 Hz, 6H); $^{13}$C NMR (100 MHZ, CDCl$_3$): δ 172.7, 172.2, 69.6, 32.0, 29.6, 29.4, 28.6, 25.9, 22.8, 14.2.

<3-2> Synthesis of Compound 2c

Compound 2c was synthesized in 90% yield according to Example 1-2. $^1$H NMR (400 MHz, CDCl$_3$): δ 6.53 (d, J=8.0 Hz, 1H), 4.60-4.24 (m, 4H), 4.16-4.14 (m, 1H), 3.86-3.81 (m, 4H), 1.73-1.71 (m, 4H), 1.38-1.26 (m, 24H), 0.87 (t, J=6.8 Hz, 6H); $^{13}$C NMR (100 MHZ, CDCl$_3$): δ 172.0, 171.4, 167.7, 67.9, 67.7, 62.1, 53.3, 31.9, 29.6, 29.4, 28.8, 25.9, 22.7, 14.1.

<3-3> Synthesis of TSM-E9a

TSM-E9a was synthesized in 85% yield according to the general glycosylation reaction procedure of Example 1-3. $^1$H NMR (400 MHZ, CDCl$_3$): δ 8.07-7.95 (m, 16H), 7.89-7.87 (d, J=7.5 Hz, 4H), 7.82-7.80 (d, J=8.2 Hz, 4H), 7.77-7.74 (m, 4H), 7.63-7.21 (m, 42H), 6.14 (t, J=9.9 Hz, 2H), 5.71-5.66 (m, 4H), 5.52 (d, J=9.5 Hz, 1H), 5.37-5.31 (m, 2H), 5.19-5.10 (m, 4H), 4.46-4.45 (m, 4H), 4.37-4.18 (m, 12H), 3.77 (d, J=6.9 Hz, 2H), 3.27-3.22 (m, 2H), 2.99 (t, J=9.2 Hz, 2H), 2.82 (t, J=8.6 Hz, 1H), 1.71-1.65 (m, 4H), 1.40-1.23 (m, 24H), 0.88 (t, J=7.2 Hz, 3H), 0.87 (t, J=7.2 Hz, 3H); $^{13}$C NMR (100 MHZ, CDCl$_3$): δ 172.2, 171.9, 167.5, 166.2, 165.9, 165.8, 165.5, 165.1, 164.9, 134.0, 133.7, 133.5, 133.4, 133.2, 130.0, 129.9, 129.8, 129.7, 129.7, 129.5, 129.4, 129.3, 129.0, 128.9, 128.8, 128.7, 128.5, 128.4, 71.0, 128.3, 100.9, 95.6, 74.4, 73.2, 72.2, 71.1, 69.8, 69.1, 69.0, 67.9, 67.6, 63.2, 62.6, 48.2, 31.9, 29.6, 29.5, 29.3, 28.8, 28.7, 25.9, 22.7, 21.1, 14.2.

<3-4> Synthesis of TSM-E9

TSM-E9 was synthesized in 90% yield according to the general synthesis procedure for the deprotection reaction of Example 1-4. $^1$H NMR (400 MHZ, CD$_3$OD): δ 5.17 (d, J=7.0 Hz, 2H), 4.37 (d, J=8.0 Hz, 2H), 4.32-4.21 (m, 4H), 4.00-3.96 (m, 1H), 3.89-3.88 (m, 2H), 3.83-3.79 (m, 2H), 3.75-3.70 (m, 4H), 3.61-3.42 (m, 10H), 3.37-3.30 (m, 4H), 3.20-3.16 (m, 4H), 1.68-1.62 (m, 4H), 1.36-1.22 (m, 20H), 0.88 (t, J=7.2 Hz, 3H), 0.87 (t, J=7.2 Hz, 3H); $^{13}$C NMR (100 MHZ, CD$_3$OD): δ 173.2, 172.8, 169.0, 104.9, 104.7, 103.0, 81.3, 81.2, 77.7, 76.7, 75.1, 74.8, 74.7, 74.2, 71.5, 68.3, 68.9, 68.7, 62.8, 62.2, 32.0, 33.0, 33.1, 30.7, 30.5, 30.2, 30.0, 29.9, 27.1, 27.1, 27.0, 23.9, 23.7, 14.6, 14.5; HRMS (FAB$^+$): For $C_{46}H_{82}N_4O_{24}$ [M+Na]$^+$ 1097.5217, found 1097.5220.

<Preparation Example 4> Synthesis of TSM-E10

<4-1> Synthesis of Compound 1d

Compound 1-d was synthesized in 50% yield according to Example 1-1. $^1$H NMR (400 MHz, CDCl$_3$): δ 4.41 (t, J=6.6 Hz, 4H), 1.81-1.77 (m, 4H), 1.34-1.27 (m, 28H), 0.88 (t, J=6.9 Hz, 6H); $^{13}$C NMR (100 MHZ, CDCl$_3$): δ 172.7, 172.2, 69.6, 64.3, 32.0, 29.7, 29.6, 29.4, 28.6, 25.9, 22.8, 14.2.

<4-2> Synthesis of Compound 2d

Compound 2d was synthesized in 90% yield according to Example 1-2. $^1$H NMR (400 MHz, CDCl$_3$): δ 6.53 (d, J=8.0 Hz, 1H), 4.28-4.27 (m, 4H), 4.16-4.14 (m, 1H), 3.86-3.81 (m, 4H), 1.72-1.73 (m, 4H), 1.38-1.26 (m, 28H), 0.88 (t, J=7.0 Hz, 6H); $^{13}$C NMR (100 MHz, CDCl$_3$): δ 171.9, 171.4, 167.7, 67.9, 67.7, 62.1, 53.3, 31.9, 29.6, 29.4, 28.8, 25.9, 22.7, 14.1.

<4-3> Synthesis of TSM-E10a

TSM-E10a was synthesized in 82% yield according to the general glycosylation reaction procedure of Example 1-3. $^1$H NMR (400 MHZ, CDCl$_3$): δ 8.06-7.93 (m, 16H), 7.88-7.86 (d, J=7.4 Hz, 4H), 7.81-7.79 (d, J=7.2 Hz, 4H), 7.76-7.72 (m, 4H), 7.63-7.22 (m, 42H), 6.12 (t, J=10.0 Hz, 2H), 5.71-5.60 (m, 4H), 5.49 (d, J=7.4 Hz, 2H), 5.35-5.29 (m, 2H), 5.16-5.08 (m, 4H), 4.61-4.50 (m, 4H), 4.39-4.17 (m, 12H), 3.76-3.74 (d, J=8.0 Hz, 2H), 3.25-3.19 (m, 2H), 2.97 (t, J=9.4 Hz, 2H), 2.80 (t, J=8.3 Hz, 1H), 1.70-1.66 (m, 4H), 1.26-1.23 (m, 28H), 0.88 (t, J=7.2 Hz, 3H), 0.87 (t, J=7.2 Hz, 3H); $^{13}$C NMR (100 MHz, CDCl$_3$): δ 172.3, 171.9, 166.2, 165.9, 165.6, 165.1, 164.9, 134.1, 133.7, 133.5, 133.4, 133.2, 130.0, 129.8, 129.7, 129.7, 129.5, 129.4, 129.3, 129.0, 128.9, 128.8, 128.7, 128.5, 128.4, 100.4, 95.7, 71.0, 71.4, 69.8, 69.1, 68.0, 67.7, 62.6, 32.0, 29.7, 29.4, 28.9, 28.8, 26.0, 22.8, 21.2, 14.3, 14.2.

<4-4> Synthesis of TSM-E10

TSM-E10 was synthesized in 91% yield according to the general synthesis procedure for the deprotection reaction of Example 1-4. $^1$H NMR (400 MHZ, CD$_3$OD): δ 5.18 (d, J=7.0 Hz, 2H), 4.35 (d, J=8.0 Hz, 2H), 4.22-4.26 (m, 4H), 3.97-3.93 (m, 1H), 3.87-3.86 (m, 2H), 3.80-3.77 (m, 2H), 3.73-3.70 (m, 4H), 3.58-3.57 (m, 10H), 3.43-3.31 (m, 4H), 3.20-3.3.14 (m, 4H), 1.65-1.59 (m, 4H), 1.32-1.17 (m, 28H), 0.78 (t, J=7.0 Hz, 6H); $^{13}$C NMR (100 MHZ, CD$_3$OD): δ 173.1, 169.0, 105.0, 104.8, 103.1, 81.4, 77.8, 76.7, 75.2, 74.7, 74.2, 71.6, 69.0, 68.8, 62.8, 62.2, 50.7, 33.2, 30.6, 30.5, 30.0, 27.1, 27.1, 23.9, 14.6; HRMS (FAB$^+$): For C$_{50}$H$_{90}$N$_4$O$_{24}$ [M+Na]$^+$ 1153.5843, found 1153.5839.

<Preparation Example 5> Synthesis of TSM-E11

<5-1> Synthesis of Compound 1e

Compound 1e was synthesized in 48% yield according to Example 1-1. $^1$H NMR (400 MHz, CDCl$_3$): δ 4.41 (t, J=6.6 Hz, 4H), 1.82-1.72 (m, 4H), 1.34-1.27 (m, 32H), 0.88 (t, J=6.9 Hz, 6H); $^{13}$C NMR (100 MHz, CDCl$_3$): δ 172.7, 172.2, 69.6, 32.0, 29.7, 29.6, 29.6, 29.3, 28.5, 25.8, 22.8, 14.2.

<5-2> Synthesis of Compound 2e

Compound 2e was synthesized in 88% yield according to Example 1-2. $^1$H NMR (400 MHz, CDCl$_3$): δ 6.19 (d, J=8.0 Hz, 1H), 4.32-4.26 (m, 4H), 4.16-4.14 (m, 1H), 3.93-3.85 (m, 4H), 1.74-1.73 (m, 4H), 1.36-1.26 (m, 32H), 0.88 (t, J=7.0 Hz, 6H); $^{13}$C NMR (100 MHZ, CDCl$_3$): 172.1, 171.6, 168.0, 68.0, 67.9, 63.5, 53.2, 32.1, 29.8, 28.9, 26.0, 22.9, 14.3.

<5-3> Synthesis of TSM-E11a

TSM-E11a was synthesized in 84% yield according to the general glycosylation reaction procedure of Example 1-3. $^1$H NMR (400 MHZ, CDCl$_3$): δ 8.05-7.93 (m, 16H), 7.88-7.86 (d, J=7.2 Hz, 4H), 7.81-7.79 (d, J=7.2 Hz, 4H), 7.75-7.72 (m, 4H), 7.63-7.22 (m, 42H), 6.11 (t, J=10.0 Hz, 2H), 5.68-5.61 (m, 4H), 5.48 (d, J=7.4 Hz, 2H), 5.35-5.28 (m, 2H), 5.17-5.14 (m, 4H), 4.66-4.52 (m, 4H), 4.33-4.10 (m, 12H), 3.74 (d, J=7.8 Hz, 2H), 3.25-3.17 (m, 2H), 2.93 (t, J=9.5 Hz, 2H), 2.79 (t, J=8.2 Hz, 1H), 1.72-1.62 (m, 4H), 1.44-1.29 (m, 32H), 0.89 (t, J=7.0 Hz, 6H); $^{13}$C NMR (100 MHz, CDCl$_3$): δ 172.3, 171.9, 166.2, 165.9, 165.6, 165.1, 164.9, 134.1, 133.7, 133.5, 133.4, 133.2, 130.0, 129.8, 129.7, 129.7, 129.5, 129.4, 129.3, 129.0, 128.9, 128.8, 128.7, 128.5, 128.4, 100.4, 95.7, 71.0, 71.4, 69.8, 69.1, 68.0, 67.7, 62.6, 32.0, 29.7, 29.4, 28.9, 28.9, 26.0, 22.8, 21.2, 14.3, 14.2.

<5-4> Synthesis of TSM-E11

TSM-E11 was synthesized in 91% yield according to the general synthesis procedure for the deprotection reaction of Example 1-4. $^1$H NMR (400 MHZ, CD$_3$OD): δ 5.16 (d, J=7.0 Hz, 2H), 4.39 (d, J=8.0 Hz, 2H), 4.29-4.16 (m, 4H), 3.96-3.92 (m, 1H), 3.85-3.84 (m, 2H), 3.80-3.76 (m, 2H), 3.71-3.69 (m, 4H), 3.56-3.39 (m, 10H), 3.34-3.26 (m, 4H), 3.18-3.3.12 (m, 4H), 1.64-1.58 (m, 4H), 1.32-1.17 (m, 32H), 0.77 (t, J=7.0 Hz, 6H); $^{13}$C NMR (100 MHZ, CD$_3$OD): δ 173.1, 169.0, 105.0, 104.8, 103.1, 81.4, 77.8, 76.7, 75.2, 74.7, 74.2, 71.6, 69.0, 68.8, 62.8, 62.2, 50.7, 33.2, 30.6, 30.5, 30.0, 27.1, 27.1, 23.9, 14.6; HRMS (FAB$^+$): For C$_{52}$H$_{94}$N$_4$O$_{24}$ [M+Na]$^+$ 1181.6159, found 1181.6162.

<Preparation Example 6> Synthesis of TSM-T7

<6-1> Synthesis of Compound 3a

Compound 3a was synthesized in 85% yield according to Example 1-1. $^1$H NMR (400 MHz, CDCl$_3$): δ 4.42 (t, J=6.6 Hz, 4H), 1.81-1.77 (m, 4H), 1.44-1.30 (m, 16H), 0.89 (t, J=6.9 Hz, 6H); $^{13}$C NMR (100 MHz, CDCl$_3$): δ 172.7, 172.2, 69.6, 32.0, 29.6, 28.6, 25.9, 22.8, 14.2.

<6-2> Synthesis of Compound 4a

Compound 4a was synthesized in 90% yield according to Example 1-2. $^1$H NMR (400 MHz, CDCl$_3$): δ 6.27 (d, J=7.9 Hz, 1H), 4.14-4.09 (m, 4H), 3.90-3.81 (m, 4H), 3.04-3.01 (m, 4H), 1.68-1.65 (m, 4H), 1.40-1.26 (m, 16H), 0.88 (t, J=7.1 Hz, 6H); $^{13}$C NMR (100 MHZ, CDCl$_3$): δ 180.5, 179.7, 162.5, 63.2, 32.0, 30.4, 30.2, 29.6, 29.5, 29.4, 29.1, 22.8, 14.2.

<6-3> Synthesis of TSM-T7a

TSM-T7a was synthesized in 85% yield according to the general glycosylation reaction procedure of Example 1-3. $^1$H NMR (400 MHZ, CDCl$_3$): δ 8.27-7.91 (m, 12H), 7.90 (d, J=7.6 Hz, 4H), 7.83 (d, J=7.6 Hz, 4H), 7.78-7.75 (m, 4H), 7.69-7.19 (m, 42H), 6.17 (t, J=10.0 Hz, 2H), 5.74-5.66 (m, 4H), 5.48-5.34 (m, 4H), 5.16-5.13 (m, 4H), 4.72-4.61 (m, 4H), 4.37-4.23 (m, 10H), 3.79-3.76 (m 2H), 3.33-3.24 (m, 2H), 3.05-2.85 (m, 6H), 1.66-1.60 (m, 4H), 1.39-1.23 (m, 16H), 0.87 (t, J=6.9 Hz, 6H); $^{13}$C NMR (100 MHz, CDCl$_3$): δ 180.4, 179.7, 166.1, 165.8, 165.7, 165.4, 165.0, 164.8, 162.0, 133.4, 133.2, 129.9, 129.8, 129.7, 129.6, 129.4, 129.3, 129.2, 128.2, 128.9, 128.7, 128.6, 128.4, 128.3, 100.8, 95.6, 74.4, 71.9, 71.3, 69.7, 69.1, 68.8, 63.1, 62.5, 31.7, 30.1, 29.9, 29.3, 28.8, 28.7, 22.6, 14.1.

<6-4> Synthesis of TSM-T7

TSM-T7 was synthesized in 90% yield according to the general synthesis procedure for the deprotection reaction of Example 1-4. $^1$H NMR (400 MHZ, CD$_3$OD): δ 5.18 (d, J=7.0 Hz, 2H), 4.38-4.36 (m, 3H), 3.93-3.90 (m, 1H), 3.84-3.76 (m, 4H), 3.72-3.66 (m, 4H), 3.55-3.39 (m, 10H), 3.33-3.26 (m, 4H), 3.17-3.12 (m, 6H), 2.94 (t, J=8.0 Hz, 4H), 1.57-1.53 (m, 4H), 1.31-1.18 (m, 16H), 0.77 (t, J=6.8 Hz, 6H); $^{13}$C NMR (100 MHZ, CD$_3$OD): δ 181.7, 180.9, 164.0, 105.3, 105.1, 103.4, 81.8, 81.6, 78.1, 77.1, 75.5, 75.2, 75.1, 75.0, 74.6, 71.9, 69.8, 69.6, 63.2, 62.6, 62.4, 52.2, 33.5, 31.5, 31.3, 31.2, 30.9, 30.5, 30.4, 24.2, 15.0; HRMS (FAB$^+$): For C$_{44}$H$_{78}$N$_4$O$_{22}$S$_2$ [M+Na]$^+$ 1101.4447, found 1101.4453.

<Preparation Example 7> Synthesis of TSM-T8

<7-1> Synthesis of Compound 3b

Compound 3b was synthesized in 84% yield according to Example 1-1. $^1$H NMR (400 MHz, CDCl$_3$): δ 4.42 (t, J=6.6 Hz, 4H), 1.81-1.77 (m, 4H), 1.44-1.30 (m, 20H), 0.89 (t, J=6.9 Hz, 6H); $^{13}$C NMR (100 MHz, CDCl$_3$): δ 172.7, 172.2, 69.6, 32.0, 29.7, 29.6, 28.6, 25.9, 22.8, 14.2.

<7-2> Synthesis of Compound 4b

Compound 4b was synthesized in 92% yield according to Example 1-2. $^1$H NMR (400 MHz, CDCl$_3$): δ 6.26 (d, J=7.8 Hz, 1H), 4.11-4.09 (m, 4H), 3.92-3.83 (m, 4H), 3.05-3.01 (m, 4H), 1.68-1.65 (m, 4H), 1.39-1.27 (m, 20H), 0.88 (t, J=7.0 Hz, 6H); $^{13}$C NMR (100 MHZ, CDCl$_3$): δ 180.5, 179.7, 162.5, 63.2, 32.0, 30.4, 30.2, 29.6, 29.5, 29.4, 29.1, 22.8, 14.2.

<7-3> Synthesis of TSM-T8a

TSM-T8a was synthesized in 85% yield according to the general glycosylation reaction procedure of Example 1-3.

¹H NMR (400 MHZ, CDCl₃): δ 8.27-7.91 (m, 12H), 7.90 (d, J=7.6 Hz, 4H), 7.83 (d, J=7.6 Hz, 4H), 7.78-7.75 (m, 4H), 7.69-7.19 (m, 42H), 6.17 (t, J=10.0 Hz, 2H), 5.74-5.66 (m, 4H), 5.48-5.34 (m, 4H), 5.16-5.13 (m, 4H), 4.72-4.61 (m, 4H), 4.37-4.23 (m, 10H), 3.79-3.76 (m 2H), 3.33-3.24 (m, 2H), 3.05-2.85 (m, 6H), 1.66-1.60 (m, 4H), 1.39-1.23 (m, 20H), 0.87 (t, J=6.9 Hz, 6H); ¹³C NMR (100 MHz, CDCl₃): δ 180.4, 179.7, 166.1, 165.8, 165.7, 165.4, 165.0, 164.8, 162.0, 133.4, 133.2, 129.9, 129.8, 129.7, 129.6, 129.4, 129.3, 129.2, 128.2, 128.9, 128.7, 128.6, 128.4, 128.3, 100.8, 95.6, 74.4, 71.9, 71.3, 69.7, 69.1, 68.8, 63.1, 62.5, 31.7, 30.1, 29.9, 29.3, 28.8, 28.7, 22.6, 14.1.

<7-4> Synthesis of TSM-T8

TSM-T8 was synthesized in 90% yield according to the general synthesis procedure for the deprotection reaction of Example 1-4. ¹H NMR (400 MHZ, CD₃OD): δ 5.17 (d, J=7.0 Hz, 2H), 4.39-4.35 (m, 3H), 3.93-3.89 (m, 1H), 3.83-3.76 (m, 4H), 3.69-3.67 (m, 4H), 3.54-3.39 (m, 10H), 3.32-3.26 (m, 4H), 3.16-3.10 (m, 6H), 2.94 (t, J=8.0 Hz, 4H), 1.58-1.52 (m, 4H), 1.28-1.16 (m, 20H), 0.75 (t, J=7.2 Hz, 6H); ¹³C NMR (100 MHZ, CD₃OD): δ 181.1, 180.8, 163.5, 105.3, 104.8, 104.6 102.9, 81.3, 81.2, 77.7, 76.6, 75.0, 74.8, 74.6, 74.1, 71.4, 69.3, 69.1, 62.7, 62.1, 52.2, 33.0, 31.0, 30.8, 30.6, 30.4, 30.3, 30.0, 29.9, 23.7, 14.5; HRMS (FAB⁺): For $C_{46}H_{82}N_4O_{22}S_2$ [M+Na]⁺ 1129.4760, found 1129.4757.

<Preparation Example 8> Synthesis of TSM-T9

<8-1> Synthesis of Compound 3c

Compound 3c was synthesized in 86% yield according to Example 1-1. ¹H NMR (400 MHz, CDCl₃): δ 4.42 (t, J=6.6 Hz, 4H), 1.81-1.78 (m, 4H), 1.43-1.30 (m, 24H), 0.89 (t, J=6.9 Hz, 6H); ¹³C NMR (100 MHZ, CDCl₃): δ 172.7, 172.2, 69.6, 32.0, 29.6, 29.4, 28.6, 25.9, 22.8, 14.2.

<8-2> Synthesis of Compound 4c

Compound 4c was synthesized in 85% yield according to Example 1-2. ¹H NMR (400 MHz, CDCl₃): δ 6.36 (d, J=8.0 Hz, 1H), 4.11-4.09 (m, 4H), 3.90-3.81 (m, 4H), 3.03-3.01 (m, 4H), 1.68-1.65 (m, 4H), 1.39-1.27 (m, 24H), 0.88 (t, J=7.0 Hz, 6H); ¹³C NMR (100 MHZ, CDCl₃): δ 180.4, 179.6, 162.3, 62.6, 32.0, 30.4, 30.2, 29.7, 29.6, 29.5, 29.4, 29.1, 22.8, 14.2.

<8-3> Synthesis of TSM-T9a

TSM-T9a was synthesized in 86% yield according to the general synthesis procedure for the deprotection reaction of Example 1-3. ¹H NMR (400 MHZ, CDCl₃): δ 8.27-7.91 (m, 12H), 7.90 (d, J=7.6 Hz, 4H), 7.83 (d, J=7.6 Hz, 4H), 7.78-7.75 (m, 4H), 7.69-7.19 (m, 42H), 6.15 (t, J=10.0 Hz, 2H), 5.72-5.65 (m, 4H), 5.41-5.34 (m, 4H), 5.20-5.11 (m, 4H), 4.66-4.59 (m, 4H), 4.37-4.20 (m, 10H), 3.77-3.74 (m 2H), 3.28-3.23 (m, 2H), 3.05-2.95 (m, 6H), 1.65-1.59 (m, 4H), 1.30-1.21 (m, 24H), 0.87 (t, J=7.0 Hz, 6H); ¹³C NMR (100 MHz, CDCl₃): δ 180.4, 179.7, 166.1, 165.8, 165.7, 165.4, 165.0, 164.8, 162.0, 133.4, 133.2, 129.9, 129.8, 129.7, 129.6, 129.4, 129.3, 129.2, 128.2, 128.9, 128.7, 128.6, 128.4, 128.3, 100.8, 95.6, 74.4, 71.9, 71.3, 69.8, 69.1, 68.9, 63.2, 62.5, 32.0, 31.9, 30.2, 30.0, 29.6, 29.5, 29.3, 29.2, 28.9, 28.8, 28.7, 22.7, 14.2.

<8-4> Synthesis of TSM-T9

TSM-T9 was synthesized in 93% yield according to the general synthesis procedure for the deprotection reaction of Example 1-4. ¹H NMR (400 MHZ, CD₃OD): δ 5.16 (d, J=7.0 Hz, 2H), 4.34-4.09 (m, 3H), 3.94-3.90 (m, 1H), 3.83-3.76 (m, 4H), 3.72-3.69 (m, 4H), 3.57-3.39 (m, 10H), 3.27-3.26 (m, 4H), 3.17-3.12 (m, 6H), 2.93 (t, J=8.0 Hz, 4H), 1.60-1.50 (m, 4H), 1.30-1.16 (m, 24H), 0.76 (t, J=7.2 Hz, 6H); ¹³C NMR (100 MHZ, CD₃OD): δ 181.7, 180.9, 164.0, 105.3, 105.1, 103.4, 81.8, 81.6, 78.1, 77.1, 75.5, 75.2, 75.0, 74.6, 71.9, 69.8, 69.6, 63.2, 62.6, 52.2, 33.5, 35.1, 31.3, 31.2. 30.9, 30.5, 30.1, 24.2, 14.9; HRMS (FAB⁺): For $C_{48}H_{86}N_4O_{22}S_2$ [M+Na]⁺ 1157.5073, found 1157.5068.

<Preparation Example 9> Synthesis of TSM-T10

<9-1> Synthesis of Compound 3d Compound 3d was synthesized in 83% yield according to Example 1-1. ¹H NMR (400 MHz, CDCl₃): δ 4.42 (t, J=6.6 Hz, 4H), 1.81-1.78 (m, 4H), 1.43-1.30 (m, 28H), 0.89 (t, J=6.9 Hz, 6H); ¹³C NMR (100 MHz, CDCl₃): δ 172.7, 172.2, 69.6, 64.3, 32.0, 29.7, 29.6, 29.4, 28.6, 25.9, 22.8, 14.2.

<9-2> Synthesis of Compound 4d

Compound 4d was synthesized in 85% yield according to Example 1-2. ¹H NMR (400 MHz, CDCl₃): δ 6.0 (d, J=8.0 Hz, 1H), 4.10-4.08 (m, 4H), 3.91-3.89 (m, 4H), 3.05-3.01 (m, 4H), 1.68-1.65 (m, 4H), 1.39-1.27 (m, 28H), 0.88 (t, J=7.0 Hz, 6H); ¹³C NMR (100 MHZ, CDCl₃): δ 180.5, 179.7, 162.6, 63.2, 34.2, 32.1, 32.0, 30.4, 30.2, 29.7, 29.6, 29.5, 29.4, 29.2, 29.1, 28.5, 24.8, 22.8, 14.2.

<9-3> Synthesis of TSM-T10a

TSM-T10a was synthesized in 85% yield according to the general glycosylation reaction procedure of Example 1-3. ¹H NMR (400 MHZ, CDCl₃): δ 8.27-7.91 (m, 12H), 7.90 (d, J=7.6 Hz, 4H), 7.83 (d, J=7.6 Hz, 4H), 7.78-7.75 (m, 4H), 7.69-7.19 (m, 42H), 6.15 (t, J=10.0 Hz, 2H), 5.72-5.65 (m, 4H), 5.41-5.34 (m, 4H), 5.20-5.11 (m, 4H), 4.66-4.59 (m, 4H), 4.37-4.20 (m, 10H), 3.77-3.74 (m 2H), 3.28-3.23 (m, 2H), 3.05-2.95 (m, 6H), 1.65-1.59 (m, 4H), 1.30-1.21 (m, 28H), 0.87 (t, J=7.0 Hz, 6H); ¹³C NMR (100 MHz, CDCl₃): δ 180.5, 179.8, 166.1, 165.8, 165.7, 165.4, 165.0, 164.8, 162.0, 133.4, 133.2, 129.9, 129.8, 129.7, 129.6, 129.4, 129.3, 129.2, 128.2, 128.9, 128.7, 128.6, 128.4, 128.3, 100.8, 95.6, 74.5, 72.5, 71.9, 71.3, 69.8, 69.1, 69.0, 63.2, 62.6, 32.0, 31.9, 30.3, 30.1, 30.0, 29.7, 29.4, 29.5, 29.3, 29.2, 28.9, 28.8, 28.7, 22.8, 14.2.

<9-4> Synthesis of TSM-T10

TSM-T10 was synthesized in 92% yield according to the general synthesis procedure for the deprotection reaction of Example 1-4. ¹H NMR (400 MHZ, CD₃OD): δ 5.17 (d, J=7.0 Hz, 2H), 4.34-4.30 (m, 3H), 3.94-3.90 (m, 1H), 3.83-3.76 (m, 4H), 3.72-3.69 (m, 4H), 3.57-3.39 (m, 10H), 3.27-3.26 (m, 4H), 3.17-3.12 (m, 6H), 2.93 (t, J=8.0 Hz, 4H), 1.60-1.50 (m, 4H), 1.30-1.16 (m, 28H), 0.76 (t, J=7.2 Hz, 6H); ¹³C NMR (100 MHZ, CD₃OD): δ 181.6, 180.8, 163.7, 104.9, 104.7, 103.0, 81.4, 77.7, 76.7, 75.1, 74.9, 74.7, 74.2, 71.5, 62.8, 62.2, 33.2, 30.8, 30.6, 30.5, 30.1, 23.9, 14.6; HRMS (FAB⁺): For $C_{50}H_{90}N_4O_{22}S_2$ [M+Na]⁺ 1185.5386, found 1185.5392.

<Preparation Example 10> Synthesis of TSM-T11

<10-1> Synthesis of Compound 3e

Compound 3e was synthesized in 82% yield according to Example 1-1. ¹H NMR (400 MHz, CDCl₃): δ 4.42 (t, J=6.8 Hz, 4H), 1.81-1.78 (m, 4H), 1.43-1.30 (m, 32H), 0.89 (t, J=6.9 Hz, 6H); ¹³C NMR (100 MHZ, CDCl₃): δ 172.7, 172.2, 69.6, 32.0, 29.7, 29.6, 29.6, 29.3, 28.5, 25.8, 22.8, 14.2.

<10-2> Synthesis of Compound 4e

Compound 4e was synthesized in 84% yield according to Example 1-2. ¹H NMR (400 MHz, CDCl₃): δ 6.38 (d, J=8.1 Hz, 1H), 4.10-4.08 (m, 4H), 3.91-3.89 (m, 4H), 3.05-3.01 (m, 4H), 1.68-1.65 (m, 4H), 1.39-1.27 (m, 32H), 0.88 (t, J=7.0 Hz, 6H); ¹³C NMR (100 MHZ, CDCl₃): δ 180.5, 179.7, 162.6, 63.2, 34.2, 32.1, 32.0, 30.4, 30.2, 29.7, 29.6, 29.5, 29.4, 29.2, 29.1, 28.5, 24.8, 22.8, 14.2.

<10-3> Synthesis of TSM-T11a

TSM-T11a was synthesized in 85% yield according to the general glycosylation reaction procedure of Example 1-3. $^1$H NMR (400 MHZ, CDCl$_3$): δ 8.27-7.91 (m, 12H), 7.90 (d, J=7.6 Hz, 4H), 7.83 (d, J=7.6 Hz, 4H), 7.78-7.75 (m, 4H), 7.69-7.19 (m, 42H), 6.15 (t, J=10.0 Hz, 2H), 5.72-5.65 (m, 4H), 5.41-5.34 (m, 4H), 5.20-5.11 (m, 4H), 4.66-4.59 (m, 4H), 4.37-4.20 (m, 10H), 3.77-3.74 (m 2H), 3.28-3.23 (m, 2H), 3.05-2.95 (m, 6H), 1.65-1.59 (m, 4H), 1.30-1.21 (m, 32H), 0.87 (t, J=7.0 Hz, 6H); $^{13}$C NMR (100 MHz, CDCl$_3$): δ 180.5, 179.8, 166.1, 165.8, 165.7, 165.4, 165.0, 164.8, 162.0, 133.4, 133.2, 129.9, 129.8, 129.7, 129.6, 129.4, 129.3, 129.2, 128.2, 128.9, 128.7, 128.6, 128.4, 128.3, 100.8, 95.6, 74.5, 72.3, 71.9, 71.3, 69.8, 69.1, 69.0, 68.9, 63.2, 62.6, 32.0, 31.9, 30.3, 30.1, 30.0, 29.7, 29.4, 29.5, 29.3, 29.2, 28.9, 28.8, 28.7, 22.8, 14.2.

<10-4> Synthesis of TSM-T11

TSM-T11 was synthesized in 90% yield according to the general synthesis procedure for the deprotection reaction of Example 1-4. $^1$H NMR (400 MHZ, CD$_3$OD): δ 5.16 (d, J=7.0 Hz, 2H), 4.39-4.34 (m, 3H), 3.95-3.91 (m, 1H), 3.82-3.77 (m, 4H), 3.72-3.69 (m, 4H), 3.57-3.40 (m, 10H), 3.35-3.29 (m, 4H), 3.18-3.14 (m, 6H), 2.95 (t, J=8.0 Hz, 4H), 1.62-1.52 (m, 4H), 1.30-1.17 (m, 32H), 0.78 (t, J=7.2 Hz, 6H); $^{13}$C NMR (100 MHZ, CD$_3$OD): δ 180.5, 162.9, 104.6, 103.0, 81.3, 77.9, 76.7, 75.1, 74.8, 74.7, 74.2, 71.5, 69.1, 62.8, 62.2, 31.2, 31.1, 31.0, 30.9, 30.8, 30.6, 30.5, 30.1, 23.9, 14.6; HRMS (FAB$^+$): For C$_{52}$H$_{94}$N$_4$O$_{22}$S$_2$ [M+Na]$^+$ 1213.5699, found 1213.5702.

<Example 2> Synthesis Method of TTGs

Figure 2:
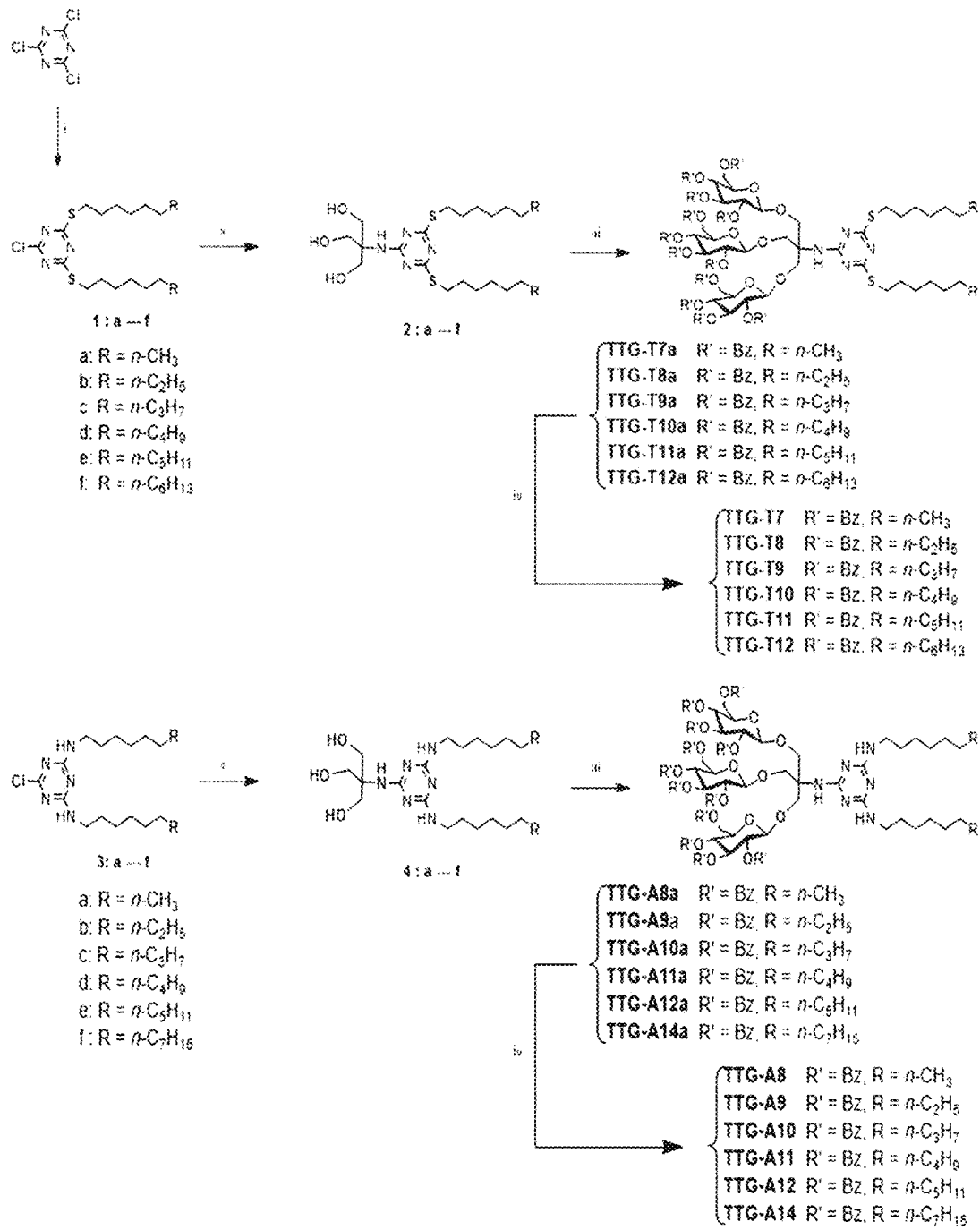
FIG. 2 is a view illustrating a synthesis scheme of TTGs according to Example 2 of the present invention.

FIG. 2 illustrates the synthesis scheme of TTGs. 20 types of compounds of TTGs were synthesized by the following synthesis methods of <2-1> to <2-4>.

<2-1> General Procedure for the Synthesis of 2-chloro-4,6-dialkylated-1,3,5-triazine (Step i of FIG. 2)

A mixture of 2,4,6-trichloro-1,3,5-triazine (3.01 mmol) and NaHCO$_3$ (7.26 mmol) was stirred in acetone (10 mL) for 10 minutes. Each thiol (RSH) (6.0 mmol) or alkyl amine dissolved in acetone was added dropwise for 30 minutes. The resulting reaction mixture was kept at room temperature for 1 hr. The reaction mixture was extracted with CHCl$_3$ and water, and the organic layer was dried over anhydrous Na$_2$SO$_4$. The oily residue obtained after removal of solvent was subjected to column chromatography purification to obtain target Compound 1 or 3.

<2-2> General Synthesis Procedure for the Coupling Reactions of the Resulting Dialkylated Triazine Derivatives with 2-amino-1,3-propanediol (step ii of FIG. 2)

To a dry flask solution of 2-chloro-4,6-dialkylated-1,3,5-triazine (1.00 g, 5.42 mmol) dissolved in THF (50 mL), tris(hydroxymethyl)aminomethane (1.5 equiv.) and diisopropylethylamine (DIPEA) were added under nitrogen. After the addition, the temperature was gradually increased to 100° C., and the mixture was further stirred for 34 hours. The reaction mixture was diluted with water and then extracted with ethyl acetate. The organic layer was washed 1.0 M HCl and brine and dried over anhydrous Na$_2$SO$_4$. After concentration of the ethyl acetate solution, the residue was purified by flash column chromatography (EtOAc/hexane) to obtain desired target Compound 2 or 4.

<2-3> General Synthesis Procedure for Glycosylation Reaction (Step iii of FIG. 2)

This reaction was performed according to the synthesis method (Nat. Methods 2010, 7, 1003.) of Chae, P. S. et al. with some modifications. Briefly, a mixture of a dialkylated tri-ol derivative (1 equiv., 250 mg), AgOTf (2.4 equiv.), 2,4,6-collidine (1 equiv.) in anhydrous CH$_2$Cl$_2$ (40 mL) was stirred at −45° C. Then, perbenzoylated maltosylbromide (2.4 equiv.) dissolved in CH$_2$Cl$_2$ (10 mL) was added dropwise over 0.5 hr into this suspension. The reaction proceeded with continuous stirring at −45° C. for 30 minutes. Then, the reaction mixture was warmed to 0° C. and stirring was continued for 1 hour. After completion of the reaction (as detected by TLC), pyridine (1.0 mL) was added to the reaction mixture. The reaction mixture was diluted with CH$_2$Cl$_2$ (40 mL) before being filtered over Celite. The filtrate was washed successively with a 1.0 M aqueous Na$_2$S$_2$O$_3$ solution (40 mL), a 0.1 M aqueous HCl solution (40 mL), and brine (2×40 mL). Then, the organic layer was dried with anhydrous Na$_2$SO$_4$ and the solvent was removed by rotary evaporation. The resulting residue was purified by silica gel column chromatography (EtOAc/hexane) to obtain the glycosylated target compound.

<2-4> General Synthesis Procedure for Deprotection Reaction (Step iv of FIG. 2)

This reaction followed the synthesis method (Nat. Methods 2010, 7, 1003.) of Chae, P. S. aureus et al. The de-O-benzoylation was performed under Zemplen's condition. An O-protected compound was dissolved in anhydrous CH$_2$Cl$_2$ and then MeOH was added slowly thereto until persistent precipitation appeared. A methanolic solution of 0.5 M NaOMe was added to the reaction mixture such that the final concentration of NaOMe was 0.05 M. The reaction mixture was stirred for 14 hr at room temperature. After completion of the reaction, the reaction mixture was neutralized using Amberlite IR-120 (H$^+$ form) resin. The resin was removed by filtration and washed with MeOH and the solvent was removed from the filtrate in vacuo. The residue was purified by silica gel column chromatography (CH$_2$Cl$_2$/MeOH) to obtain the target compound.

<Preparation Example 11> Synthesis of TTG-T7

<11-1> Synthesis of Compound 1a

Compound 1a was synthesized in 82% yield according to Example 2-1. $^1$H NMR (400 MHz, CDCl$_3$): δ 4.42 (t, J=6.6 Hz, 4H), 1.81-1.77 (m, 4H), 1.44-1.30 (m, 16H), 0.89 (t, J=6.9 Hz, 6H); $^{13}$C NMR (100 MHZ, CDCl$_3$): δ 172.7, 172.2, 69.6, 32.0, 29.7, 29.6, 28.6, 25.9, 22.8, 14.2.

<11-2> Synthesis of Compound 2a

Compound 2a was synthesized in 80% yield according to Example 2-2. $^1$H NMR (400 MHz, CDCl$_3$): δ 5.07 (b, 3H), 3.69 (s, 6H), 3.04-3.01 (m, 4H), 1.67-1.66 (m, 4H), 1.39-1.28 (m, 16H), 0.88 (t, J=7.04 Hz, 6H) $^{13}$C NMR (100 MHz, CDCl$_3$): δ 180.5, 179.7, 162.5, 63.2, 32.0, 30.4, 30.2, 29.6, 29.5, 29.4, 29.1, 22.8, 14.2.

<11-3> Synthesis of TTG-T7a

TTG-T7a was synthesized in 85% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8 Hz 6H), 7.71-7.26 (m, 46H), 5.97 (s, 1H), 5.60 (t, J=8 Hz, 3H), 5.44 (t, J=12 Hz, 3H), 5.29-5.2 (m, 4H), 4.50-4.37 (m, 8H), 4.10-3.90 (m, 4H), 3.57-3.50 (m, 5H), 2.94-2.90 (m 4H), 1.59-1.55 (m, 4H), 1.26-1.21 (m, 16H), 0.88 (t, J=7.4 Hz 6H), $^{13}$C NMR (100 MHz, CDCl$_3$): δ 166.2, 165.3, 165.1, 164.7, 162.6, 133.8, 133.6, 133.4, 133.3, 130.1, 129.9, 129.8, 129.6, 129.5, 129.2, 128.9, 128.8, 128.6, 128.4, 101.5, 72.6, 72.0, 71.8, 69.6, 68.3, 63.2, 59.8, 31.8, 29.2, 28.9, 22.7, 14.2.

<11-4> Synthesis of TTG-T7

TTG-T7 was synthesized in 84% yield according to the general synthesis procedure for the deprotection reaction of Example 2-4. $^1$H NMR (400 MHZ, CD$_3$OD): δ 4.35 (d, J=8 Hz, 3H), 4.19 (d, J=8 Hz, 3H), 3.87 (d, J=12 Hz, 3H), 3.75-3.72 (m, 3H), 3.59-3.55 (m, 3H), 3.25-3.16 (m, 10H), 3.08 (t, J=8 Hz, 3H), 2.97-2.94 (m, 4H), 1.60-1.53 (m, 4H), 1.31-1.19 (m, 16H), 0.78 (t, J=8.0 Hz 6H) $^{13}$C NMR (100 MHZ, CD$_3$OD): δ 163.9, 105.6, 78.2, 78.21, 75.3, 71.7, 70.3, 62.8, 61.5, 33.3, 31.2, 31.0, 30.7, 30.5, 30.3, 24.0, 14.8.

<Preparation Example 12> Synthesis of TTG-T8

<12-1> Synthesis of Compound 1b

Compound 1b was synthesized in 84% yield according to Example 2-1. $^1$H NMR (400 MHz, CDCl$_3$): δ 4.42 (t, J=6.6 Hz, 4H), 1.81-1.78 (m, 4H), 1.43-1.30 (m, 20H), 0.89 (t, J=6.9 Hz, 6H); $^{13}$C NMR (100 MHz, CDCl$_3$): δ 172.7, 172.2, 69.6, 32.0, 29.6, 29.4, 28.6, 25.9, 22.8, 14.2.

<12-2> Synthesis of Compound 2b

Compound 2b was synthesized in 82% yield according to Example 2-2. $^1$H NMR (400 MHz, CDCl$_3$): δ 4.92 (b, 3H), 3.69 (s, 6H), 3.04-3.01 (m, 4H), 1.70-1.66 (m, 4H), 1.28-1.26 (m, 20H), 0.88 (t, J=7.4 Hz, 6H) $^{13}$C NMR (100 MHZ, CDCl$_3$): δ 180.5, 179.7, 162.5, 63.2, 32.0, 30.4, 30.2, 29.6, 29.5, 29.4, 29.1, 22.8, 14.2.

<12-3> Synthesis of TTG-T8a

TTG-T8a was synthesized in 86% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8 Hz, 6H), 7.71-7.26 (m, 46H), 5.97 (s, 1H), 5.60 (t, J=8 Hz, 3H), 5.44 (t, J=12 Hz, 3H), 5.29-5.2 (m, 4H), 4.50-4.37 (m, 8H), 4.10-3.90 (m, 4H), 3.57-3.50 (m, 5H), 2.94-2.90 (m 4H), 1.59-1.55 (m, 4H), 1.26-1.21 (m, 20H), 0.88 (t, J=7.4 Hz, 6H), $^{13}$C NMR (100 MHz, CDCl$_3$): δ 166.1, 165.1, 164.6, 162.5, 133.8, 133.5, 133.3, 133.2, 130.0, 129.8, 129.7, 129.6, 129.1, 128.8, 128.5, 128.4, 101.5, 101.4, 72.5, 71.9, 71.8, 69.5, 68.2, 63.2, 59.8, 31.9, 29.6, 29.4, 29.2, 29.0, 22.7, 22.1, 14.2.

<12-4> Synthesis of TTG-T8

TTG-T8 was synthesized in 85% yield according to the general synthesis procedure for the deprotection reaction of Example 2-4. $^1$H NMR (400 MHZ, CD$_3$OD): δ 4.35 (d, J=8 Hz, 3H), 4.19 (d, J=8 Hz, 3H), 3.87 (d, J=12 Hz, 3H), 3.75-3.72 (m, 3H), 3.59-3.55 (m, 3H), 3.25-3.16 (m, 10H), 3.08 (t, J=8 Hz, 3H), 2.97-2.94 (m, 4H), 1.60-1.53 (m, 4H), 1.31-1.19 (m, 20H), 0.78 (t, J=8.0 Hz, 6H) $^{13}$C NMR (100 MHZ, CD$_3$OD): δ 163.9, 105.6, 78.2, 78.21, 75.3, 71.7, 70.3, 62.8, 61.5, 33.3, 31.2, 31.0, 30.7, 30.5, 30.3, 24.0, 14.8.

<Preparation Example 13> Synthesis of TTG-T9

<13-1> Synthesis of Compound 1c

Compound 1c was synthesized in 85% yield according to Example 2-1. $^1$H NMR (400 MHz, CDCl$_3$): δ 4.42 (t, J=6.6 Hz, 4H), 1.81-1.78 (m, 4H), 1.43-1.30 (m, 24H), 0.89 (t, J=6.9 Hz, 6H); $^{13}$C NMR (100 MHz, CDCl$_3$): δ 172.7, 172.2, 69.6, 64.3, 32.0, 29.7, 29.5, 29.4, 28.5, 25.9, 22.7, 14.2.

<13-2> Synthesis of Compound 2c

Compound 2c was synthesized in 83% yield according to Example 2-2. $^1$H NMR (400 MHz, CDCl$_3$): δ 4.92 (b, 3H), 3.69 (s, 6H), 3.04-3.01 (m, 4H), 1.70-1.66 (m, 4H), 1.28-1.26 (m, 24H), 0.88 (t, J=7.04 Hz, 6H) $^{13}$C NMR (100 MHZ, CDCl$_3$): δ 180.5, 179.7, 162.5, 63.2, 32.0, 30.4, 30.2, 29.6, 29.5, 29.4, 29.1, 22.8, 14.2.

<13-3> Synthesis of TTG-T9a

TTG-T9a was synthesized in 85% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8 Hz 6H), 7.71-7.26 (m, 46H), 5.97 (s, 1H), 5.60 (t, J=8 Hz, 3H), 5.44 (t, J=12 Hz, 3H), 5.29-5.2 (m, 4H), 4.50-4.37 (m, 8H), 4.10-3.90 (m, 4H), 3.57-3.50 (m, 5H), 2.94-2.90 (m 4H), 1.59-1.55 (m, 4H), 1.26-1.21 (m, 24H), 0.88 (t, J=7.4 Hz 6H), $^{13}$C NMR (100 MHz, CDCl$_3$): δ 166.2, 165.1, 164.5, 162.4, 133.8, 133.5, 133.3, 133.1, 130.0, 129.8, 129.7, 129.6, 129.1, 128.8, 128.5, 128.4, 101.5, 101.4, 72.4, 71.9, 71.8, 69.5, 68.5, 63.2, 59.6, 31.8, 29.6, 29.4, 29.2, 29.0, 22.7, 22.1, 14.2.

<13-4> Synthesis of TTG-T9

TTG-T9 was synthesized in 84% yield according to the general synthesis procedure for the deprotection reaction of Example 2-4. $^1$H NMR (400 MHZ, CD$_3$OD): δ 4.35 (d, J=8 Hz, 3H), 4.19 (d, J=8 Hz, 3H), 3.87 (d, J=12 Hz, 3H), 3.75-3.72 (m, 3H), 3.59-3.55 (m, 3H), 3.25-3.16 (m, 10H), 3.08 (t, J=8 Hz, 3H), 2.97-2.94 (m, 4H), 1.60-1.53 (m, 4H), 1.31-1.19 (m, 24H), 0.78 (t, J=8.0 Hz, 6H) $^{13}$C NMR (100 MHz, CD$_3$OD): δ 163.9, 105.6, 78.2, 78.21, 75.3, 71.7, 70.3, 62.8, 61.5, 33.3, 31.2, 31.0, 30.7, 30.5, 30.3, 24.0, 14.8.

<Preparation Example 14> Synthesis of TTG-T10

<14-1> Synthesis of Compound 1d

Compound 1d was synthesized in 85% yield according to Example 2-1. $^1$H NMR (400 MHz, CDCl$_3$): δ 4.42 (t, J=6.6 Hz, 4H), 1.81-1.78 (m, 4H), 1.43-1.30 (m, 32H), 0.89 (t, J=6.9 Hz, 6H); $^{13}$C NMR (100 MHz, CDCl$_3$): δ 172.7, 172.2, 69.6, 32.0, 29.8, 29.7, 29.6, 29.3, 28.5, 25.8, 22.8, 14.2.

<14-2> Synthesis of Compound 2d

Compound 2d was synthesized in 85% yield according to Example 2-2. $^1$H NMR (400 MHz, CDCl$_3$): δ 4.92 (b, 3H), 3.69 (s, 6H), 3.04-3.01 (m, 4H), 1.70-1.66 (m, 4H), 1.28-1.26 (m, 28H), 0.88 (t, J=7.04 Hz, 6H) $^{13}$C NMR (100 MHz, CDCl$_3$): δ 180.5, 179.6, 162.5, 63.1, 32.0, 30.4, 30.2, 29.6, 29.5, 29.4, 29.1, 22.7, 14.2.

<14-3> Synthesis of TTG-T10a

TTG-T10a was synthesized in 84% yield according to the general glycosylation reaction procedure of Example 2-3. $^1$H NMR (400 MHz, CDCl$_3$): δ 8.08-8.01 (m, 12H), 7.91 (d, J=7.2 Hz, 6H), 7.83 (d, J=8 Hz, 6H), 7.71-7.26 (m, 46H), 5.97 (s, 1H), 5.60 (t, J=8 Hz, 3H), 5.44 (t, J=12 Hz, 3H), 5.29-5.2 (m, 4H), 4.50-4.37 (m, 8H), 4.10-3.90 (m, 4H), 3.57-3.50 (m, 5H), 2.94-2.90 (m 4H), 1.59-1.55 (m, 4H), 1.26-1.21 (m, 28H), 0.88 (t, J=7.4 Hz, 6H), $^{13}$C NMR (100 MHz, CDCl$_3$): δ 166.1, 165.1, 164.6, 162.5, 133.8, 133.5, 133.3, 133.2, 130.0, 129.8, 129.7, 129.6, 129.1, 128.8, 128.5, 128.4, 101.5, 101.4, 72.5, 71.9, 71.8, 69.5, 68.2, 63.2, 60.4, 59.8, 53.5, 31.9, 29.6, 29.4, 29.2, 29.0, 22.7, 22.1, 14.2.

<14-4> Synthesis of TTG-T10

TTG-T10 was synthesized in 83% yield according to the general synthesis procedure for the deprotection reaction of Example 2-4. $^1$H NMR (400 MHZ, CD$_3$OD): δ 4.33 (d, J=12 Hz, 3H), 4.18 (d, J=8 Hz, 3H), 3.87 (d, J=8 Hz, 3H), 3.77-3.71 (m, 3H), 3.58-3.54 (m, 3H), 3.24-3.15 (m, 10H), 3.07 (t, J=8 Hz, 3H), 2.95-2.93 (m, 4H), 1.59-1.53 (m, 4H), 1.30-1.17 (m, 28H), 0.77 (t, J=8.0 Hz, 6H) $^{13}$C NMR (100

MHZ, CD$_3$OD): δ 163.5, 105.3, 78.0, 78.01, 75.2, 71.5, 70.1, 62.6, 61.3, 33.2, 30.8, 30.7, 30.6, 23.8, 14.6.

<Preparation Example 15> Synthesis of TTG-T11

<15-1> Synthesis of Compound 1e

Compound 1e was synthesized in 86% yield according to Example 2-1. $^1$H NMR (400 MHz, CDCl$_3$): δ 4.42 (t, J=6.6 Hz, 4H), 1.81-1.78 (m, 4H), 1.43-1.30 (m, 32H), 0.89 (t, J=6.9 Hz, 6H); $^{13}$C NMR (100 MHz, CDCl$_3$): δ 172.7, 172.2, 69.6, 32.0, 29.8, 29.7, 29.6, 29.3, 28.5, 25.8, 22.8, 14.2.

<15-2> Synthesis of Compound 2e

Compound 2e was synthesized in 85% yield according to Example 2-2. $^1$H NMR (400 MHz, CDCl$_3$): δ 5.19 (b, 3H), 3.69 (s, 6H), 3.04-3.01 (m, 4H), 1.67-1.66 (m, 4H), 1.28-1.26 (m, 32H), 0.88 (t, J=7.04 Hz, 6H) $^{13}$C NMR (100 MHz, CDCl$_3$): δ 180.4, 179.5, 162.3, 62.5, 53.0, 30.0, 30.4, 30.2, 29.8, 29.7, 29.5, 29.4, 29.1, 22.8, 14.2.

<15-3> Synthesis of TTG-T11a

TTG-T11a was synthesized in 86% yield according to the general glycosylation reaction procedure of Example 2-3. $^1$H NMR (400 MHz, CDCl$_3$): δ 8.08-8.01 (m, 12H), 7.91 (d, J=7.2 Hz, 6H), 7.83 (d, J=8.0 Hz, 6H), 7.71-7.26 (m, 46H), 5.97 (s, 1H), 5.61 (t, J=8 Hz, 3H), 5.45 (t, J=12.0 Hz, 3H), 5.29-5.2 (m, 4H), 4.51-4.37 (m, 8H), 4.10-3.90 (m, 4H), 3.57-3.50 (m, 5H), 2.94-2.90 (m 4H), 1.58-1.55 (m, 4H), 1.26-1.21 (m, 32H), 0.88 (t, J=7.4 Hz, 6H), $^{13}$C NMR (100 MHZ, CDCl$_3$): δ 166.3, 165.2, 164.5, 162.4, 133.8, 133.5, 133.3, 133.2, 130.0, 129.9, 129.7, 129.6, 129.1, 128.8, 128.5, 128.4, 101.5, 101.4, 92.7, 73.1, 72.8, 72.1, 71.9, 71.9, 69.4, 68.2, 63.2, 60.4, 59.8, 53.5, 48.4, 31.9, 30.2, 29.7, 29.6, 29.5, 29.2, 29.0, 22.7, 22.1, 14.2.

<15-4> Synthesis of TTG-T11

TTG-T11 was synthesized in 85% yield according to the general synthesis procedure for the deprotection reaction of Example 2-4. $^1$H NMR (400 MHZ, CD$_3$OD): δ 4.34 (d, J=8.0 Hz, 3H), 4.19 (d, J=8.0 Hz 3H), 3.88 (d, J=12 Hz, 3H), 3.76-3.73 (m, 3H), 3.6-3.55 (m, 3H), 3.25-3.16 (m, 10H), 3.08 (t, J=8.0 Hz, 3H), 2.97-2.94 (m, 4H), 1.60-1.54 (m, 4H), 1.32-1.17 (m, 32H), 0.78 (t, J=8.0 Hz, 6H) $^{13}$C NMR (100 MHZ, CD$_3$OD): δ 163.9, 105.6, 78.2, 78.21, 75.3, 71.7, 70.3, 62.8, 61.5, 33.3, 31.2, 31.0, 30.7, 30.5, 30.3, 24.0, 14.8.

<Preparation Example 16> Synthesis of TTG-T12

<16-1> Synthesis of Compound 1f

Compound 1f was synthesized in 84% yield according to Example 2-1. $^1$H NMR (400 MHz, CDCl$_3$): δ 4.43 (t, J=6.6 Hz, 4H), 1.81-1.78 (m, 4H), 1.43-1.30 (m, 36H), 0.89 (t, J=6.9 Hz, 6H); $^{13}$C NMR (100 MHz, CDCl$_3$): δ 172.6, 172.2, 69.7, 32.0, 29.7, 29.8, 29.6, 29.3, 28.5, 25.7, 22.8, 14.2.

<16-2> Synthesis of Compound 2f

Compound 2f was synthesized in 84% yield according to Example 2-2. $^1$H NMR (400 MHz, CDCl$_3$): δ 4.92 (b, 3H), 3.69 (s, 6H), 3.04-3.01 (m, 4H), 1.70-1.66 (m, 4H), 1.28-1.26 (m, 36H), 0.88 (t, J=7.4 Hz, 6H) $^{13}$C NMR (100 MHZ, CDCl$_3$): δ 180.5, 179.7, 162.5, 63.2, 32.0, 30.4, 30.2, 29.6, 29.5, 29.4, 29.1, 22.8, 14.2.

<16-3> Synthesis of TTG-T12a

TTG-T12a was synthesized in 85% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8.0 Hz, 6H), 7.71-7.26 (m, 46H), 5.95 (s, 1H), 5.61 (t, J=8.0 Hz 3H), 5.46 (t, J=12.0 Hz, 3H), 5.28-5.24 (m, 4H), 4.49-4.39 (m, 8H), 4.10-3.90 (m, 4H), 3.51-3.49 (m, 5H), 2.95-2.90 (m 4H), 1.59-1.57 (m, 4H), 1.29-1.21 (m, 36H), 0.87 (t, J=7.4 Hz, 6H), $^{13}$C NMR (100 MHZ, CDCl$_3$): δ 166.1, 165.2, 164.6, 162.4, 133.8, 133.5, 133.3, 133.2, 130.0, 129.8, 129.7, 129.6, 129.1, 128.8, 128.5, 128.4, 101.5, 101.4, 92.7, 72.6, 72.0, 71.4, 69.6, 68.2, 63.2, 59.9, 48.4, 31.9, 32.0, 29.6, 29.3, 29.1, 22.8, 14.2.

<16-4> Synthesis of TTG-T12

TTG-T12 was synthesized in 88% yield according to the general synthesis procedure for the deprotection reaction of Example 2-4. $^1$H NMR (400 MHZ, CD$_3$OD): δ 4.35 (d, J=8.0 Hz, 3H), 4.19 (d, J=8.0 Hz, 3H), 3.88 (d, J=12.0 Hz, 3H), 3.76-3.73 (m, 3H), 3.6-3.55 (m, 3H), 3.25-3.16 (m, 10H), 3.08 (t, J=8.0 Hz, 3H), 2.97-2.94 (m, 4H), 1.60-1.53 (m, 4H), 1.31-1.19 (m, 36H), 0.78 (t, J=8.0 Hz, 6H) $^{13}$C NMR (100 MHZ, CD$_3$OD): δ 163.7, 105.5, 78.2, 78.21, 75.3, 71.7, 70.3, 62.8, 61.5, 33.3, 31.2, 31.0, 30.7, 30.5, 30.3, 24.0, 14.8.

<Preparation Example 17> Synthesis of TTG-A8

<17-1> Synthesis of Compound 3a

Compound 3a was synthesized in 80% yield according to Example 2-1. $^1$H NMR (400 MHz, CDCl$_3$): δ 5.86 (br, 2H, NH), 3.27-3.42 (m, 4H), 1.50-1.63 (m, 4H), 1.19-1.41 (m, 20H), 0.88 (t, J=7.8 Hz, 6H), $^{13}$C NMR (100 MHz, CDCl$_3$): 167.8, 65.4, 41.5, 32.5, 30.2, 29.8, 27.4, 23.3, 14.4.

<17-2> Synthesis of Compound 4a

Compound 4a was synthesized in 80% yield according to Example 2-2. $^1$H NMR (400 MHz, CDCl$_3$): δ 3.78-3.72 (m, 6H), 3.41-3.38 (m, 4H), 1.53-1.50 (m, 4H), 1.28-1.24 (m, 20H), 0.88 (t, J=7.2 Hz, 6H) $^{13}$C NMR (100 MHz, CDCl$_3$): δ 180.3, 179.4, 162.2, 62.4, 32.1, 30.1, 29.8, 29.4, 29.3, 29.1, 22.8, 14.2.

<17-3> Synthesis of TTG-A8a

TTG-A8a was synthesized in 85% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8.0 Hz, 6H), 7.71-7.26 (m, 46H), 5.97 (s, 1H), 5.60 (t, J=8.0 Hz, 3H), 5.44 (t, J=8.0 Hz 3H), 5.29-5.20 (m, 4H), 4.50-4.37 (m, 8H), 4.10-3.90 (m, 4H), 3.57-3.50 (m, 5H), 2.94-2.90 (m 4H), 1.59-1.55 (m, 4H), 1.26-1.21 (m, 20H), 0.88 (t, J=7.4 Hz, 6H), $^{13}$C NMR (100 MHZ, CDCl$_3$): δ 166.2, 165.3, 165.1, 164.7, 162.6, 133.8, 133.6, 133.4, 133.3, 130.1, 129.9, 129.8, 129.6, 129.5, 129.2, 128.9, 128.8, 128.6, 128.4, 101.5, 72.6, 72.0, 71.8, 69.6, 68.3, 63.2, 59.8, 31.8, 29.2, 28.9, 22.7, 14.2.

<17-4> Synthesis of TTG-A8

TTG-A8 was synthesized in 85% yield according to the general synthesis procedure for the deprotection reaction of Example 2-4. $^1$H NMR (400 MHZ, CD$_3$OD): δ 4.48 (d, J=8.0 Hz, 3H), 4.32-4.29 (m, 6H), 4.09-4.05 (m, 6H), 3.92-3.86 (m, 4H), 3.73-3.68 (m, 4H), 3.34-3.20 (m, 24H), 1.62-1.60 (m, 4H), 1.33-1.28 (m, 20H), 0.88 (t, J=7.8 Hz 6H) $^{13}$C NMR (100 MHZ, CD$_3$OD): δ 164.7, 105.4, 78.2, 78.0, 75.1, 71.6, 70.2, 62.7, 33.2, 30.7, 30.6, 30.2, 23.6 14.5.

<Preparation Example 18> Synthesis of TTG-A9

<18-1> Synthesis of Compound 3b

Compound 3b was synthesized in 78% yield according to Example 2-1. $^1$H NMR (400 MHz, CDCl$_3$): δ 5.87 (br, 2H, NH), 3.27-3.43 (m, 4H), 1.50-1.63 (m, 4H), 1.19-1.41 (m, 24H), 0.88 (t, J=7.8 Hz, 6H), $^{13}$C NMR (100 MHz, CDCl$_3$): 167.9, 65.5, 41.5, 32.5, 30.2, 29.9, 27.4, 23.3, 14.4.

<18-2> Synthesis of Compound 4b

Compound 4b was synthesized in 80% yield according to Example 2-2. $^1$H NMR (400 MHz, CDCl$_3$): δ 3.77-3.73 (m, 6H), 3.40-3.37 (m, 4H), 1.52-1.48 (m, 4H), 1.26-1.23 (m, 24H), 0.87 (t, J=7.2 Hz, 6H) $^{13}$C NMR (100 MHz, CDCl$_3$): δ 180.4, 179.5, 162.3, 62.5, 54.1, 32.1, 30.0, 29.8, 29.5, 29.4, 29.1, 22.8, 14.2.

<18-3> Synthesis of TTG-A9a

TTG-A9a was synthesized in 86% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8.0 Hz, 6H), 7.71-7.27 (m, 46H), 6.03 (s, 2H), 5.73-5.28 (m, 22H), 4.51-4.47 (m, 18H), 4.03-3.89 (m, 8H), 3.59-3.48 (m, 10H), 3.23-3.12 (m, 4H), 1.60-1.57 (m, 4H), 1.25-1.18 (m, 24H), 0.87 (t, J=7.4 Hz, 6H), $^{13}$C NMR (100 MHZ, CDCl$_3$): δ 166.2, 165.1, 164.8, 162.5, 133.7, 133.5, 133.3, 133.2, 130.0, 129.8, 129.7, 129.6, 129.1, 128.8, 128.5, 128.4, 101.5, 101.4, 92.7, 72.6, 72.0, 71.8, 69.6, 68.2, 63.2, 59.8, 48.4, 31.9, 32.0, 29.7, 29.2, 29.0, 22.9, 14.2.

<18-4> Synthesis of TTG-A9

TTG-A9 was synthesized in 84% yield according to the general synthesis procedure for the deprotection reaction of Example 2-4. $^1$H NMR (400 MHZ, CD$_3$OD): δ 4.48 (d, J=8.0 Hz, 3H), 4.31-4.29 (m, 6H), 4.09-4.06 (m, 6H), 3.91-3.86 (m, 4H), 3.73-3.67 (m, 4H), 3.34-3.21 (m, 24H), 1.62-1.60 (m, 4H), 1.33-1.28 (m, 24H), 0.88 (t, J=7.8 Hz, 6H) $^{13}$C NMR (100 MHZ, CD$_3$OD): δ 164.6, 105.3, 78.2, 78.1, 75.1, 71.5, 70.2, 62.7, 33.2, 30.8, 30.5, 30.2, 23.5, 14.5.

<Preparation Example 19> Synthesis of TTG-A10

<19-1> Synthesis of Compound 3c

Compound 3c was synthesized in 82% yield according to Example 2-1. $^1$H NMR (400 MHz, CDCl$_3$): δ 5.86 (br, 2H, NH), 3.28-3.43 (m, 4H), 1.51-1.63 (m, 4H), 1.18-1.41 (m, 28H), 0.88 (t, J=7.8 Hz, 6H), $^{13}$C NMR (100 MHz, CDCl$_3$): 167.8, 165.6, 41.6, 32.5, 30.6, 29.9, 29.8, 27.4, 23.2, 14.3.

<19-2> Synthesis of Compound 4c

Compound 4c was synthesized in 80% yield according to Example 2-2. $^1$H NMR (400 MHz, CDCl$_3$): δ 3.78-3.74 (m, 6H), 3.41-3.38 (m, 4H), 1.53-1.48 (m, 4H), 1.27-1.24 (m, 28H), 0.88 (t, J=7.2 Hz, 6H) $^{13}$C NMR (100 MHz, CDCl$_3$): δ 180.2, 179.2, 162.2, 62.5, 54.2, 32.3, 30.0, 29.7, 29.3, 29.4, 29.0, 22.6, 14.2.

<19-3> Synthesis of TTG-A10a

TTG-A10a was synthesized in 86% yield according to the general glycosylation reaction procedure of Example 2-3. $^1$H NMR (400 MHz, CDCl$_3$): δ 8.08-8.01 (m, 12H), 7.91 (d, J=7.2 Hz, 6H), 7.83 (d, J=8.0 Hz, 6H), 7.71-7.27 (m, 46H), 6.03 (s, 2H), 5.73-5.28 (m, 22H), 4.51-4.47 (m, 18H), 4.03-3.89 (m, 8H), 3.59-3.48 (m, 10H), 3.23-3.12 (m, 4H), 1.60-1.57 (m, 4H), 1.25-1.18 (m, 28H), 0.87 (t, J=7.4 Hz, 6H), $^{13}$C NMR (100 MHZ, CDCl$_3$): δ 166.2, 165.1, 164.7, 162.5, 133.8, 133.5, 133.3, 133.2, 130.0, 129.8, 129.7, 129.6, 129.1, 128.8, 128.5, 128.4, 101.5, 101.4, 92.7, 72.6, 72.0, 71.8, 69.6, 68.2, 63.2, 59.8, 48.4, 31.9, 32.0, 29.7, 29.2, 29.0, 22.9, 14.2.

<19-4> Synthesis of TTG-A10

TTG-A10 was synthesized in 86% yield according to the general synthesis procedure for the deprotection reaction of Example 2-4. $^1$H NMR (400 MHZ, CD$_3$OD): δ 4.48 (d, J=8.0 Hz, 3H), 4.32-4.29 (m, 6H), 4.08-4.05 (m, 6H), 3.91-3.87 (m, 4H), 3.72-3.67 (m, 4H), 3.33-3.21 (m, 24H), 1.62-1.60 (m, 4H), 1.33-1.28 (m, 28H), 0.88 (t, J=7.8 Hz, 6H) $^{13}$C NMR (100 MHz, CD$_3$OD): δ 164.8, 105.3, 78.2, 78.0, 75.1, 71.4, 70.3, 62.8, 33.3, 30.9, 30.2, 28.8, 23.7, 14.5.

<Preparation Example 20> Synthesis of TTG-A11

<20-1> Synthesis of Compound 3d

Compound 3d was synthesized in 83% yield according to Example 2-1. $^1$H NMR (400 MHz, CDCl$_3$): δ 5.85 (br, 2H, NH), 3.28-3.41 (m, 4H), 1.52-1.63 (m, 4H), 1.18-1.42 (m, 32H), 0.88 (t, J=7.8 Hz, 6H), $^{13}$C NMR (100 MHz, CDCl$_3$): 167.8, 165.7, 41.5, 32.5, 30.6, 29.9, 29.7, 29.5, 27.4, 23.2, 14.3.

<20-2> Synthesis of Compound 4d

Compound 4d was synthesized in 84% yield according to Example 2-2. $^1$H NMR (400 MHz, CDCl$_3$): δ 3.77-3.73 (m, 6H), 3.41-3.38 (m, 4H), 1.53-1.549 (m, 4H), 1.25-1.23 (m, 32H), 0.88 (t, J=7.2 Hz, 6H) $^{13}$C NMR (100 MHZ, CDCl$_3$): δ 180.3, 179.4, 162.2, 62.4, 54.1, 32.1, 30.1, 29.8, 29.5, 29.4, 29.1, 22.8, 14.2.

<20-3> Synthesis of TTG-A11a

TTG-A11a was synthesized in 84% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8.0 Hz, 6H), 7.71-7.27 (m, 46H), 6.03 (s, 2H), 5.73-5.28 (m, 22H), 4.51-4.47 (m, 18H), 4.03-3.89 (m, 8H), 3.59-3.48 (m, 10H), 3.23-3.12 (m, 4H), 1.60-1.57 (m, 4H), 1.25-1.18 (m, 32H), 0.87 (t, J=7.4 Hz, 6H), $^{13}$C NMR (100 MHZ, CDCl$_3$): δ 166.2, 165.1, 164.7, 162.5, 133.8, 133.5, 133.3, 133.2, 130.0, 129.8, 129.7, 129.6, 129.1, 128.8, 128.5, 128.4, 101.5, 101.4, 92.7, 72.6, 72.0, 71.8, 69.6, 68.2, 63.2, 59.8, 48.4, 31.9, 32.0, 29.7, 29.2, 29.0, 22.9, 14.2.

<20-4> Synthesis of TTG-A11

TTG-A11 was synthesized in 85% yield according to the general synthesis procedure for the deprotection reaction of Example 2-4. $^1$H NMR (400 MHZ, CD$_3$OD): δ 4.49 (d, J=8.0 Hz, 3H), 4.33-4.30 (m, 6H), 4.08-4.04 (m, 6H), 3.90-3.87 (m, 4H), 3.72-3.68 (m, 4H), 3.36-3.21 (m, 24H), 1.62-1.60 (m, 4H), 1.32-1.28 (m, 32H), 0.88 (t, J=7.8 Hz 6H) $^{13}$C NMR (100 MHZ, CD$_3$OD): δ 164.7, 105.4, 78.1, 78.0, 75.1, 71.5, 70.3, 62.7, 33.2, 30.9, 30.6, 30.3, 28.8, 23.8, 14.5.

<Preparation Example 21> Synthesis of TTG-A12

<21-1> Synthesis of Compound 3e

Compound 3e was synthesized in 85% yield according to Example 2-1. $^1$H NMR (400 MHz, CDCl$_3$): δ 5.84 (br, 2H, NH), 3.29-3.41 (m, 4H), 1.53-1.63 (m, 4H), 1.18-1.42 (m, 36H), 0.88 (t, J=7.8 Hz, 6H), $^{13}$C NMR (100 MHz, CDCl$_3$): 167.8, 165.5, 41.5, 32.7, 30.6, 29.9, 29.7, 29.5, 27.8, 23.1, 14.2.

<21-2> Synthesis of Compound 4e

Compound 4e was synthesized in 84% yield according to Example 2-2. $^1$H NMR (400 MHz, CDCl$_3$): δ 3.77-3.73 (m, 6H), 3.41-3.38 (m, 4H), 1.53-1.549 (m, 4H), 1.25-1.23 (m, 32H), 0.88 (t, J=7.2 Hz, 6H) $^{13}$C NMR (100 MHZ, CDCl$_3$): δ 180.3, 179.4, 162.2, 62.4, 54.1, 32.1, 30.1, 29.8, 29.5, 29.4, 29.1, 22.8, 14.2.

<21-3> Synthesis of TTG-A12a

TTG-A12a was synthesized in 85% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8.0 Hz, 6H), 7.71-7.27 (m, 46H), 6.04 (s, 2H), 5.71-5.26 (m, 22H), 4.51-4.47 (m, 18H), 4.03-3.89 (m, 8H), 3.59-3.48 (m, 10H), 3.23-3.12 (m, 4H), 1.59-1.57 (m, 4H), 1.26-1.18 (m, 36H), 0.87 (t, J=7.4 Hz, 6H), $^{13}$C NMR (100 MHz, CDCl$_3$): δ 166.1, 165.3, 164.5, 162.2, 133.8, 133.5, 133.3, 133.2, 130.0, 129.8, 129.7, 129.6, 129.1, 128.8, 128.5, 128.4, 101.5, 101.4, 92.7, 72.6, 72.0, 71.8, 69.6, 68.2, 63.1, 59.8, 48.4, 31.9, 32.0, 29.7, 29.3, 29.0, 22.8, 14.2.

<21-4> Synthesis of TTG-A12

TTG-A12 was synthesized in 84% yield according to the general synthesis procedure for the deprotection reaction of Example 2-4. $^1$H NMR (400 MHZ, CD$_3$OD): δ 4.49 (d, J=8.0 Hz, 3H), 4.33-4.29 (m, 6H), 4.08-4.05 (m, 6H), 3.89-3.86 (m, 4H), 3.71-3.68 (m, 4H), 3.36-3.21 (m, 24H), 1.63-1.60 (m, 4H), 1.32-1.28 (m, 36H), 0.89 (t, J=7.8 Hz, 6H) $^{13}$C NMR (100 MHZ, CD$_3$OD): δ 164.8, 105.4, 78.1, 78.0, 75.1, 71.5, 70.3, 62.7, 33.2, 30.9, 30.7, 30.6, 30.3, 23.8, 23.5, 14.5.

<Preparation Example 22> Synthesis of TTG-A14

<22-1> Synthesis of Compound 3f

Compound 3f was synthesized in 84% yield according to Example 2-1. $^1$H NMR (400 MHz, CDCl$_3$): δ 5.85 (br, 2H, NH), 3.29-3.41 (m, 4H), 1.53-1.63 (m, 4H), 1.18-1.42 (m, 44H), 0.88 (t, J=7.2 Hz, 6H), $^{13}$C NMR (100 MHZ, CDCl$_3$): 167.8, 165.5, 41.5, 32.7, 31.8, 30.6, 29.9, 29.7, 29.5, 27.8, 23.1, 14.2.

<22-2> Synthesis of Compound 4f

Compound 4f was synthesized in 86% yield according to Example 2-2. $^1$H NMR (400 MHz, CDCl$_3$): δ 3.78-3.74 (m, 6H), 3.42-3.28 (m, 4H), 1.55-1.39 (m, 4H), 1.29-1.25 (m, 44H), 0.87 (t, J=7.2 Hz, 6H) $^{13}$C NMR (100 MHZ, CDCl$_3$): δ 180.4, 179.2, 162.4, 62.5, 54.2, 32.1, 30.0, 29.9, 29.7, 29.6, 29.5, 29.4, 29.2, 22.6, 14.2.

<22-3> Synthesis of TTG-A14a

TTG-A14a was synthesized in 86% yield according to the general glycosylation reaction procedure of Example 2-3. $^1$H NMR (400 MHZ, CDCl$_3$): δ 8.08-8.01 (m, 12H), 7.91 (d, J=7.2 Hz, 6H), 7.83 (d, J=8.0 Hz, 6H), 7.71-7.27 (m, 46H), 6.03 (s, 2H), 5.73-5.28 (m, 22H), 4.51-4.47 (m, 18H), 4.03-3.89 (m, 8H), 3.59-3.48 (m, 10H), 3.23-3.12 (m, 4H), 1.60-1.57 (m, 4H), 1.25-1.18 (m, 44H), 0.87 (t, J=7.4 Hz, 6H), $^{13}$C NMR (100 MHZ, CDCl$_3$): δ 166.1, 165.1, 164.7, 162.5, 133.8, 133.5, 133.3, 133.2, 130.0, 129.8, 129.7, 129.6, 129.1, 128.8, 128.5, 128.4, 101.5, 101.4, 92.7, 72.6, 72.0, 71.8, 69.6, 68.2, 63.2, 59.8, 48.4, 31.9, 31.6, 32.0, 29.7, 29.2, 29.0, 22.9, 14.2.

<22-4> Synthesis of TTG-A14

TTG-A14 was synthesized in 86% yield according to the general synthesis procedure for the deprotection reaction of Example 2-4. $^1$H NMR (400 MHZ, CD$_3$OD): δ 4.48 (d, J=8.0 Hz, 3H), 4.34-4.30 (m, 6H), 4.07-4.05 (m, 6H), 3.88-3.85 (m, 4H), 3.72-3.68 (m, 4H), 3.35-3.21 (m, 24H), 1.63-1.60 (m, 4H), 1.31-1.28 (m, 44H), 0.88 (t, J=7.8 Hz, 6H) $^{13}$C NMR (100 MHZ, CD$_3$OD): δ 164.7, 105.3, 78.1, 78.2, 75.8, 71.4, 70.3, 62.6, 33.2, 30.8, 30.5, 30.2, 23.8, 23.3 14.5.

<Example 3> Synthesis Method of TEMs

Figure 3:
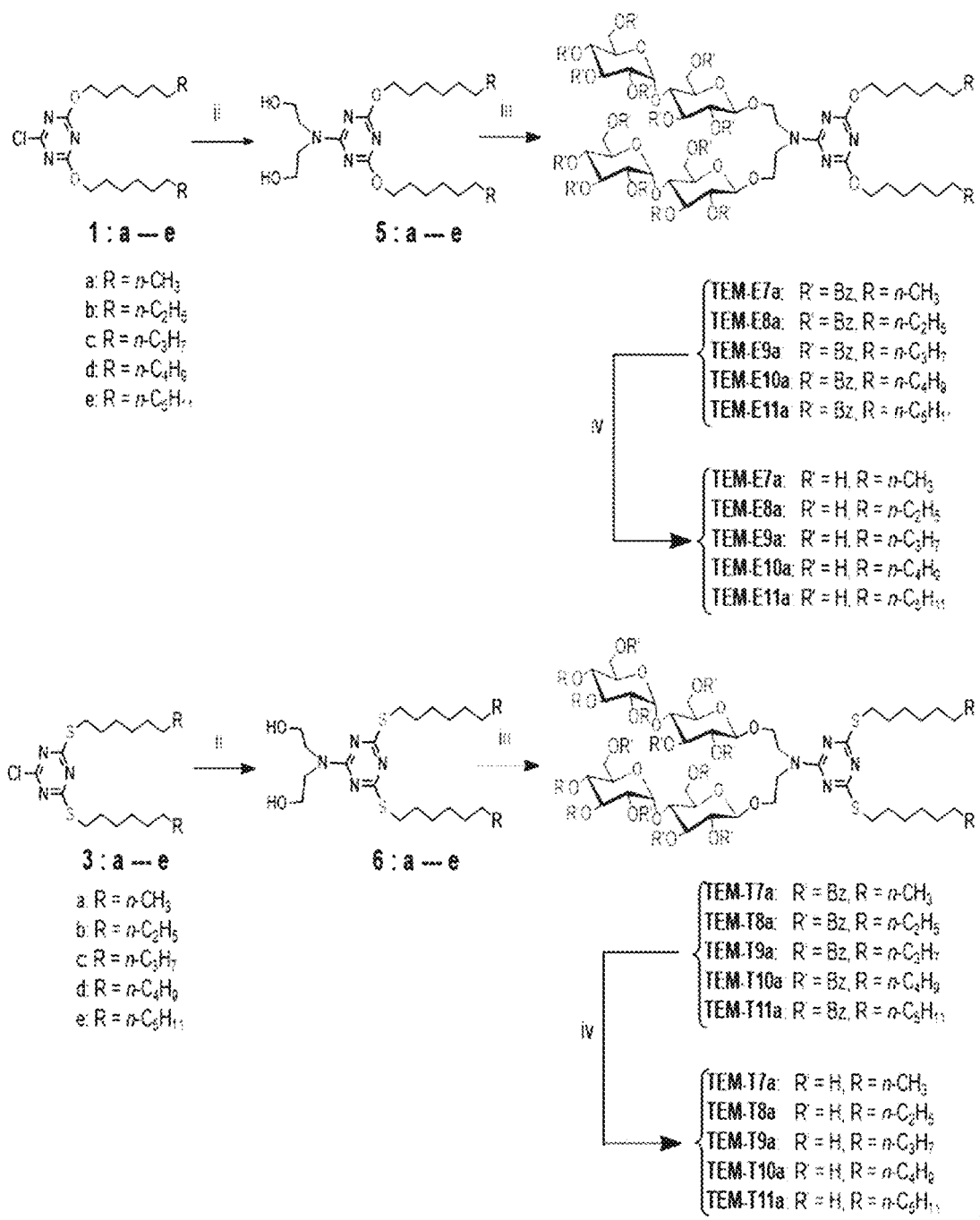
FIG. 3 is a view illustrating a synthesis scheme of TEMs according to Example 3 of the present invention.

FIG. 3 illustrates the synthesis scheme of triazine-based maltosides with a diethanolamine linker (TEMs). 10 types of compounds of TEMs were synthesized by the following synthesis methods of <3-1> to <3-4>.

<3-1> General Procedure for the Synthesis of 2-chloro-4,6-dialkylated-1,3,5-triazine (step i of FIG. 3)

A mixture of 2,4,6-trichloro-1,3,5-triazine (3.01 mmol) and NaHCO$_3$ (7.26 mmol) was stirred in acetone (10 mL) for 10 minutes. Each alcohol (ROH/RSH) (6.0 mmol) dissolved in acetone was added dropwise for 30 minutes. The resulting reaction mixture was kept at room temperature for 36 hr for ROH or 1 hr for RSH. The reaction mixture was extracted with CHCl$_3$ and water, and the organic layer was dried over anhydrous Na$_2$SO$_4$. The oily residue obtained after removal of solvent was subjected to column chromatography purification to obtain target Compound 1 or 3.

<3-2> General Synthesis Procedure for the Coupling Reactions of the Resulting Dialkylated Triazine Derivatives with Diethanolamine (Step ii of FIG. 3)

To a mixture of 2-chloro-4,6-dialkylated-1,3,5-triazine (1.0 equiv.) dissolved in THF, diethanolamine and K$_2$CO$_3$ were added under nitrogen. The solution was stirred at 40° C. for 24 hr. The reaction mixture was diluted with water and then extracted with ethyl acetate. The organic layer was washed with brine and dried over anhydrous Na$_2$SO$_4$. After evaporation of the ethyl acetate solution, the residue was purified by flash column chromatography (EtOAc/hexane) to obtain target Compound 5 or 6.

<3-3> General Synthesis Procedure for Glycosylation Reaction (Step iii of FIG. 3)

This reaction was performed according to the synthesis method (Nat. Methods 2010, 7, 1003.) of Chae, P. S. et al. with some modifications. Briefly, a mixture of a dialkylated di-ol derivative (Compound 5 or 6), AgOTf (2.5 equiv.), 2,4,6-collidine (0.5 equiv.) in anhydrous CH$_2$Cl$_2$ (20 mL) was stirred at −45° C. Then, perbenzoylated maltosylbromide (2.5 equiv.) dissolved in CH$_2$Cl$_2$ (30 mL) was added dropwise over 0.5 hr into this suspension. The reaction was maintained at 0° C. for 1.5 hr. Reaction progress was monitored by TLC. After completion of the reaction (as detected by TLC), pyridine (1.0 mL) was added to the reaction mixture. The reaction mixture was diluted with CH$_2$Cl$_2$ (30 mL) before being filtered over Celite. The filtrate was washed successively with a 1.0 M aqueous Na$_2$S$_2$O$_3$ solution (30 mL), a 0.1 M aqueous HCl solution (30 mL), and brine (30 mL). Then, the organic layer was dried with anhydrous Na$_2$SO$_4$ and the solvent was removed by rotary evaporation. The resulting residue was purified by silica gel column chromatography (EtOAc/hexane) to obtain the glycosylated target compound.

<3-4> General Procedure for the Synthesis for Deprotection Reaction (Step iv of FIG. 3)

This reaction followed the synthesis method (Nat. Methods 2010, 7, 1003.) of Chae, P. S. aureus et al. The de-O-benzoylation was performed under Zemplen's condition. An O-protected compound was dissolved in anhydrous CH$_2$Cl$_2$ and then MeOH was added slowly thereto until persistent precipitation appeared. A methanolic solution of 0.5 M NaOMe was added to the reaction mixture such that the final concentration of NaOMe was 0.05 M. The reaction mixture was stirred for 6 hr at room temperature. After completion of the reaction, the reaction mixture was neutralized using Amberlite IR-120 (H$^+$ form) resin. The resin was removed by filtration and washed with MeOH and the solvent was removed from the filtrate in vacuo. The residue was purified by silica gel column chromatography (CH$_2$Cl$_2$/MeOH) to obtain the target compound.

<Preparation Example 23> Synthesis of TEM-E7

<23-1> Synthesis of Compound 1a

Compound 1a was synthesized in 48% yield according to Example 3-1. $^1$H NMR (400 MHz, CDCl$_3$): δ 4.41 (t, J=6.6 Hz, 4H), 1.82-1.75 (m, 4H), 1.34-1.27 (m, 16H), 0.88 (t, J=6.9 Hz, 6H); $^{13}$C NMR (100 MHz, CDCl$_3$): δ 172.7, 172.2, 69.6, 32.0, 29.6, 28.6, 25.9, 22.8, 14.2.

<23-2> Synthesis of Compound 5a

Compound 5a was synthesized in 85% yield according to Example 3-2. 11H NMR (400 MHz, CDCl$_3$): δ 4.29 (t, J=6.7 Hz, 4H), 3.92 (t, J=7.0 Hz, 4H), 3.80 (t, J=7.0 Hz, 4H), 1.77-1.72 (m, 4H), 1.39-1.26 (m, 16H), 0.88 (t, J=7.2 Hz, 6H); $^{13}$C NMR (100 MHz, CDCl$_3$): δ 171.6, 168.2, 67.9, 62.0, 52.4, 32.0, 29.6, 29.4, 28.9, 26.6, 22.8, 14.2.

<23-3> Synthesis of TEM-E7a

TEM-E7a was synthesized in 82% yield according to the general glycosylation reaction procedure of Example 3-3. $^1$H NMR (400 MHZ, CDCl$_3$): δ 8.11 (d, J=7.1 Hz, 4H), 8.01 (d, J=7.2 Hz, 4H), 7.82 (d, J=7.2 Hz, 4H), 7.79-7.73 (m, 12H), 7.61 (d, J=7.4 Hz, 4H), 7.52-7.12 (m, 42H), 6.11 (t, J=10.0 Hz, 2H), 5.76-5.62 (m, 6H), 5.45-5.2130 (m, 4H), 4.92 (d, J=10.4 Hz, 2H), 4.78-4.75 (m, 2H), 4.65-4.56 (m, 4H), 4.47-4.24 (m, 4H), 4.10-4.03 (m, 6H), 3.81-3.78 (m, 2H), 3.58-3.49 (m, 4H), 1.67-1.62 (m, 4H), 1.32-1.22 (m, 20H), 0.88 (t, J=7.0 Hz, 6H); $^{13}$C NMR (100 MHZ, CDCl$_3$): δ 172.3, 171.3, 166.5, 166.2, 165.8, 165.7, 165.4, 165.1, 161.0, 164.9, 133.5, 133.4, 133.3, 133.1, 130.0, 129.9, 129.8, 129.7, 129.5, 129.3, 129.0, 128.9, 128.6, 128.4, 128.3, 128.2, 128.1, 100.8, 96.3, 74.9, 72.8, 72.2, 70.8, 69.9, 69.1, 67.3, 63.4, 62.5, 48.8, 31.8, 29.5, 29.4, 29.3, 29.0, 28.7, 25.9, 22.6, 14.1.

<23-4> Synthesis of TEM-E7

TEM-E7 was synthesized in 95% yield according to the general synthesis procedure for the deprotection reaction of Example 3-4. $^1$H NMR (400 MHZ, CD$_3$OD): δ 5.16 (d, J=7.0 Hz, 2H), 4.39-4.35 (m, 6H), 4.04-3.97 (m, 2H), 3.83-3.71 (m, 12H), 3.58-3.42 (m, 10H), 3.37-3.28 (m, 4H), 1.66-1.59 (m, 4H), 1.32-1.18 (m, 16H), 0.78 (t, J=7.2 Hz, 6H); $^{13}$C NMR (100 MHZ, CD$_3$OD): δ 173.2, 172.8, 169.0, 104.9, 104.7, 103.0, 81.3, 81.2, 77.7, 76.7, 75.1, 74.8, 74.7, 74.2, 71.5, 68.9, 68.7, 62.8, 62.2, 32.0, 33.0, 30.7, 30.5, 30.2, 30.0, 27.1, 27.0, 23.9, 23.7, 14.6, 14.5; HRMS (FAB$^+$): For C$_{45}$H$_{80}$N$_4$O$_{24}$ [M+Na]$^+$ 1083.5060, found 1083.5058.

<Preparation Example 24> Synthesis of TEM-E8

<24-1> Synthesis of Compound 1b

Compound 1b was synthesized in 45% yield according to Example 3-1. $^1$H NMR (400 MHz, CDCl$_3$): δ 4.41 (t, J=6.6 Hz, 4H), 1.81-1.72 (m, 4H), 1.34-1.27 (m, 20H), 0.86 (t, J=6.9 Hz, 6H); $^{13}$C NMR (100 MHz, CDCl$_3$): δ 172.7, 172.2, 69.6, 32.0, 29.7, 29.6, 28.6, 25.9, 22.8, 14.2.

<24-2> Synthesis of Compound 5b

Compound 5b was synthesized in 88% yield according to Example 3-2. $^1$H NMR (400 MHz, CDCl$_3$): δ 4.29 (t, J=6.7 Hz, 4H), 3.90 (t, J=7.1 Hz, 4H), 3.79 (t, J=7.0 Hz, 4H), 1.76-1.73 (m, 4H), 1.40-1.27 (m, 20H), 0.88 (t, J=7.2 Hz, 3H), 0.87 (t, J=7.2 Hz, 3H); $^{13}$C NMR (100 MHz, CDCl$_3$): δ 171.5, 167.8, 67.8, 61.6, 52.6, 31.9, 29.4, 29.3, 28.8, 26.0, 22.7, 14.1.

<24-3> Synthesis of TEM-E8a

TEM-E8a was synthesized in 82% yield according to the general glycosylation reaction procedure of Example 3-3. $^1$H NMR (400 MHZ, CDCl$_3$): δ 8.11 (d, J=7.1 Hz, 4H), 8.01 (d, J=7.2 Hz, 4H), 7.82 (d, J=7.2 Hz, 4H), 7.79-7.73 (m, 12H), 7.61 (d, J=7.4 Hz, 4H), 7.52-7.12 (m, 42H), 6.11 (t, J=10.0 Hz, 2H), 5.76-5.62 (m, 6H), 5.45-5.2130 (m, 4H), 4.92 (d, J=10.4 Hz, 2H), 4.78-4.75 (m, 2H), 4.65-4.56 (m, 4H), 4.47-4.24 (m, 4H), 4.10-4.03 (m, 6H), 3.81-3.78 (m, 2H), 3.58-3.49 (m, 4H), 1.67-1.62 (m, 4H), 1.32-1.22 (m, 20H), 0.88 (t, J=7.0 Hz, 6H); $^{13}$C NMR (100 MHZ, CDCl$_3$): δ 172.3, 171.3, 166.5, 166.2, 165.8, 165.7, 165.4, 165.1, 161.0, 164.9, 133.5, 133.4, 133.3, 133.1, 130.0, 129.9, 129.8, 129.7, 129.5, 129.3, 129.0, 128.9, 128.6, 128.4, 128.3, 128.2, 128.1, 100.8, 96.3, 74.9, 72.8, 72.2, 70.8, 69.9, 69.1, 67.3, 63.4, 62.5, 48.8, 31.8, 29.5, 29.4, 29.3, 29.0, 28.7, 25.9, 22.6, 14.1.

<24-4> Synthesis of TEM-E8

TEM-E8 was synthesized in 90% yield according to the general synthesis procedure for the deprotection reaction of Example 3-4. $^1$H NMR (400 MHZ, CD$_3$OD): δ 5.17 (d, J=7.0 Hz, 2H), 4.39-4.35 (m, 6H), 4.04-3.97 (m, 2H), 3.83-3.71 (m, 12H), 3.58-3.42 (m, 10H), 3.37-3.28 (m, 4H), 1.66-1.59 (m, 4H), 1.32-1.18 (m, 20H), 0.78 (t, J=7.2 Hz, 6H); $^{13}$C NMR (100 MHZ, CD$_3$OD): δ 172.6, 168.2, 104.6, 102.9, 81.2, 77.9, 76.6, 75.1, 74.8, 74.7, 74.2, 71.5, 69.0, 68.7, 62.8, 62.2, 50.0, 49.5, 49.3, 49.1, 48.9, 48.7, 33.0, 30.5, 30.4, 30.0, 27.1, 23.8, 14.6; HRMS (FAB$^+$): For C$_{47}$H$_{84}$N$_4$O$_{24}$ [M+Na]$^+$ 1111.5373, found 1111.5377.

<Preparation Example 25> Synthesis of TEM-E9

<25-1> Synthesis of Compound 1c

Compound 1c was synthesized in 50% yield according to Example 3-1. $^1$H NMR (400 MHz, CDCl$_3$): δ 4.41 (t, J=6.6 Hz, 4H), 1.82-1.72 (m, 4H), 1.34-1.27 (m, 24H), 0.88 (t, J=6.9 Hz, 6H); $^{13}$C NMR (100 MHZ, CDCl$_3$): δ 172.7, 172.2, 69.6, 32.0, 29.6, 29.4, 28.6, 25.9, 22.8, 14.2.

<25-2> Synthesis of Compound 5c

Compound 5c was synthesized in 84% yield according to Example 3-2. $^1$H NMR (400 MHz, CDCl$_3$): δ 4.28 (t, J=6.7 Hz, 4H), 3.90 (t, J=7.3 Hz, 4H), 3.79 (t, J=7.3 Hz, 4H), 1.77-1.72 (m, 4H), 1.39-1.26 (m, 24H), 0.87 (t, J=6.9 Hz, 6H); $^{13}$C NMR (100 MHz, CDCl$_3$): δ 171.6, 168.2, 67.9, 62.0, 52.4, 32.0, 29.6, 29.4, 28.9, 26.6, 22.8, 14.2.

<25-3> Synthesis of TEM-E9a

TEM-E9a was synthesized in 85% yield according to the general glycosylation reaction procedure of Example 3-3. $^1$H NMR (400 MHZ, CDCl$_3$): δ 8.11 (d, J=7.1 Hz, 4H), 8.01 (d, J=7.2 Hz, 4H), 7.82 (d, J=7.2 Hz, 4H), 7.79-7.73 (m, 12H), 7.61 (d, J=7.4 Hz, 4H), 7.52-7.12 (m, 42H), 6.11 (t, J=8.0 Hz, 2H), 5.76-5.62 (m, 6H), 5.45-5.2130 (m, 4H), 4.92 (d, J=8.2 Hz, 2H), 4.78-4.75 (m, 2H), 4.65-4.56 (m, 4H), 4.47-4.24 (m, 6H), 4.10-4.03 (m, 6H), 3.81-3.78 (m, 2H), 3.58-3.49 (m, 4H), 1.67-1.62 (m, 4H), 1.32-1.22 (m, 24H), 0.88 (t, J=7.0 Hz, 6H); $^{13}$C NMR (100 MHZ, CDCl$_3$): δ 172.3, 171.01, 166.5, 166.2, 165.8, 165.7, 165.4, 165.1, 161.0, 164.9, 133.5, 133.4, 133.3, 133.1, 130.0, 129.9, 129.8, 129.7, 129.5, 129.3, 129.0, 128.9, 128.6, 128.4, 128.3, 128.2, 128.1, 100.8, 96.3, 74.9, 72.8, 72.2, 70.8, 69.9, 69.1, 68.6, 67.3, 63.4, 62.5, 48.8, 31.9, 31.6, 29.5, 29.4, 29.3, 29.0, 28.7, 25.9, 22.6, 14.2.

<25-4> Synthesis of TEM-E9

TEM-E9 was synthesized in 90% yield according to the general synthesis procedure for the deprotection reaction of Example 3-4. $^1$H NMR (400 MHZ, CD$_3$OD): δ 5.18 (d, J=7.0 Hz, 2H), 4.35-4.30 (m, 6H), 4.04-3.97 (m, 2H), 3.83-3.71 (m, 12H), 3.58-3.42 (m, 10H), 3.37-3.28 (m, 4H), 1.66-1.59 (m, 4H), 1.32-1.18 (m, 24H), 0.78 (t, J=7.2 Hz, 6H); $^{13}$C NMR (100 MHZ, CD$_3$OD): δ 172.6, 168.2, 104.6, 102.9, 81.2, 77.6, 75.1, 74.8, 74.6, 74.1, 71.4, 69.0, 68.7, 62.7, 50.0, 49.7, 49.5, 49.3, 48.9, 48.7, 48.5, 33.1, 30.7, 30.5, 30.4, 30.0, 27.1, 23.8, 14.6; HRMS (FAB$^+$): For C$_{49}$H$_{88}$N$_4$O$_{24}$ [M+Na]$^+$ 1139.5686, found 1139.5682.

<Preparation Example 26> Synthesis of TEM-E10

<26-1> Synthesis of Compound 1d

Compound 3d was synthesized in 50% yield according to Example 3-1. $^1$H NMR (400 MHz, CDCl$_3$): δ 4.41 (t, J=6.6 Hz, 4H), 1.81-1.77 (m, 4H), 1.34-1.27 (m, 28H), 0.88 (t, J=6.9 Hz, 6H); $^{13}$C NMR (100 MHZ, CDCl$_3$): δ 172.7, 172.2, 69.6, 64.3, 32.0, 29.7, 29.6, 29.4, 28.6, 25.9, 22.8, 14.2.

<26-2> Synthesis of Compound 5d

Compound 5d was synthesized in 85% yield according to Example 3-2. $^1$H NMR (400 MHz, CDCl$_3$): δ 4.28 (t, J=6.6 Hz, 4H), 3.87 (t, J=7.3 Hz, 4H), 3.74 (t, J=7.3 Hz, 4H), 1.77-1.72 (m, 4H), 1.39-1.26 (m, 28H), 0.87 (t, J=6.9 Hz, 6H); $^{13}$C NMR (100 MHZ, CDCl$_3$): δ 171.6, 167.2, 67.8, 61.7, 52.6, 32.0, 29.6, 29.4, 28.9, 26.6, 22.8, 14.2.

<26-3> Synthesis of TEM-E10a

TEM-E10a was synthesized in 80% yield according to the general glycosylation reaction procedure of Example 3-3. $^1$H NMR (400 MHZ, CDCl$_3$): δ 8.11 (d, J=7.1 Hz, 4H), 8.01 (d, J=7.2 Hz, 4H), 7.82 (d, J=7.2 Hz, 4H), 7.79-7.73 (m, 12H), 7.61 (d, J=7.4 Hz, 4H), 7.52-7.12 (m, 42H), 6.11 (t, J=10.0 Hz, 2H), 5.76-5.62 (m, 6H), 5.45-5.21 (m, 4H), 4.92 (d, J=8.2 Hz, 2H), 4.78-4.75 (m, 2H), 4.65-4.56 (m, 4H), 4.47-4.24 (m, 6H), 4.10-4.03 (m, 6H), 3.81-3.78 (m, 2H), 3.58-3.49 (m, 4H), 1.67-1.62 (m, 4H), 1.32-1.22 (m, 28H), 0.88 (t, J=7.0 Hz, 6H); $^{13}$C NMR (100 MHZ, CDCl$_3$): δ 172.3, 171.0, 166.5, 166.2, 165.8, 165.7, 165.4, 165.1, 161.0, 164.9, 133.5, 133.4, 133.3, 133.1, 130.0, 129.9, 129.8, 129.7, 129.5, 129.3, 129.0, 128.9, 128.6, 128.4, 128.3, 128.2, 128.1, 100.8, 96.3, 74.9, 72.8, 72.2, 70.8, 69.9, 69.1, 68.6, 67.6, 63.4, 62.5, 48.8, 31.9, 29.6, 29.4, 29.3, 29.0, 28.7, 25.9, 22.7, 14.2.

<26-4> Synthesis of TEM-E10

TEM-E10 was synthesized in 95% yield according to the general synthesis procedure for the deprotection reaction of Example 3-4. $^1$H NMR (400 MHZ, CD$_3$OD): δ 5.17 (d, J=7.0 Hz, 2H), 4.38-4.35 (m, 6H), 3.99-3.96 (m, 2H), 3.82-3.70 (m, 12H), 3.57-3.36 (m, 10H), 3.27-3.14 (m, 4H), 1.63-1.60 (m, 4H), 1.31-1.17 (m, 28H), 0.78 (t, J=7.2 Hz, 6H); $^{13}$C NMR (100 MHZ, CD$_3$OD): δ 172.6, 168.2, 104.6, 102.9, 81.2, 77.8, 76.6, 75.1, 74.8, 74.6, 74.1, 71.4, 69.0, 68.7, 62.7, 62.2, 50.0, 49.7, 49.5, 49.3, 49.1, 48.9, 48.7, 48.5, 33.1, 30.7, 30.5, 30.0, 27.1, 23.8, 14.6; HRMS (FAB$^+$): For C$_{51}$H$_{92}$N$_4$O$_{24}$ [M+Na]$^+$ 1167.5999, found 1167.6001.

<Preparation Example 27> Synthesis of TEM-E11

<27-1> Synthesis of Compound 1e

Compound 1e was synthesized in 48% yield according to Example 3-1. $^1$H NMR (400 MHz, CDCl$_3$): δ 4.41 (t, J=6.6 Hz, 4H), 1.82-1.72 (m, 4H), 1.34-1.27 (m, 32H), 0.88 (t, J=6.9 Hz, 6H); $^{13}$C NMR (100 MHz, CDCl$_3$): δ 172.7, 172.2, 69.6, 32.0, 29.7, 29.6, 29.6, 29.3, 28.5, 25.8, 22.8, 14.2.

<27-2> Synthesis of Compound 5e

Compound 5e was synthesized in 85% yield according to Example 3-2. $^1$H NMR (400 MHz, CDCl$_3$): δ 4.28 (m, J=6.6 Hz, 4H), 3.90 (m, 4H), 3.79 (m, 4H), 1.76-1.72 (m, 4H), 1.39-1.26 (m, 32H), 0.88 (t, J=7.2 Hz, 3H), 0.87 (t, J=7.2 Hz, 3H); $^{13}$C NMR (100 MHz, CDCl$_3$): δ 171.5, 167.8, 67.8, 61.60, 52.6, 32.0, 29.7, 29.6, 29.4, 28.8, 26.0, 22.8, 14.2.

<27-3> Synthesis of TEM-E11a

TEM-E11a was synthesized in 82% yield according to the general glycosylation reaction procedure of Example 3-3. $^1$H NMR (400 MHz, CDCl$_3$): δ 8.11 (d, J=7.1 Hz, 4H), 8.01 (d, J=7.2 Hz, 4H), 7.82 (d, J=7.2 Hz, 4H), 7.79-7.73 (m, 12H), 7.61 (d, J=7.4 Hz, 4H), 7.52-7.12 (m, 42H), 6.11 (t, J=10.0 Hz, 2H), 5.76-5.62 (m, 6H), 5.45-5.2130 (m, 4H), 4.92 (d, J=10.4 Hz, 2H), 4.78-4.75 (m, 2H), 4.65-4.56 (m, 4H), 4.47-4.24 (m, 6H), 4.10-4.03 (m, 6H), 3.81-3.78 (m, 2H), 3.58-3.49 (m, 4H), 1.67-1.62 (m, 4H), 1.32-1.22 (m, 32H), 0.88 (t, J=7.0 Hz, 6H); $^{13}$C NMR (100 MHz, CDCl$_3$): δ 172.3, 171.4, 166.5, 166.2, 165.8, 165.7, 165.4, 165.1, 161.0, 164.9, 133.5, 133.4, 133.3, 133.1, 130.0, 129.9, 129.8, 129.7, 129.5, 129.3, 129.0, 128.9, 128.6, 128.4, 128.3, 128.2, 128.1, 100.8, 96.3, 75.01, 72.9, 72.2, 70.9, 70.2, 69.2, 68.7, 67.4, 63.5, 62.5, 48.8, 32.0, 29.7, 29.7, 29.5, 29.4, 28.8, 26.0, 22.8, 14.2.

<27-4> Synthesis of TEM-E11

TEM-E11 was synthesized in 90% yield according to the general synthesis procedure for the deprotection reaction of Example 3-4. $^1$H NMR (400 MHZ, CD$_3$OD): δ 5.16 (d, J=7.0 Hz, 2H), 4.39-4.34 (m, 6H), 3.99-3.97 (m, 2H), 3.83-3.57 (m, 12H), 3.41-3.26 (m, 10H), 3.20-3.13 (m, 4H), 1.66-1.61 (m, 4H), 1.32-1.18 (m, 32H), 0.79 (t, J=7.2 Hz, 6H); $^{13}$C NMR (100 MHZ, CD$_3$OD): δ 172.7, 168.3, 104.7, 103.0, 81.3, 77.9, 76.7, 75.1, 74.8, 74.7, 74.2, 71.5, 69.0, 68.7, 62.8, 62.2, 50.0, 49.7, 49.5, 49.3, 49.1, 48.9, 48.7, 48.5, 33.2, 30.8, 30.6, 30.0, 27.1, 23.8, 14.6; HRMS (FAB$^+$): C$_{53}$H$_{96}$N$_4$O$_{24}$ [M+Na]$^+$ 1195.6312, found 1195.6306.

<Preparation Example 28> Synthesis of TEM-T7

<28-1> Synthesis of Compound 3a Compound 3a was synthesized in 85% yield according to Example 3-1. $^1$H NMR (400 MHz, CDCl$_3$): δ 4.42 (t, J=6.6 Hz, 4H), 1.81-1.77 (m, 4H), 1.44-1.30 (m, 16H), 0.89 (t, J=6.9 Hz, 6H); $^{13}$C NMR (100 MHz, CDCl$_3$): δ 172.7, 172.2, 69.6, 32.0, 29.6, 28.6, 25.9, 22.8, 14.2.

<28-2> Synthesis of Compound 6a

Compound 6a was synthesized in 82% yield according to Example 3-2. $^1$H NMR (400 MHz, CDCl$_3$): δ 4.65 (bs, 2H), 3.90-3.88 (m, 4H), 3.78-3.75 (m, 4H), 2.99 (t, J=7.4 Hz, 4H), 1.71-1.67 (m, 4H), 1.42-1.27 (m, 16H), 0.88 (t, J=7.0 Hz, 6H); $^{13}$C NMR (100 MHz, CDCl$_3$): δ 179.2, 162.1, 61.3, 52.8, 31.8, 30.1, 29.5, 29.0, 28.9, 22.6, 14.1.

<28-3> Synthesis of TEM-T7a

TEM-T7a was synthesized in 85% yield according to the general glycosylation reaction procedure of Example 3-3. $^1$H NMR (400 MHz, CDCl$_3$): δ 8.12 (d, J=7.2 Hz, 4H), 8.00 (d, J=7.2 Hz, 4H), 7.82 (d, J=7.2 Hz, 4H), 7.79-7.73 (m, 12H), 7.61 (d, J=7.3 Hz, 4H), 7.56-7.12 (m, 42H), 6.11 (t, J=10.0 Hz, 2H), 5.77-5.66 (m, 4H), 5.41-5.21 (m, 4H), 4.90 (d, J=10.5 Hz, 2H), 4.79-4.75 (m, 2H), 4.62-4.46 (m, 4H), 4.47-4.23 (m, 4H), 4.12-4.03 (m, 4H), 3.76 (t, J=7.0 Hz, 2H), 3.54-3.45 (m, 4H), 2.78 (t, J=7.2 Hz, 2H) 1.57-1.53 (m, 4H), 1.29-1.20 (m, 16H), 0.88 (t, J=7.0 Hz, 6H); $^{13}$C NMR (100 MHZ, CDCl$_3$): δ 172.3, 171.3, 166.5, 166.2, 165.8, 165.7, 165.4, 165.1, 161.0, 164.9, 133.5, 133.4, 133.3, 133.1, 130.0, 129.9, 129.8, 129.7, 129.5, 129.3, 129.0, 128.9, 128.6, 128.4, 128.3, 128.2, 128.1, 100.8, 96.3, 74.9, 72.8, 72.2, 70.8, 69.9, 69.1, 67.3, 63.4, 62.5, 48.8, 48.8, 31.8, 29.5, 29.3, 29.0, 28.7, 25.9, 22.6, 14.1.

<28-4> Synthesis of TEM-T7

TEM-T7 was synthesized in 90% yield according to the general synthesis procedure for the deprotection reaction of Example 3-4. $^1$H NMR (400 MHZ, CD$_3$OD): δ 5.16 (d, J=7.0 Hz, 2H), 4.33 (d, J=8.0 Hz, 2H), 3.96-3.92 (m, 2H), 3.83-3.79 (m, 4H), 3.75-3.65 (m, 8H), 3.54-3.38 (m, 10H), 3.32-3.22 (m, 4H), 3.15-3.10 (m, 4H), 2.91 (t, J=7.2 Hz, 4H), 1.60-1.53 (m, 4H), 1.31-1.16 (m, 16H), 0.78 (t, J=7.0 Hz, 6H); $^{13}$C NMR (100 MHZ, CD$_3$OD): δ 181.6, 163.8, 104.7, 103.0, 81.4. 81.3, 77.7, 76.7, 75.1, 74.9, 74.7, 74.2, 71.5, 69.4, 62.8, 51.8, 33.1, 31.1, 31.0, 30.9, 30.8, 30.8, 30.1, 23.8, 14.6; HRMS (FAB$^+$): For C$_{45}$H$_{80}$N$_4$O$_{22}$S$_2$ [M+Na]$^+$ 1115.4603, found 1115.4601.

<Preparation Example 29> Synthesis of TEM-T8

<29-1> Synthesis of Compound 3b

Compound 3b was synthesized in 84% yield according to Example 3-1. $^1$H NMR (400 MHz, CDCl$_3$): δ 4.42 (t, J=6.6 Hz, 4H), 1.81-1.77 (m, 4H), 1.44-1.30 (m, 20H), 0.89 (t, J=6.9 Hz, 6H); $^{13}$C NMR (100 MHZ, CDCl$_3$): δ 172.7, 172.2, 69.6, 32.0, 29.7, 29.6, 28.6, 25.9, 22.8, 14.2.

<29-2> Synthesis of Compound 6b

Compound 6b was synthesized in 83% yield according to Example 3-2. $^1$H NMR (400 MHz, CDCl$_3$): δ 4.65 (bs, 2H), 3.92-3.90 (m, 4H), 3.81-3.79 (m, 4H), 3.03 (t, J=8.0 Hz, 4H), 1.71-1.67 (m, 4H), 1.42-1.27 (m, 20H), 0.88 (t, J=7.0 Hz, 6H); $^{13}$C NMR (100 MHZ, CDCl$_3$): δ 179.8, 162.9, 62.0, 52.3, 32.0, 30.3, 29.6, 29.4, 29.1, 28.9, 22.6, 14.1.

<29-3> Synthesis of TEM-T8a

TEM-T8a was synthesized in 85% yield according to the general glycosylation reaction procedure of Example 3-3. $^1$H NMR (400 MHZ, CDCl$_3$): δ 8.12 (d, J=7.2 Hz, 4H), 8.00 (d, J=7.2 Hz, 4H), 7.82 (d, J=7.2 Hz, 4H), 7.79-7.73 (m, 12H), 7.61 (d, J=7.3 Hz, 4H), 7.56-7.12 (m, 42H), 6.11 (t, J=10.0 Hz, 2H), 5.77-5.66 (m, 4H), 5.41-5.21 (m, 4H), 4.90 (d, J=10.5 Hz, 2H), 4.79-4.75 (m, 2H), 4.62-4.46 (m, 4H), 4.47-4.23 (m, 4H), 4.12-4.03 (m, 4H), 3.76 (t, J=7.2 Hz, 2H), 3.54-3.45 (m, 4H), 2.78 (t, J=7.2 Hz, 2H) 1.57-1.53 (m, 4H), 1.29-1.20 (m, 20H), 0.88 (t, J=7.0 Hz, 6H); $^{13}$C NMR (100 MHZ, CDCl$_3$): δ 180.5, 179.8, 166.2, 165.9, 165.8, 165.5, 165.1, 164.8, 162.0, 134.0, 133.7, 133.4, 133.3, 130.1, 130.0, 129.9, 129.7, 129.5, 129.4, 129.2, 128.9, 128.7, 128.5, 128.3, 101.0, 95.6, 71.9, 71.3, 69.8, 69.1, 68.9, 63.2, 62.5, 32.0, 30.3, 29.7, 29.5, 29.3, 28.9, 22.7, 14.2.

<29-4> Synthesis of TEM-T8

TEM-T8 was synthesized in 94% yield according to the general synthesis procedure for the deprotection reaction of Example 3-4. $^1$H NMR (400 MHZ, CD$_3$OD): δ 5.16 (d, J=7.0 Hz, 2H), 4.33 (d, J=8.0 Hz, 2H), 3.96-3.92 (m, 2H), 3.82-3.80 (m, 4H), 3.74-3.68 (m, 8H), 3.57-3.39 (m, 10H), 3.27-3.24 (m, 4H), 3.15-3.11 (m, 4H), 2.91 (t, J=7.2 Hz, 4H), 1.59-1.52 (m, 4H), 1.30-1.15 (m, 20H), 0.77 (t, J=7.0 Hz, 6H); $^{13}$C NMR (100 MHZ, CD$_3$OD): δ 180.6, 163.0, 104.7, 103.0, 81.3, 77.9, 76.7, 75.2, 74.9, 74.8, 74.2, 71.5, 69.1, 62.8, 62.2, 33.1, 31.0, 30.5, 30.2, 23.8, 14.6; HRMS (FAB$^+$): For C$_{47}$H$_{84}$N$_4$O$_{22}$S$_2$ [M+Na]$^+$ 1143.4916, found 1143.4923. found 1129.4757.

<Preparation Example 30> Synthesis of TEM-T9

<30-1> Synthesis of Compound 3c

Compound 3c was synthesized in 86% yield according to Example 3-1. $^1$H NMR (400 MHz, CDCl$_3$): δ 4.42 (t, J=6.6 Hz, 4H), 1.81-1.78 (m, 4H), 1.43-1.30 (m, 24H), 0.89 (t, J=6.9 Hz, 6H); $^{13}$C NMR (100 MHz, CDCl$_3$): δ 172.7, 172.2, 69.6, 32.0, 29.6, 29.4, 28.6, 25.9, 22.8, 14.2.

<30-2> Synthesis of Compound 6c

Compound 6c was synthesized in 80% yield according to Example 3-2. $^1$H NMR (400 MHz, CDCl$_3$): δ 4.65 (bs, 2H), 3.92-3.90 (m, 4H), 3.81-3.79 (m, 4H), 3.03 (t, J=8.0 Hz, 4H), 1.71-1.67 (m, 4H), 1.42-1.27 (m, 24H), 0.88 (t, J=7.0 Hz, 6H); $^{13}$C NMR (100 MHZ, CDCl$_3$): δ 179.2, 162.1, 61.3, 52.8, 31.8, 30.1, 29.5, 29.2, 29.0, 28.9, 22.6, 14.1.

<30-3> Synthesis of TEM-T9a

TEM-T9a was synthesized in 82% yield according to the general glycosylation reaction procedure of Example 3-3. $^1$H NMR (400 MHZ, CDCl$_3$): δ 8.12 (d, J=7.2 Hz, 4H), 8.00 (d, J=7.2 Hz, 4H), 7.8 (d, J=7.2 Hz, 4H), 7.79-7.73 (m, 12H), 7.6 (d, J=7.3 Hz, 4H), 7.56-7.12 (m, 42H), 6.11 (t, J=10.0 Hz, 2H), 5.77-5.66 (m, 4H), 5.41-5.21 (m, 4H), 4.90 (d, J=10.5 Hz, 2H), 4.79-4.75 (m, 2H), 4.62-4.46 (m, 4H), 4.47-4.23 (m, 4H), 4.12-4.03 (m, 4H), 3.76 (t, J=7.2 Hz, 2H), 3.54-3.45 (m, 4H), 2.78 (t, J=7.2 Hz, 2H) 1.57-1.53 (m, 4H), 1.29-1.20 (m, 24H), 0.88 (t, J=7.0 Hz, 6H); $^{13}$C NMR (100 MHZ, CDCl$_3$): δ 180.5, 179.8, 166.2, 165.9, 165.8, 165.5, 165.1, 164.8, 162.0, 134.0, 133.7, 133.4, 133.3, 130.1, 130.0, 129.9, 129.7, 129.5, 129.4, 129.2, 128.9, 128.7, 128.5, 128.3, 101.0, 95.6, 71.9, 71.3, 69.8, 69.1, 68.9, 63.2, 62.5, 32.0, 30.3, 29.7, 29.5, 29.3, 28.9, 22.7, 14.2.

<30-4> Synthesis of TEM-T9

TEM-T9 was synthesized in 94% yield according to the general synthesis procedure for the deprotection reaction of Example 3-4. $^1$H NMR (400 MHZ, CD$_3$OD): δ 5.16 (d, J=7.0 Hz, 2H), 4.34 (d, J=8.0 Hz, 2H), 3.95-3.91 (m, 2H), 3.82-3.79 (m, 4H), 3.75-3.65 (m, 8H), 3.54-3.38 (m, 10H), 3.32-3.22 (m, 4H), 3.15-3.10 (m, 4H), 2.91 (t, J=7.2 Hz, 4H), 1.59-1.52 (m, 4H), 1.30-1.15 (m, 24H), 0.76 (t, J=7.2 Hz, 6H); $^{13}$C NMR (100 MHZ, CD$_3$OD): δ 180.4, 162.9, 104.7, 103.0, 81.3, 77.9, 76.7, 75.1, 74.8, 74.7, 74.2, 72.5, 69.1, 62.8, 62.2, 33.2, 31.1, 31.0, 30.8, 30.5, 30.1, 14.6; HRMS (FAB$^+$): For C$_{49}$H$_{88}$N$_4$O$_{22}$S$_2$ [M+Na]$^+$ 1171.5229, found 1171.5233.

<Preparation Example 31> Synthesis of TEM-T10

<31-1> Synthesis of Compound 3d Compound 3d was synthesized in 83% yield according to Example 3-1. $^1$H NMR (400 MHz, CDCl$_3$): δ 4.42 (t, J=6.6 Hz, 4H), 1.81-1.78 (m, 4H), 1.43-1.30 (m, 28H), 0.89 (t, J=6.9 Hz, 6H); $^{13}$C NMR (100 MHz, CDCl$_3$): δ 172.7, 172.2, 69.6, 64.3, 32.0, 29.7, 29.6, 29.4, 28.6, 25.9, 22.8, 14.2.

<31-2> Synthesis of Compound 6d

Compound 6d was synthesized in 82% yield according to Example 3-2. $^1$H NMR (400 MHz, CDCl$_3$): δ 3.92-3.90 (m, 4H), 3.80-3.78 (m, 4H), 3.02 (t, J=8.0 Hz, 4H), 1.70-1.67 (m, 4H), 1.42-1.27 (m, 28H), 0.88 (t, J=7.0 Hz, 6H); $^{13}$C NMR (100 MHZ, CDCl$_3$): δ 179.2, 162.9, 52.4, 34.2, 32.1, 30.3, 29.7, 29.6, 29.5, 29.4, 29.2, 29.1, 22.8, 14.3.

<31-3> Synthesis of TEM-T10a

TEM-T10a was synthesized in 80% yield according to the general glycosylation reaction procedure of Example 3-3. $^1$H NMR (400 MHZ, CDCl$_3$): δ 8.12 (d, J=7.2 Hz, 4H), 8.00 (d, J=7.2 Hz, 4H), 7.82 (d, J=7.2 Hz, 4H), 7.79-7.73 (m, 12H), 7.61 (d, J=7.3 Hz, 4H), 7.56-7.12 (m, 42H), 6.11 (t, J=10.0 Hz, 2H), 5.77-5.66 (m, 4H), 5.41-5.21 (m, 4H), 4.90 (d, J=10.5 Hz, 2H), 4.79-4.75 (m, 2H), 4.62-4.46 (m, 4H), 4.47-4.23 (m, 4H), 4.12-4.03 (m, 4H), 3.76 (t, J=7.2 Hz, 2H), 3.54-3.45 (m, 4H), 2.78 (t, J=7.2 Hz, 2H) 1.57-1.53 (m, 4H), 1.29-1.20 (m, 28H), 0.88 (t, J=7.0 Hz, 6H); $^{13}$C NMR (100 MHZ, CDCl$_3$): δ 180.5, 179.8, 166.2, 166.1, 165.9, 165.5, 165.1, 164.9, 162.1, 134.1, 133.7, 133.5, 133.4, 133.2, 130.0, 129.8, 129.7, 129.5, 129.4, 129.3, 129.0, 128.9, 128.7, 128.5, 128.4, 101.0, 95.6, 75.5, 71.9, 71.3, 69.8, 69.1, 69.0, 63.2, 62.6, 32.0, 30.3, 30.1, 29.7, 29.4, 29.3, 28.9, 22.8, 14.2.

<31-4> Synthesis of TEM-T10

TEM-T10 was synthesized in 95% yield according to the general synthesis procedure for the deprotection reaction of Example 3-4. $^1$H NMR (400 MHZ, CD$_3$OD): δ 5.17 (d, J=7.0 Hz, 2H), 4.35 (d, J=8.0 Hz, 2H), 3.95-3.91 (m, 2H), 3.82-3.79 (m, 4H), 3.75-3.65 (m, 8H), 3.54-3.38 (m, 10H), 3.32-3.22 (m, 4H), 3.15-3.10 (m, 4H), 2.91 (t, J=7.2 Hz, 4H), 1.59-1.52 (m, 4H), 1.30-1.15 (m, 28H), 0.76 (t, J=7.0 Hz, 6H); $^{13}$C NMR (100 MHZ, CD$_3$OD): δ 180.4, 163.2, 104.9 104.7, 103.0, 81.4, 81.3, 77.7, 76.7, 75.1, 74.9, 74.7, 74.2, 71.5, 62.8, 62.2, 33.2, 31.1, 31.0, 30.8, 30.6, 30.5, 30.1, 23.9 14.6; HRMS (FAB$^+$): For $C_{51}H_{92}N_4O_{22}S_2$ [M+Na]$^+$ 1199.5542, found 1199.5549.

<Preparation Example 32> Synthesis of TEM-T11

<32-1> Synthesis of Compound 3e

Compound 3e was synthesized in 82% yield according to Example 3-1. $^1$H NMR (400 MHz, CDCl$_3$): δ 4.42 (t, J=6.8 Hz, 4H), 1.81-1.78 (m, 4H), 1.43-1.30 (m, 32H), 0.89 (t, J=6.9 Hz, 6H); $^{13}$C NMR (100 MHz, CDCl$_3$): δ 172.7, 172.2, 69.6, 32.0, 29.7, 29.6, 29.6, 29.3, 28.5, 25.8, 22.8, 14.2.

<32-2> Synthesis of Compound 6e

Compound 6e was synthesized in 84% yield according to Example 3-2. $^1$H NMR (400 MHz, CDCl$_3$): δ 4.62 (bs, 2H), 3.92-3.88 (m, 4H), 3.78-3.75 (m, 4H), 2.99 (t, J=7.4 Hz, 4H), 1.71-1.67 (m, 4H), 1.42-1.27 (m, 32H), 0.88 (t, J=7.0 Hz, 6H); $^{13}$C NMR (100 MHZ, CDCl$_3$): δ 179.6, 162.6, 61.8, 52.6, 34.2, 32.1, 30.3, 29.8, 29.7, 29.6, 29.5, 29.2, 29.1, 28.5, 24.8, 22.6, 14.1.

<32-3> Synthesis of TEM-T11a

TEM-T11a was synthesized in 85% yield according to the general glycosylation reaction procedure of Example 3-3. $^1$H NMR (400 MHZ, CDCl$_3$): δ 8.12 (d, J=7.2 Hz, 4H), 8.00 (d, J=7.2 Hz, 4H), 7.82 (d, J=7.2 Hz, 4H), 7.79-7.73 (m, 12H), 7.61 (d, J=7.3 Hz, 4H), 7.56-7.12 (m, 42H), 6.11 (d, J=10.0 Hz, 2H), 5.77-5.66 (m, 4H), 5.41-5.21 (m, 4H), 4.90 (d, J=10.5 Hz, 2H), 4.79-4.75 (m, 2H), 4.62-4.46 (m, 4H), 4.47-4.23 (m, 4H), 4.12-4.03 (m, 4H), 3.76 (t, J=7.2 Hz, 2H), 3.54-3.45 (m, 4H), 2.78 (t, J=7.2 Hz, 2H) 1.57-1.53 (m, 4H), 1.29-1.20 (m, 32H), 0.88 (t, J=7.0 Hz, 6H); $^{13}$C NMR (100 MHZ, CDCl$_3$): δ 179.0, 171.1, 166.1, 165.8, 165.6, 165.4. 165.1, 165.0, 164.9, 161.2, 149.4, 133.4, 133.1, 130.0, 129.9, 129.8, 129.7, 129.6, 129.5, 129.3, 129.0, 128.9, 128.7, 128.6, 128.5, 128.4. 128.2. 128.1, 100.8, 96.3, 72.8, 72.7, 72.2, 69.9, 69.0, 68.3, 63.4, 62.5, 60.4, 53.5, 48.7, 31.9, 31.6, 30.0, 29.6, 29.4, 29.3, 29.0, 22.7, 21.0, 14.2.

<32-4> Synthesis of TEM-T11

TEM-T11 was synthesized in 92% yield according to the general synthesis procedure for the deprotection reaction of Example 3-4. $^1$H NMR (400 MHZ, CD$_3$OD): δ 5.17 (d, J=7.0 Hz, 2H), 4.34 (d, J=8.0 Hz, 2H), 3.96-3.92 (m, 2H), 3.80-3.67 (m, 4H), 3.75-3.65 (m, 8H), 3.51-3.31 (m, 10H), 3.26-3.25 (m, 4H), 3.13-3.10 (m, 4H), 2.90 (t, J=7.2 Hz, 4H), 1.59-1.52 (m, 4H), 1.27-1.15 (m, 32H), 0.78 (t, J=7.0 Hz, 6H); $^{13}$C NMR (100 MHz, CD$_3$OD): δ 180.5, 163.0, 104.6, 103.0, 81.3, 77.9, 76.7, 75.1, 74.8, 74.7, 74.2, 72.5, 69.1, 62.8, 62.2, 33.2, 31.1, 31.0, 30.9, 30.8, 30.6, 30.5, 30.2, 23.9, 14.6; HRMS (FAB$^+$): For $C_{53}H_{96}N_4O_{22}S_2$ [M+Na]$^+$ 1227.5855, found 1227.5847.

<Experimental Example 1> Properties of TSMs, TTGs and TEMs

To confirm the properties of TSMs, TTGs and TEMs synthesized by the synthetic methods of Examples 1 to 3, the molecular weights (MWs) and critical micelle concentrations (CMCs) of TSMs, TTGs and TEMs and the hydrodynamic radii (Rh) of formed micelles were measured.

Specifically, the critical micelle concentrations (CMCs) were measured using a fluorescent dye, diphenylhexatriene (DPH), and the hydrodynamic radii (Rh) of micelles formed by each preparation (1.0 wt %) were determined by a dynamic light scattering (DLS) experiment. The measured results are shown in Table 1 compared to DDM which is an existing amphiphilic molecule (detergent).

TABLE 1

| detergent | MW$^a$ | CMC (mM) | Rh$^b$(nm) | solubility |
|---|---|---|---|---|
| TSM-E7 | 1047.1 | ~0.04 | 3.4 ± 0.1 | ~10% |
| TSM-E8 | 1075.2 | ~0.02 | 3.6 ± 0.1 | ~10% |
| TSM-E9 | 1103.2 | ~0.01 | 4.0 ± 0.1 | ~10% |
| TSM-E10 | 1131.3 | ~0.004 | 8.7 ± 0.7 | ~5% |
| TSM-E11 | 1159.3 | ~0.002 | 56.2 ± 9.9 | ~1% |
| TSM-T7 | 1079.2 | ~0.01 | 3.6 ± 0.1 | ~10% |
| TSM-T8 | 1107.3 | ~0.006 | 4.2 ± 0.0 | ~10% |
| TSM-T9 | 1135.3 | ~0.004 | 5.1 ± 0.1 | ~10% |
| TSM-T10 | 1163.4 | ~0.003 | 38.2 ± 1.8 | ~5% |
| TSM-T11 | 1191.5 | ~0.001 | 94.8 ± 45 | ~1% |
| TEM-E7 | 1093.3 | ~0.03 | 3.3 ± .0 | ~10% |
| TEM-E8 | 1121.3 | ~0.02 | 3.4 ± 0.1 | ~10% |
| TEM-E9 | 1149.4 | ~0.009 | 3.9 ± 0.1 | ~10% |
| TEM-E10 | 1177.4 | ~0.005 | 4.5 ± 0.1 | ~5% |
| TEM-E11 | 1205.5 | ~0.001 | 25.2 ± 1.2 | ~1% |
| TEM-T7 | 1125.4 | ~0.008 | 3.5 ± 0.0 | ~10% |
| TEM-T8 | 1153.4 | ~0.004 | 3.6 ± 0.0 | ~10% |
| TEM-T9 | 1181.5 | ~0.003 | 4.0 ± 0.1 | ~10% |
| TEM-T10 | 1209.5 | ~0.0025 | 4.3 ± 0.0 | ~5% |
| TEM-T11 | 1237.6 | ~0.001 | 31.8 ± 0.3 | ~1% |
| TTG-T7 | 947.11 | ~0.02 | 2.8 ± 0.16 | ~10% |
| TTG-T8 | 975.17 | ~0.015 | 2.9 ± 0.09 | ~10% |
| TTG-T9 | 1003.22 | ~0.010 | 3.3 ± 0.11 | ~10% |
| TTG-T10 | 1031.28 | ~0.006 | 3.6 ± 0.10 | ~10% |
| TTG-T11 | 1059.33 | ~0.004 | 3.7 ± 0.09 | ~10% |
| TTG-T12 | 1087.38 | ~0.0035 | 5.5 ± 0.20 | ~5% |
| TTG-A8 | 941.08 | ~0.6 | 2.1 ± 0.56 | ~10% |
| TTG-A9 | 969.17 | ~0.5 | 2.2 ± 0.20 | ~10% |
| TTG-A10 | 997.19 | ~0.3 | 2.3 ± 0.14 | ~10% |
| TTG-A11 | 1025.25 | ~0.2 | 2.4 ± 0.11 | ~10% |
| TTG-A12 | 1053.30 | ~0.04 | 2.5 ± 0.07 | ~5% |
| TTG-A14 | 1109.41 | ~0.008 | 3.2 ± 0.05 | ~1% |
| TTG-10, 10 | 1031.28 | ~0.005 | 3.6 ± 0.01 | ~10% |
| TTG-9, 11 | 1031.28 | ~0.004 | 3.7 ± 0.07 | ~10% |
| TTG-8, 12 | 1031.28 | ~0.003 | 3.6 ± 0.07 | ~10% |
| TTG-6, 14 | 1031.28 | ~0.002 | 3.6 ± 0.04 | ~10% |
| TTG-4, 16 | 1031.28 | ~0.001 | 3.6 ± 0.03 | ~10% |
| TTG-11, 11 | 1059.34 | ~0.004 | 3.7 ± 0.09 | ~10% |
| TTG-10, 12 | 1059.34 | ~0.003 | 3.6 ± 0.06 | ~10% |
| TTG-8, 14 | 1059.34 | ~0.003 | 2.6 ± 0.02 | ~10% |
| TTG-6, 16 | 1059.34 | ~0.002 | 4.0 ± 0.04 | ~10% |
| DDM | 510.62 | ~0.17 | 3.4 ± 0.03 | ~10% |

Figure 4:
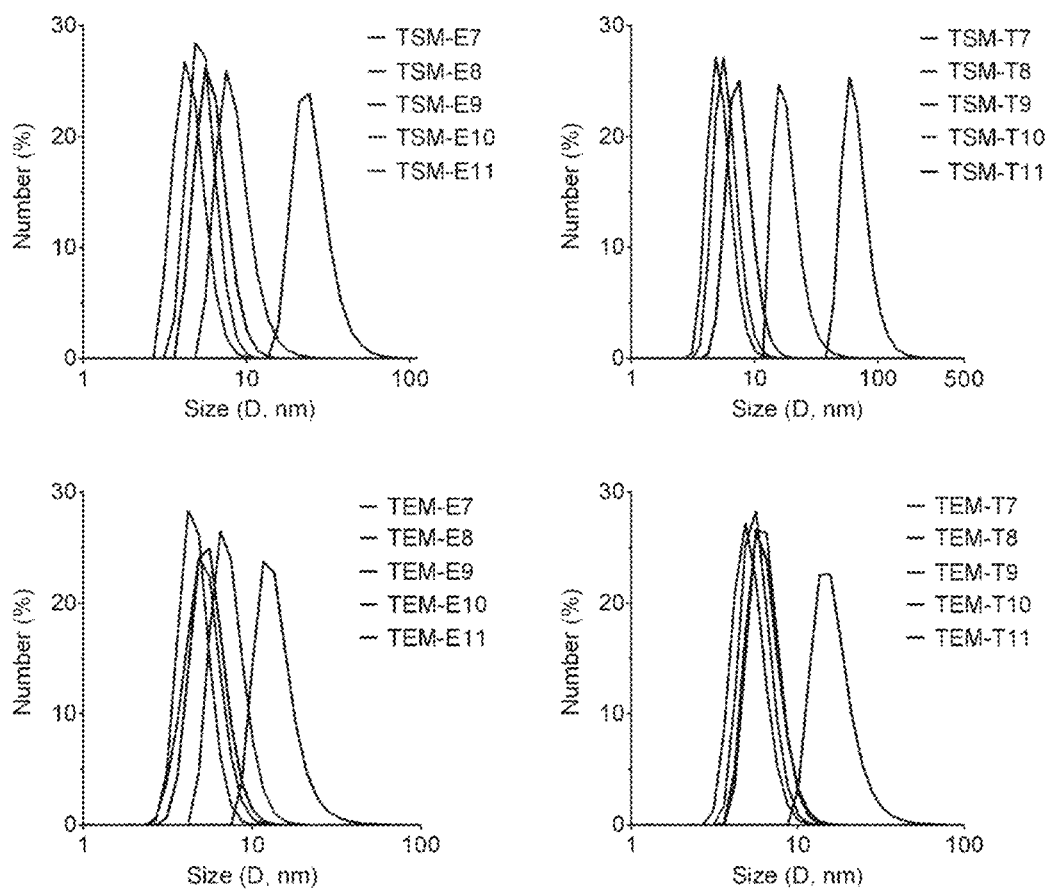
FIG. 4 is a set of views illustrating the size distribution map of micelles formed by TSMs and TEMs.
Figure 5:
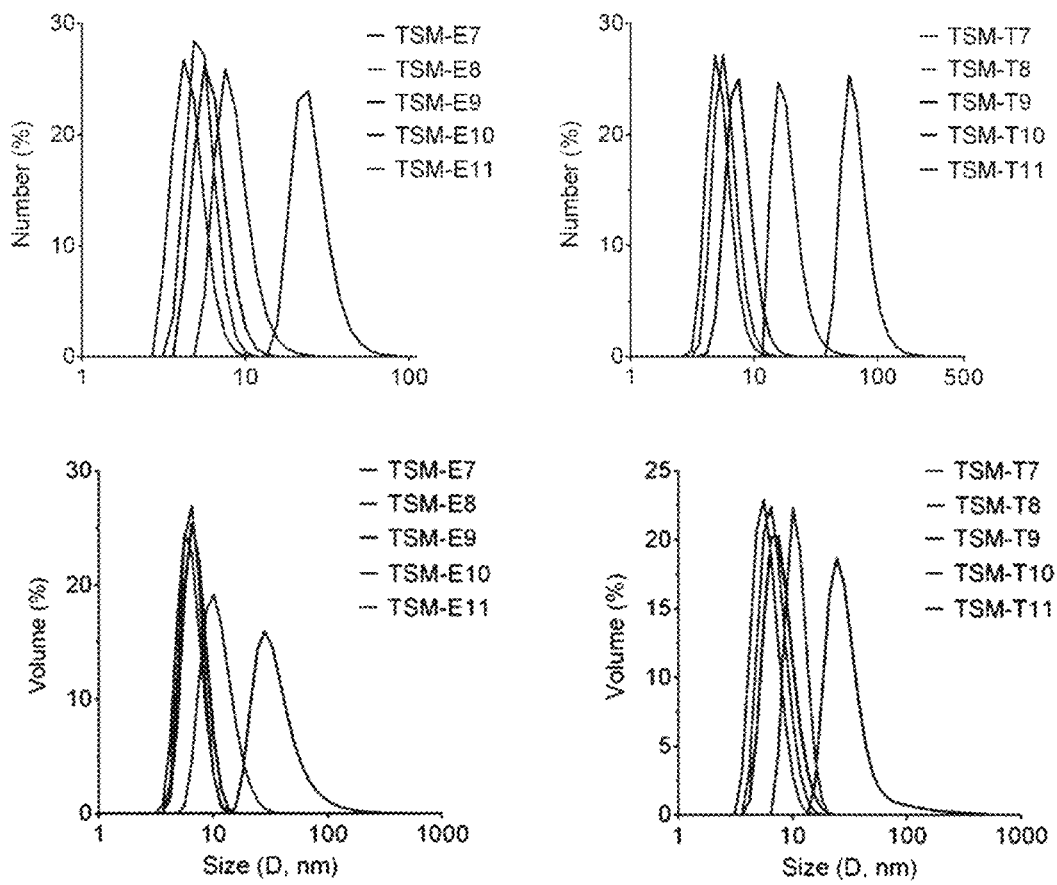
FIG. 5 is a set of views illustrating the size distribution map of micelles formed by TSMs and TEMs.

The CMC values (0.001 to 0.6 mM) of most TSMs, TTGs and TEMs except for some TTG-As compounds were significantly lower than the CMC value (0.17 mmM) of DDM. Therefore, TSMs, TTGs and TEMs easily form micelles even at low concentrations, indicating a higher tendency to self-assemble. In addition, the CMC values of TSMs, TTGs and TEMs decreased with increasing alkyl chain length, which is determined to be due to the increase in hydrophobicity as the alkyl chain length increases. Furthermore, compounds including a thioether (TSM-Ts TTG-Ts and TEM-Ts) have lower CMC values than compounds including an ether (TSM-Es and TEM-Es), which is determined to be because a thioether exhibits higher hydrophobicity than an ether. The sizes of micelles formed by TSMs, TTGs and TEMs generally showed a tendency to increase as the alkyl chain length increased. This is due to a change in geometry of amphiphilic molecules from a conical to cylindrical shape as the alkyl chain length increases. It was confirmed that TTGs form micelles that are generally smaller than TEMs and TSMs. Meanwhile, as a result of examining the size distribution of micelles formed by TSMs and TEMs through DLS, the number- and volume-weighted size distributions both showed a single set of populations, indicating high homogeneity (FIGS. 4 and 5).

From these results, it could be confirmed that the TSMs and TEMs of the present invention have lower CMC values than DDM, and thus have a much higher tendency to self-assemble because micelles are easily formed even in small amounts, that the sizes of micelles formed by TSMs and TEMs differ depending on the structure of a linker and the type of atom (oxygen or sulfur) constituting the linker, and that the micelles formed by TSMs and TEMs have high homogeneity.

<Experimental Example 2> Evaluation of Ability of TSMs, TTGs and TEMs to Stabilize Structure of LeuT Membrane Protein Experiments were performed to measure the structural stability of the LeuT protein by TSMs, TTGs and TEMs. Each amphiphilic compound was used at a concentration of (a) CMC+0.04 wt % or (b) CMC+0.2 wt %, and the substrate binding properties of LeuT were measured using [$^3$H]-Leu via scintillation proximity assay (SPA). The measurement was performed at regular intervals over the course of a 13-day and 12-day incubation at room temperature, respectively.

Specifically, a wild-type leucine transporter (LeuT) derived from the thermophilic bacterium *Aquifex aeolicus* was purified by a previously described method (*Nature* 1998, 392, 353-358 by G. Deckert et al.). LeuT was expressed in *E. coli* C41 (DE3) transformed with pET16b encoding the C-terminal 8×His-tagged transporter (expression plasmids were provided from Dr E. Gouaux, Vollum Institute, Portland, Oregon, USA). In summary, after a bacterial membrane was isolated and solubilized in 1 wt % DDM, the protein was bound to Ni$^{2+}$-NTA resin (Life Technologies, Denmark), and eluted in 20 mM Tris-HCl (pH 8.0), 1 mM NaCl, 199 mM KCl, 0.05% (w/v) DDM and 300 mM imidazole. Then, the purified LeuT (0.5 mg/ml) was diluted with buffers supplemented with TSMs, TTGs, TEMs or DDM at a final concentration of CMC+0.04% (w/v) or CMC+0.2% (w/v) except for DDM and imidazole in the equivalent buffer described above. Protein samples were incubated at room temperature for 13 days, centrifuged at a specified time, and protein properties were confirmed by measuring [$^3$H]-Leucine binding ability using SPA. SPA was performed with 5 μL of each protein sample in a buffer containing 450 mM NaCl and each of TSMs and TEMs (or DDM). The SPA reaction was performed in the presence of 20 nM [$^3$H]-Leucine and 1.25 mg/ml copper chelate (His-Tag) YSi beads (PerkinElmer, Denmark). Overall [$^3$H]-Leucine coupling to each sample was measured using a MicroBeta liquid scintillation counter (Perkin Elmer).

Figure 6:
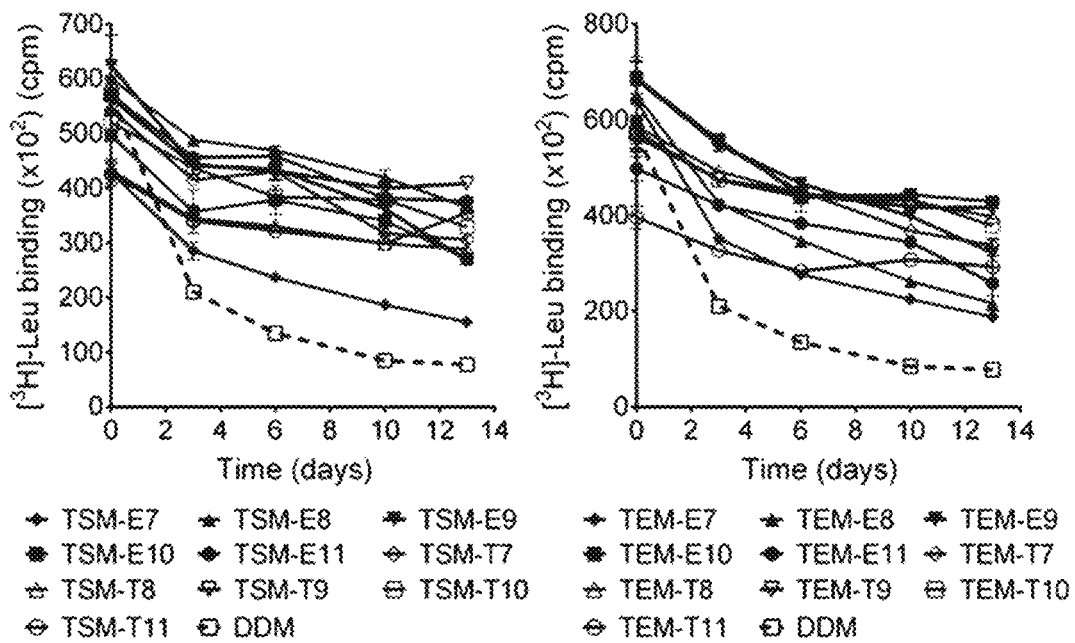
FIG. 6 illustrates the results of measuring leucine transporter (LeuT) structural stability in an aqueous solution by TSMs, TEMs or DDM at CMC+0.04 wt %. Protein stability was confirmed by measuring the substrate binding properties of the transporter via scintillation proximity assay (SPA). The substrate binding properties of the proteins were measured at regular intervals while incubating LeuT for 13 days at room temperature in the presence of each amphiphilic compound.
Figure 7:
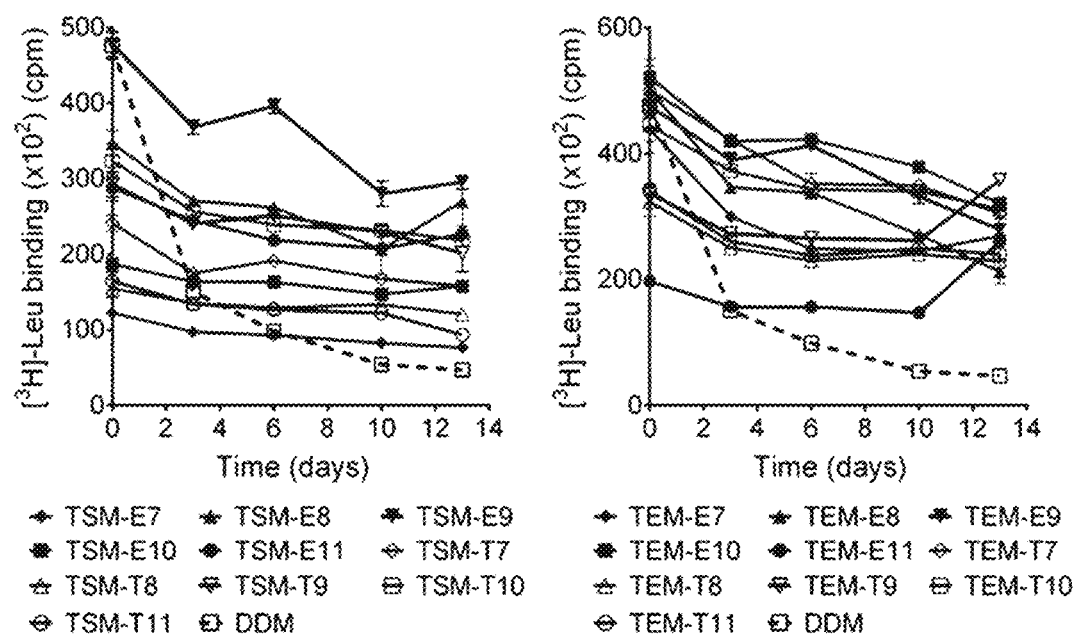
FIG. 7 illustrates the results of measuring leucine transporter (LeuT) structural stability in an aqueous solution by TSMs, TEMs or DDM at CMC+0.2 wt %. Protein stability was confirmed by measuring the substrate binding properties of the transporter via scintillation proximity assay (SPA). The substrate binding properties of the proteins were measured at regular intervals while incubating LeuT for 12 days at room temperature in the presence of each amphiphilic compound.
Figure 8:
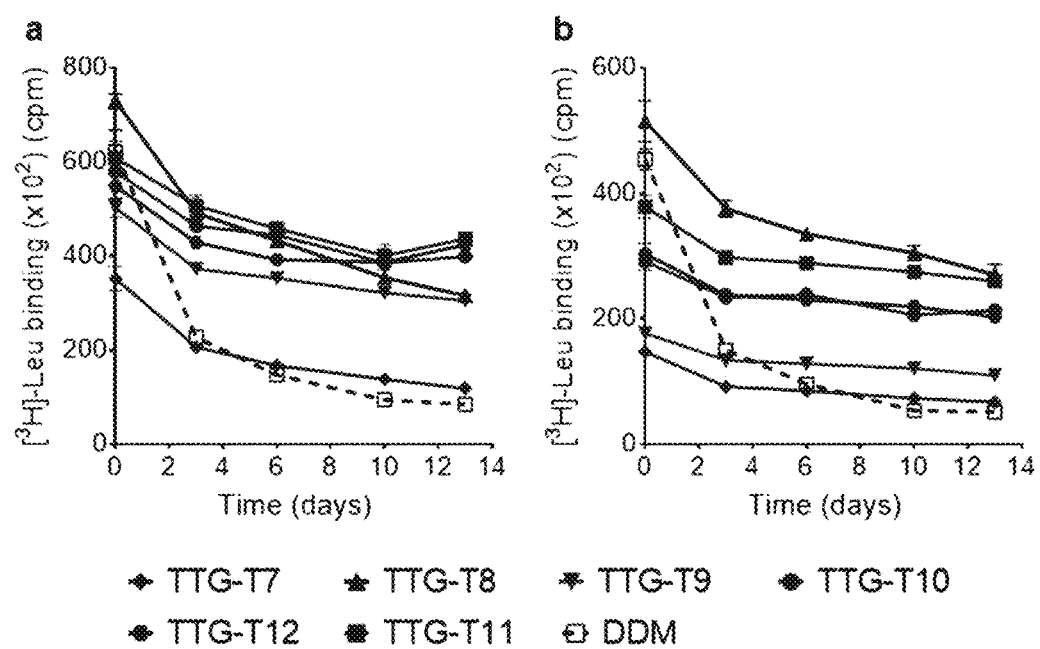
FIG. 8 illustrates the results of measuring leucine transporter structural stability in an aqueous solution by TTGs or DDM at (A) CMC+0.04 wt % or (B) CMC+0.2 wt %. Protein stability was confirmed by measuring the substrate binding properties of the transporter via scintillation proximity assay (SPA). The substrate binding properties of the proteins were measured at regular intervals while incubating LeuT for 12 days at room temperature in the presence of each amphiphilic compound.

As illustrated in FIGS. 6 to 8, all TSMs, TTGs and TEMs had an excellent effect of maintaining the substrate binding properties of LeuT during a 13-day incubation period. That is, most TSMs, TTGs and TEMs completely retained the transporter substrate binding properties for a long time even at high compound concentrations. In contrast, it was confirmed that DDM had high initial activity, but the substrate binding ability sharply decreased with the passage of time. In particular, the best substrate binding activity was confirmed in compounds having intermediate alkyl chain lengths (TSM-E8/T9/T10, TTG-T10/T11/T12 and TEM-E10/T8/T9/T10), whereas compounds having short alkyl chain lengths are excellent in terms of long-term stability. Further, it was confirmed that TEMs generally have an excellent effect on maintaining LeuT stability compared to TSMs and TTGs.

It was confirmed that, at CMC+0.2 wt %, most TSMs, TTGs and TEMs had low initial activity, but were effective in maintaining the initial activity for a long period of time, compared to DDM, and after a certain period of time passed, most TSMs, TTGs and TEMs exhibited excellent activity compared to DDM.

These results suggest that the types of structural linkers (serinol or diethanolamine) and the alkyl chain lengths of overall TSMs and TEMs acted as important factors in maintaining LeuT structural stability.

<Experimental Example 3> Evaluation of Ability of TSMs, TTGs and TEMs to Stabilize Structure of MelB Membrane Protein Experiments were performed to measure the structural stability of *Salmonella typhimurium* melibiose permease (MelB$_{St}$) protein by TSMs, TTGs and TEMs. After the MelB protein was extracted from the membrane using TSMs, TTGs, TEMs or DDM, the amount and structure of the extracted protein were analyzed by SDS-PAGE and Western blotting. The concentration of the amphiphilic compound used was 1.5 wt %, the protein was extracted at 0° C. for 90 minutes and then the extracted protein was incubated at three high temperatures (45, 55, and 65° C.) for an additional 90 minutes. By measuring the amount of protein remaining in a dissolved state in an aqueous solution of the extracted protein and the heat-treated protein, we tried to evaluate the performance of both the protein extraction efficiency and stabilization ability of the compound at the same time. The amount of protein extracted and stabilized by each amphiphilic molecule is shown as a value (%) relative to the amount of total protein contained in the membrane sample untreated with the amphiphilic molecule.

Specifically, *Salmonella typhimurium* melibiose permease (MelB$_{St}$) having a 10-His tag at the C-terminus was expressed in *E. coli* DW2 cells (βmelB and βlacZY) using a plasmid pK95βAHB/WT MelB$_{St}$/CH10. Cell growth and membrane preparation were performed according to the method described in the paper by A. S. Ethayathulla et al. (*Nat. Commun.* 2014, 5, 3009). Protein assay was performed with a Micro BCA kit (Thermo Scientific, Rockford, IL). TSMs, TEMs or DDM were evaluated for MelB$_{St}$ stability using the protocol described in *Nat. Methods* 2010, 7, 1003-1008 by P. S. Chae et al. A membrane sample containing MelB$_{St}$ (final protein concentration was 10 mg/mL) was incubated in a solubilizing buffer (20 mM sodium phosphate, pH 7.5, 200 mM NaCl, 10% glycerol, and 20 mM melibiose) containing 1.5% (w/v) DDM, TSMs, TTGs or TEMs at four temperatures (0, 45, 55, and 65° C.) for 90 minutes. To remove insoluble materials, ultracentrifugation was performed at 355,590 g using a Beckman Optima™ MAX ultracentrifuge equipped with a TLA-100 rotor at 4° C. for 45 minutes. The solubilized portion was isolated by SDS-16% PAGE, and then immunoblotted with a HisProbe-HRP antibody (Thermo Scientific). A membrane fraction containing 20 μg of the protein without any treatment was used to show the entire MelB, and treated samples were loaded into each well in equivalent volumes. MelB$_{St}$ was measured by an ImageQuant LAS 4000 Biomolecular Imager (GE Health Care Lifer Science) using a SuperSignal West Pico chemiluminescent substrate.

Figure 9:
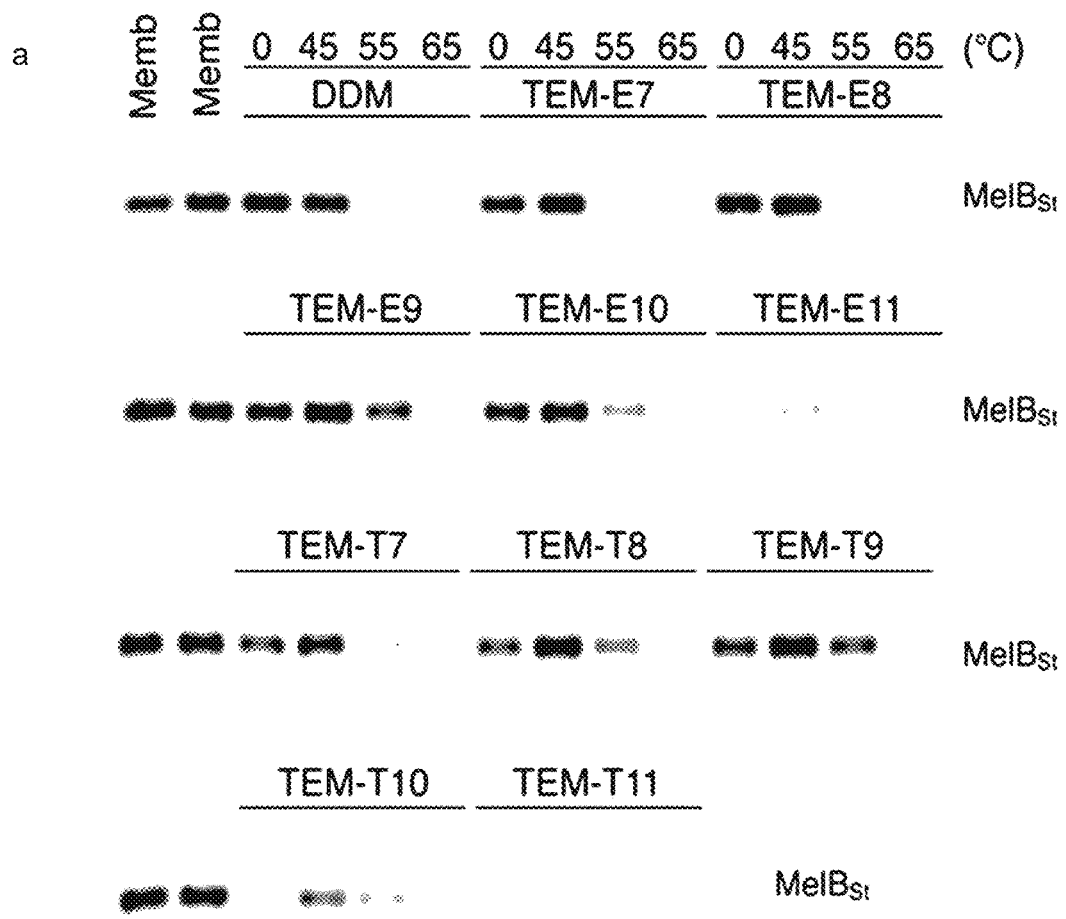
FIG. 9 illustrates the results of, after extracting MelB protein at 0° C. for 90 minutes using TEMs or DDM, further incubating the extracted protein at four high temperatures (0, 45, 55, and 65° C.) for 90 minutes, and then measuring the amount of MelB protein dissolved in an aqueous solution.
Figure 9:
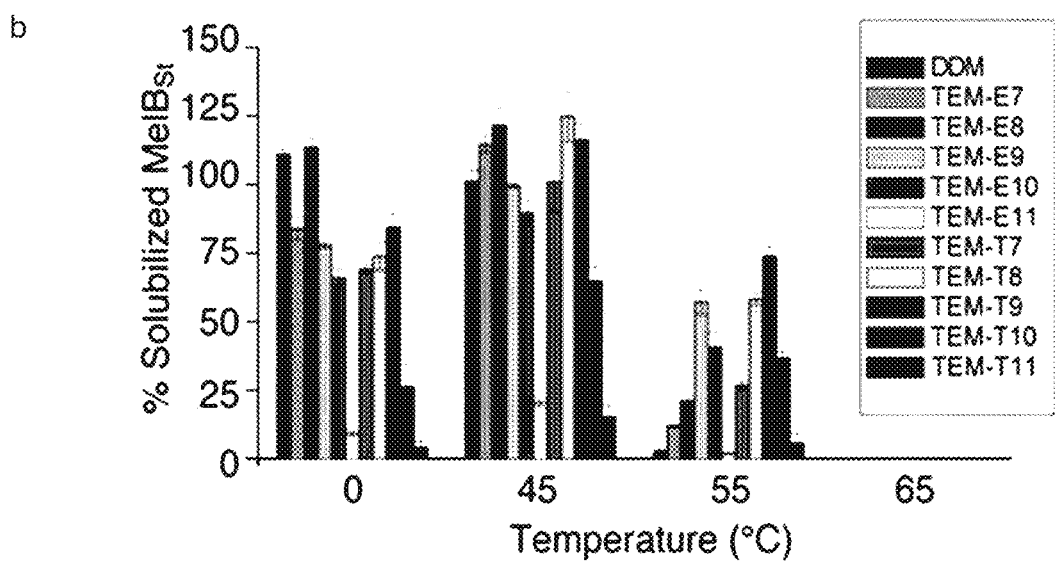

As shown in the results illustrated in FIGS. 9 to 11, DDM showed high MelB protein extraction efficiency at 0° C. compared to all TEMs, TTGs and TSMs except for TEM-E8.

However, it could be confirmed that when the temperature was raised to 45° C., the ability of DDM to solubilize the MelB protein deteriorated, whereas all TEMs had enhanced MelB protein-solubilizing ability compared to 0° C., and TEMs (E7/E8/E9/T7/T8/T9) showed the ability to maintain a better protein solubilization state than DDM. In the case of TSMs, like TEMs, MelB protein solubilization efficiency increased at 45° C. compared to 0° C., but was lower than that of DDM. It could be confirmed that the ability of TTGs to solubilize the MelB protein was enhanced compared to 0° C., and TTGs (T9/T10) exhibited a better ability to solubilize the protein than DDM.

When the temperature was raised to 55° C., the ability of DDM to solubilize the protein remarkably deteriorated, but most TEMs, TTGs and TSMs showed a better ability to maintain the MelB protein solubilization state than DDM. At a temperature of 65° C., no solubilized MelB protein was identified in all of TEMs, TTGs, TSMs and DDM.

As a whole, it could be confirmed that at a low temperature (0° C.), DDM showed higher protein extraction efficiency than TEMs, TTGs and TSMs, whereas as the temperature increased (45° C. and 55° C.), the amount of MelB protein solubilized by TEMs, TTGs and TSMs was increased compared to that of DDM, and therefore, it was confirmed that DDM has excellent protein extraction efficiency, but TEMs, TTGs and TSMs are better in the ability to maintain the protein solubilization state, that is, the ability to stabilize the protein.

<Experimental Example 4> Evaluation of Ability of TSMs, TTGs and TEMs to Structurally Stabilize $\beta_2$AR Membrane Proteins Experiments were performed to measure the structural stability of the human $\beta_2$ adrenergic receptor ($\beta_2$AR) and G-protein-coupled receptor (GPCR) by TSMs, TTGs and TEMs. That is, a receptor purified by DDM was subjected to amphiphilic molecular exchange when diluted with a buffer solution containing only each of TSMs, TTGs and TEMs without cholesteryl hemisuccinate (CHS) or a buffer solution containing CHS and DDM. The final concentration of the amphiphilic molecule was CMC+0.2 wt %, and the ligand binding properties of the receptor were measured by binding of [$^3$H]-dihydroalprenolol ([$^3$H]-DHA). Specifically, the following method was used for a radioligand binding test. $\beta_2$AR was purified using 0.1% DDM (D. M. Rosenbaum et al., Science, 2007, 318, 1266-1273.) and finally concentrated to about 10 mg/ml (about 200 μM). A master binding mixture containing 10 nM [$^3$H]-dihydroalprenolol (DHA) supplemented with 0.5 mg/ml BSA in 0.2% amphiphilic compounds (DDM, TSMs, TTGs or TEMs) was prepared using $\beta_2$AR purified with DDM. Receptors purified with DDM, TSMs, TTGs or TEMs were incubated with 10 nM [$^3$H]-DHA at room temperature for 6 days. The mixture was loaded onto a G-50 column and a flow through was collected with 1 ml of a binding buffer (20 mM HEPES supplemented with 0.5 mg/ml BSA and 20×CMC each amphiphilic compound, pH 7.5, 100 mM NaCl), and filled with 15 ml of a scintillation fluid. Receptor-bound [$^3$H]-DHA was measured by a scintillation counter (Beckman). The binding of [$^3$H]-DHA is shown as a column graph.

As illustrated in FIGS. 12 to 14, in the ligand binding properties of the receptor immediately after the amphiphilic molecular exchange, most TSMs, TTGs and TEMs were similar or superior compared to DDM (FIGS. 12 and 14).

Furthermore, a test to confirm long-term ligand binding retention properties of the receptor were performed on TSMs (E10/E11/T7/T8/T9), TTGs (T9/T10/T11/T12) and TEMs (T8/T9), which have excellent effects of the above results. Specifically, ligand binding properties for receptors dissolved in TSMs (E10/E11/T7/T8/T9), TTGs (T9/T10/T11/T12), TEMs (T8/T9) or DDM were monitored at regular intervals while being incubated at room temperature for 6 days, and the results are illustrated in FIGS. 13 and 14. As a result, TSMs (E10/E11/T7/T8/T9), TTGs (T9/T10/T11/T12) and TEMs (T8/T9) were better in maintaining the ligand binding ability of the receptor than DDM.

<Experimental Example 5> Ability of TSMs and TEMs to Stabilize AtBOR1 Protein

Fluorescence size exclusion chromatography (FSEC): BOR1 of *Arabidopsis thaliana* was expressed in *Saccharomyces cerevisiae* FGY217 cells as a fusion protein having a C-terminal GFP tag. The cells were grown in a URA medium supplemented with 0.1% glucose. Protein expression was induced by adding 2% galactose, and then the cells were cultured at 20° C. for 18 hours as previously described. The cells were collected and used to prepare a membrane. The membrane including the BOR1-GFP fusion protein was diluted as follows. The membrane was diluted with PBS (pH 7.4) supplemented with 1% DDM or 1% individual TSM (TSM-E9/E10/T8/T9) and TEM (TEM-E9/E10/T8/T9) so that a final total protein concentration was 2.8 mg/ml. Samples were cultured while shaking at 4° C. for 1 hour, and then insoluble materials were removed by centrifugation at 14,000 g and 4° C. for 1 hour. A supernatant including the solubilized protein sample was heated at 47° C. for 10 minutes. After additional centrifugation to remove large aggregates, a 200 μl aliquot of the sample was injected into a Superose 6 10/300 column equilibrated with 20 mm Tris (pH 7.5), 150 mm NaCl and 0.03% DDM. The GFP fluorescence of each fraction was read using an excitation wavelength of 470 nm and an emission wavelength of 512 nm.

CPM assay: AtBOR1 was concentrated to 10 mg/ml in a buffer (20 mM Tris-HCl (pH 7.5), 150 mM NaCl, 0.03% DDM) with a 100 kDa MWCO centrifugal filter, stored at −80° C. and thawed immediately prior to thermal stability analysis. An analytical solution was prepared in a 96-well plate so that a final volume became 150 μL with each detergent (TSM-E9/E10/T8/T9 and TEM-E9/E10/T8/T9) at CMC+0.04 or CMC+0.2 wt %, 20 mM Tris-HCl (pH 7.5), 150 mM NaCl and 1 μL of AtBOR1. A 7-diethylamino-3-(4'-maleimidylphenyl)-4-methylcoumarin (CPM) dye (Invitrogen) was dissolved in DMSO at 4 mg/ml, and was diluted 1:100 with a buffer (150 mM NaCl supplemented with 20 mM Tris-HCl (pH 7.5) and 0.03% DDM). After 3 μL of the CPM dye was added to each well in the dark, the plate was covered with a transparent lid and the cells were cultured at 40° C. for 120 minutes. Fluorescence emission was monitored every 5 minutes using SpectraMax M2 (Molecular Devices) with a transition wavelength of 387 nm and an emission wavelength of 463 nm. Fluorescence readings were normalized under the most unstable conditions to calculate the percentage of proteins that were relatively unfolded. Data was analyzed as a single exponential decay curve using GraphPad Prism 6.

When the selected amphiphilic molecules were tested at CMC+0.04 wt %, all compounds were much better than DDM in their ability to preserve AtBOR1 in the folded state, and the best performance was observed, particularly, in TEM-E10 (FIG. 15). Further, similar results were confirmed even at an increased amphiphilic molecular concentration of CMCs+0.2 wt % (FIG. 16). As a result of further evaluating DDM or TEMs (TEM-E9/E10/T8/T9) using fluorescence size exclusion chromatography (FSEC), the protein solubilized with DDM showed a significant reduction in the original homogeneous protein peak (fraction number 35), along with a large increase in the peak caused by protein aggregation (fraction number 2) (FIG. 15). In contrast, all tested TEMs were highly effective in maintaining the initial state of the protein, because the peaks caused by aggregation significantly reduced and the amount of decrease in the original protein peak was significantly decreased under the same conditions (FIG. 15). These results indicate that the compound of the present invention is less efficient in AtBOR1 extraction than DDM, but is better than DDM in thermal stabilization.

<Experimental Example 6> MOR Thermal Stability Test

An N-[4-(7-diethylamino-4-methyl-3-coumarinyl)phenyl]maleimide (CPM) dye dissolved in DMSO (3 mg/ml) was diluted 40× in a buffer including 20 mM HEPES pH 7.5 and 150 mM NaCl. A μ-opioid receptor) (about 4 μM) dissolved in DDM (0.05%)/CHS (0.005%) was cultured with 250 L of a 1.0% compound (TSM-E9/E10/T8/T9 and TEM-E9/E10/T8/T9) solution. After 1 hour at room temperature, a compound was prepared at a final concentration of 0.5 wt % by diluting the receptor solution 2× in 20 mM HEPES pH 7.5, 150 mM NaCl. After 5 L of the diluted CPM dye was added thereto, the receptor stability of different compounds was measured by recording the fluorescence spectra (excitation 387 nm) every 5° C. from 20° C. to 65° C. while culturing at each temperature for 2 minutes. The melting point (Tm) was calculated by plotting the read value at 470 nm and fitting a non-linear regression curve using GraphPad Prism.

As a result, the receptor dissolved in DDM/CHS showed a low melting point of 31.6° C. (FIG. 17). In contrast, all tested TSM/TEMs resulted in higher receptor melting points than DDM. TEM-T8, the least effective of the tested compounds, also showed a melting point of 35.9° C., which is 4.3° C. higher than that of DDM. TEM-E10 and TSM-E10 showed the highest melting points of 48.0° C. and 48.9° C., respectively, and these values are higher than that (38.3° C.) of LMNG, which is an optimized novel compound contributing significantly to the structure determination of many GPCRs.

The invention claimed is:

1. A compound represented by the following Chemical Formula 1 or an isomer thereof:

[Chemical Formula 1]

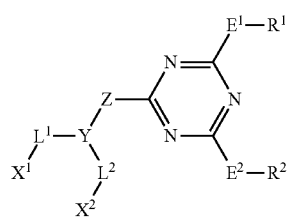

in Chemical Formula 1,
$R^1$ and $R^2$ are each independently a substituted or unsubstituted $C_3$-$C_{30}$ alkyl group;
$E^1$ and $E^2$ are each independently NH, O or S;
Z is a direct bond or NH;
Y is C, CH or N;
$L^1$ and $L^2$ are each independently a $C_{1-5}$ alkylene group;
$X^1$ and $X^2$ are each independently a saccharide; and
when Y is C, Y is further substituted a substituent represented by -$L^3X^3$, where $L^3$ is a $C_{1-5}$ alkylene group, and $X^3$ is a saccharide.

2. The compound or the isomer thereof of claim 1, wherein the saccharide is a monosaccharide or a disaccharide.

3. The compound or the isomer thereof of claim 1, wherein the saccharide is glucose or maltose.

4. The compound or the isomer thereof of claim 1, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is CH; and Z is NH.

5. The compound or the isomer thereof of claim 1, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are glucose; Z is NH; and Y is C, where Y is further substituted with a substituent represented by -$L^3X^3$, $L^3$ is a $C_{1-3}$ alkylene group, and $X^3$ is glucose.

6. The compound or the isomer thereof of claim 1, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is N; and Z is a direct bond.

7. The compound or the isomer thereof of claim 1, wherein the compound is represented by one of the following Chemical Formulae 2 to 8:

[Chemical Formula 2]

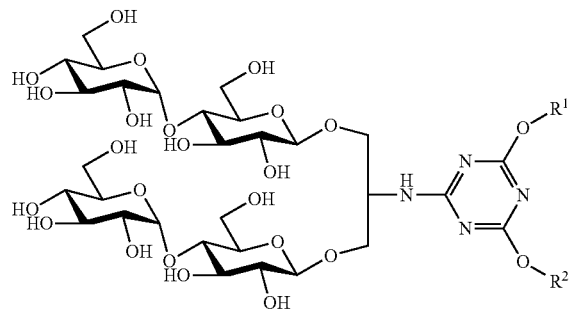

[Chemical Formula 3]

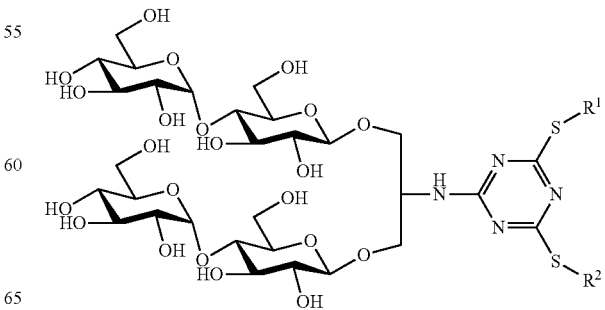

[Chemical Formula 4]

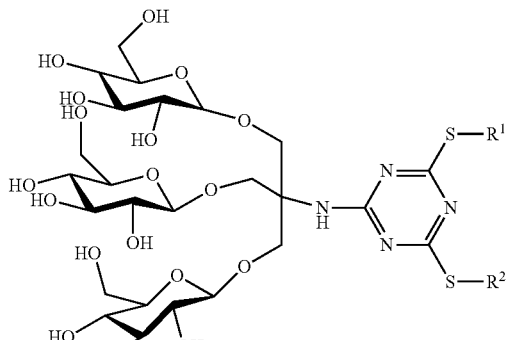

[Chemical Formula 5]

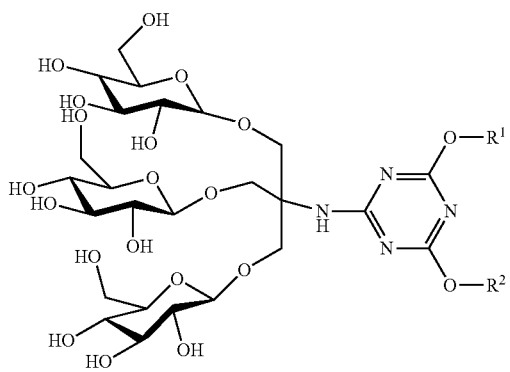

[Chemical Formula 6]

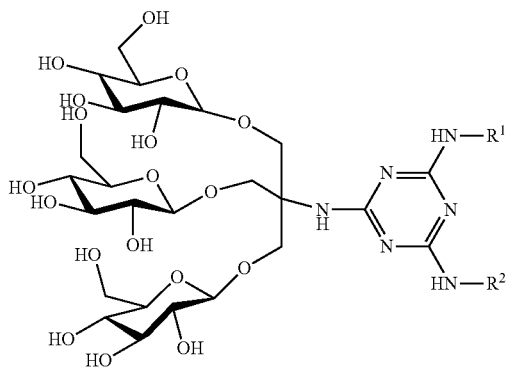

[Chemical Formula 7]

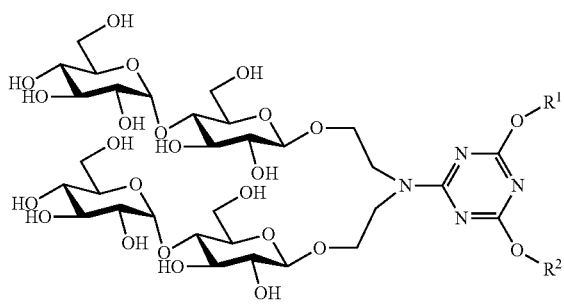

[Chemical Formula 8]

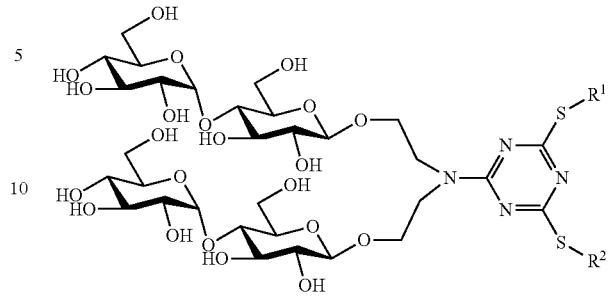

in the formulae,
R$^1$ and R$^2$ are each independently a substituted or unsubstituted $C_5$-$C_{20}$ alkyl group.

8. The compound or the isomer thereof of claim 1, wherein the compound is an amphiphilic molecule for extracting, solubilizing, stabilizing, crystallizing or analyzing a membrane protein.

9. The compound or the isomer thereof of claim 1, wherein the compound has a critical micelle concentration (CMC) of 0.0001 to 1 mM in an aqueous solution.

10. A composition for extracting, solubilizing, stabilizing, crystallizing or analyzing a membrane protein, comprising the compound or the isomer thereof of claim 1.

11. The composition of claim 10, wherein the composition is a formulation of micelles, liposomes, emulsions or nanoparticles.

12. A method for preparing a compound represented by the following Chemical Formula 1, the method comprising:
1) introducing an alkyl group by reacting an alkylamine, alcohol or thiol with 2,4,6-trichloro-1,3,5-triazine;
2) Introducing a hydroxyl end by reacting an amine substituted with at least two hydroxyalkyls or an alkylamine substituted with at least two hydroxyalkyls with the product of step 1);
3) Introducing a saccharide to which a protecting group is attached by performing a glycosylation reaction on the product of step 2); and
4) Performing a deprotection reaction on the product of step 3):

[Chemical Formula 1]

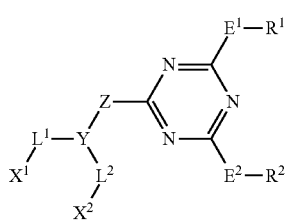

in Chemical Formula 1,
R$^1$ and R$^2$ are each independently a substituted or unsubstituted $C_3$-$C_{30}$ alkyl group;
E$^1$ and E$^2$ are each independently NH, O or S;
Z is a direct bond or NH;
Y is C, CH or N;
L$^1$ and L$^2$ are each independently a $C_{1-5}$ alkylene group;
X$^1$ and X$^2$ are each independently a saccharide; and
when Y is C, Y is further substituted with a substituent represented by -L$^3$X$^3$, where L$^3$ is a $C_{1-5}$ alkylene group, and X$^3$ is a saccharide.

13. The method of claim 12, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is CH; and Z is NH.

14. The method of claim 12, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are glucose; Z is NH; and Y is C, where Y is further substituted with a substituent represented by -$L^3X^3$, $L^3$ is a $C_{1-3}$ alkylene group, and $X^3$ is glucose.

15. The method of claim 12, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is N; and Z is a direct bond.

16. A method for extracting, solubilizing, stabilizing, crystallizing or analyzing a membrane protein, the method comprising: treating the membrane protein with a compound represented by the following Chemical Formula 1 or an isomer thereof in an aqueous solution:

[Chemical Formula 1]

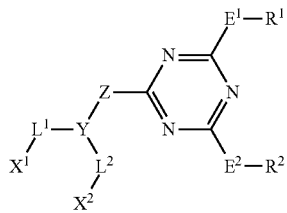

in Chemical Formula 1,
$R^1$ and $R^2$ are each independently a substituted or unsubstituted $C_3$-$C_{30}$ alkyl group;
$E^1$ and $E^2$ are each independently NH, O or S;
Z is a direct bond or NH;
Y is C, CH or N;
$L^1$ and $L^2$ are each independently a $C_{1-5}$ alkylene group;
$X^1$ and $X^2$ are each independently a saccharide; and
when Y is C, Y is further substituted with a substituent represented by -$L^3X^3$, where $L^3$ is a $C_{1-5}$ alkylene group, and $X^3$ is a saccharide.

17. The method of claim 16, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is CH; and Z is NH.

18. The method of claim 16, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are glucose; Z is NH; and Y is C, where Y is further substituted with a substituent represented by -$L^3X^3$, $L^3$ is a $C_{1-3}$ alkylene group, and $X^3$ is glucose.

19. The method of claim 16, wherein $R^1$ and $R^2$ are each independently a substituted or unsubstituted $C_3$-$C_{20}$ alkyl group; $E^1$ and $E^2$ are each independently NH, O or S; $L^1$ and $L^2$ are each independently a $C_{1-3}$ alkylene group; $X^1$ and $X^2$ are maltose; Y is N; and Z is a direct bond.

20. The method of claim 16, wherein the membrane protein is a leucine transporter (LeuT), a human $\beta_2$ adrenergic receptor ($\beta_2$AR), a melibiose permease (MelB), boron transporter 1 (BOR1), a mouse μ-opioid receptor (MOR) or a combination of two or more thereof.

* * * * *